US011686968B2

(12) United States Patent
Barrett et al.

(10) Patent No.: US 11,686,968 B2
(45) Date of Patent: Jun. 27, 2023

(54) LIGHT EMISSION REDUCING COMPOUNDS FOR ELECTRONIC DEVICES

(71) Applicant: Eyesafe Inc., Eden Prairie, MN (US)

(72) Inventors: Justin Barrett, Eden Prairie, MN (US); Bonnie G. Simmons, Concord, NH (US); Derek Harris, Maple Grove, MN (US)

(73) Assignee: EYESAFE INC., Eden Prairie, MN (US)

(*) Notice: Subject to any disclaimer, the term of this patent is extended or adjusted under 35 U.S.C. 154(b) by 0 days.

(21) Appl. No.: 17/465,216

(22) Filed: Sep. 2, 2021

(65) Prior Publication Data

US 2022/0011627 A1    Jan. 13, 2022

Related U.S. Application Data

(63) Continuation of application No. 17/091,152, filed on Nov. 6, 2020, which is a continuation of application
(Continued)

(51) Int. Cl.
*G02F 1/1335* (2006.01)
*G02B 5/20* (2006.01)
(Continued)

(52) U.S. Cl.
CPC ........ *G02F 1/133509* (2013.01); *C09B 47/04* (2013.01); *C09J 7/20* (2018.01);
(Continued)

(58) Field of Classification Search
None
See application file for complete search history.

(56) References Cited

U.S. PATENT DOCUMENTS 2,403,685 A    7/1946  Sachtleben et al.
2,493,200 A    1/1950  Land
(Continued)

FOREIGN PATENT DOCUMENTS

CA    2924278 A1    6/2008
CN    1545702 A    11/2004
(Continued)

OTHER PUBLICATIONS

International Search Report and Written Opinion for International Application No. PCT/US2021/052904, dated Dec. 27, 2021; date of filing: Sep. 30, 2021.
(Continued)

*Primary Examiner* — Richard H Kim
(74) *Attorney, Agent, or Firm* — Grumbles Law PLLC; Brittany Nanzig

(57) ABSTRACT

A light-filtering film for a screen of a device comprising a polymer substrate. A first absorbing compound combined with the polymer substrate, the first absorbing compound absorbing blue light in a blue notch band having a full-width half-maximum of not greater than about 50 nm. A second absorbing compound combined with the polymer substrate, the second absorbing compound absorbing green light in a green notch, wherein the first absorbing compound comprises an absorption that has a maximum absorbance peak between about 420 nm and about 445 nm, and wherein the second absorbing compound has a maximum absorbance peak between about 540 nm and 610 nm.

19 Claims, 27 Drawing Sheets

Related U.S. Application Data

No. 16/855,497, filed on Apr. 22, 2020, now Pat. No. 10,871,671, which is a continuation of application No. 15/844,109, filed on Dec. 15, 2017, now Pat. No. 10,642,087, which is a continuation of application No. PCT/US2016/037457, filed on Jun. 14, 2016, said application No. 15/844,109 is a continuation-in-part of application No. 14/719,604, filed on May 22, 2015.

(60) Provisional application No. 62/322,624, filed on Apr. 14, 2016, provisional application No. 62/255,287, filed on Nov. 13, 2015, provisional application No. 62/254,871, filed on Nov. 13, 2015, provisional application No. 62/175,926, filed on Jun. 15, 2015, provisional application No. 62/002,412, filed on May 23, 2014.

(51) Int. Cl.
| | | |
|---|---|---|
| *G02B 1/04* | (2006.01) | |
| *G02B 5/00* | (2006.01) | |
| *G02B 1/14* | (2015.01) | |
| *G02B 5/22* | (2006.01) | |
| *C09B 47/04* | (2006.01) | |
| *C09J 7/20* | (2018.01) | |

(52) U.S. Cl.
CPC .............. *G02B 1/04* (2013.01); *G02B 1/14* (2015.01); *G02B 5/003* (2013.01); *G02B 5/205* (2013.01); *G02B 5/208* (2013.01); *G02B 5/223* (2013.01); *G02F 1/133562* (2021.01); *C09J 2301/302* (2020.08); *G02F 1/133514* (2013.01); *G02F 1/133528* (2013.01); *G02F 2201/083* (2013.01); *G02F 2201/086* (2013.01); *G02F 2201/50* (2013.01); *G02F 2202/022* (2013.01); *G02F 2202/04* (2013.01)

(56) References Cited

U.S. PATENT DOCUMENTS

| | | | |
|---|---|---|---|
| 3,382,183 | A | 5/1968 | Donoian et al. |
| 3,482,915 | A | 12/1969 | Corley |
| 3,687,863 | A | 8/1972 | Wacher |
| 4,618,216 | A | 10/1986 | Suzawa |
| 4,842,781 | A | 6/1989 | Nishizawa et al. |
| 4,878,748 | A | 11/1989 | Johansen et al. |
| 4,966,441 | A | 10/1990 | Conner |
| 4,989,953 | A | 2/1991 | Kirschner |
| 5,083,252 | A | 1/1992 | McGuire |
| 5,177,509 | A | 1/1993 | Johansen et al. |
| 5,446,569 | A | 8/1995 | Iwai et al. |
| 5,483,464 | A | 1/1996 | Song |
| 5,555,492 | A | 9/1996 | Feger |
| 5,745,391 | A | 4/1998 | Topor |
| 5,952,096 | A | 9/1999 | Yamashita et al. |
| 6,019,476 | A | 2/2000 | Kirschner |
| 6,229,252 | B1 * | 5/2001 | Teng ............ G02B 5/223 359/589 |
| 6,295,106 | B1 | 9/2001 | Fukuzawa et al. |
| 6,663,978 | B1 | 12/2003 | Olson et al. |
| 6,778,238 | B2 | 8/2004 | Moon et al. |
| 6,824,712 | B1 | 11/2004 | Yang et al. |
| 6,826,001 | B2 | 11/2004 | Funakura et al. |
| 6,846,579 | B2 | 1/2005 | Anderson et al. |
| 6,955,430 | B2 | 10/2005 | Pratt |
| 6,984,038 | B2 | 1/2006 | Ishak |
| 6,991,849 | B2 | 1/2006 | Oya |
| 7,014,336 | B1 | 3/2006 | Ducharme et al. |
| 7,019,331 | B2 | 3/2006 | Winters et al. |
| 7,019,799 | B2 | 3/2006 | Utsumi et al. |
| 7,019,903 | B2 | 3/2006 | Berger et al. |
| 7,029,118 | B2 | 4/2006 | Ishak |
| 7,045,944 | B2 | 5/2006 | Ushifusa et al. |
| 7,066,596 | B2 | 6/2006 | Ishak |
| 7,071,602 | B2 | 7/2006 | Terui et al. |
| 7,126,589 | B2 | 10/2006 | Sung |
| 7,158,300 | B2 | 1/2007 | Shimoda |
| 7,193,779 | B2 | 3/2007 | Kim et al. |
| 7,218,044 | B2 | 5/2007 | Kim et al. |
| 7,227,190 | B2 | 6/2007 | Yasukawa et al. |
| 7,258,923 | B2 | 8/2007 | Bogerd et al. |
| 7,491,440 | B2 | 2/2009 | Fukatani et al. |
| 7,520,608 | B2 | 4/2009 | Ishak et al. |
| 7,524,060 | B2 | 4/2009 | Ramos |
| 7,556,376 | B2 | 7/2009 | Ishak et al. |
| 7,572,028 | B2 | 8/2009 | Mueller et al. |
| 7,579,769 | B2 | 8/2009 | Wu et al. |
| 7,630,128 | B2 | 12/2009 | Krieg-Kowald |
| 7,695,180 | B2 | 4/2010 | Schardt et al. |
| 7,703,917 | B2 | 4/2010 | Ramos |
| 7,710,511 | B2 | 5/2010 | Gehlsen et al. |
| 7,731,791 | B2 | 6/2010 | Deno et al. |
| 7,755,276 | B2 | 7/2010 | Wang et al. |
| 7,785,501 | B2 | 8/2010 | Segawa et al. |
| 7,825,578 | B2 | 11/2010 | Takashima et al. |
| 7,832,903 | B2 | 11/2010 | Ramos |
| 7,884,545 | B2 | 2/2011 | Yokoyama et al. |
| 7,914,177 | B2 | 3/2011 | Ramos |
| 3,034,206 | A1 | 10/2011 | Kim et al. |
| 8,044,942 | B1 | 10/2011 | Leonhard et al. |
| 8,063,999 | B2 | 11/2011 | Jabri et al. |
| 8,075,133 | B2 | 12/2011 | Ramos |
| 8,075,145 | B2 | 12/2011 | Engblom et al. |
| 8,113,651 | B2 | 2/2012 | Blum et al. |
| 8,164,844 | B2 | 4/2012 | Toda et al. |
| 8,303,859 | B2 | 11/2012 | Koo et al. |
| 8,323,357 | B2 | 12/2012 | Feldhues et al. |
| 8,360,574 | B2 | 1/2013 | Ishak et al. |
| 8,403,478 | B2 | 3/2013 | Ishak |
| 8,487,331 | B2 | 7/2013 | Jang et al. |
| 8,498,042 | B2 | 7/2013 | Danner et al. |
| 8,500,274 | B2 | 8/2013 | Ishak |
| 8,506,114 | B2 | 8/2013 | Ven |
| 8,507,840 | B2 | 8/2013 | Yu et al. |
| 8,518,498 | B2 | 8/2013 | Song et al. |
| 8,547,504 | B2 | 10/2013 | Guo et al. |
| 8,570,648 | B2 | 10/2013 | Ramos |
| 8,599,542 | B1 | 12/2013 | Healey et al. |
| 8,657,455 | B2 | 2/2014 | Yagi et al. |
| 8,659,724 | B2 | 2/2014 | Hagiwara et al. |
| 8,680,406 | B2 | 3/2014 | Chua |
| 8,680,492 | B2 | 3/2014 | Ren et al. |
| 8,716,729 | B2 | 5/2014 | Wiesmann et al. |
| 8,759,540 | B2 | 6/2014 | Maeda et al. |
| 8,767,282 | B2 | 7/2014 | Hashimura et al. |
| 8,770,749 | B2 | 7/2014 | McCabe et al. |
| 8,817,207 | B2 | 8/2014 | Rho et al. |
| 8,836,209 | B2 | 9/2014 | Baek et al. |
| 8,882,267 | B2 | 11/2014 | Ishak et al. |
| 8,928,220 | B2 | 1/2015 | Ko et al. |
| 8,957,835 | B2 | 2/2015 | Hoellwarth |
| 8,982,197 | B2 | 3/2015 | Kim et al. |
| 9,051,232 | B2 | 6/2015 | Kosuge et al. |
| 9,063,349 | B2 | 6/2015 | Ishak et al. |
| 9,122,089 | B2 | 9/2015 | Lee et al. |
| 9,287,471 | B2 | 3/2016 | Brouwer et al. |
| 9,377,569 | B2 | 6/2016 | Ishak et al. |
| 9,545,304 | B2 | 1/2017 | Ishak |
| 9,575,335 | B1 | 2/2017 | McCabe et al. |
| 9,798,163 | B2 | 10/2017 | Ishak et al. |
| 9,814,658 | B2 | 11/2017 | Ishak et al. |
| 9,927,635 | B2 | 3/2018 | Ishak et al. |
| 10,247,980 | B2 | 4/2019 | Cho et al. |
| 10,418,532 | B2 | 9/2019 | Okubo |
| 10,649,129 | B2 | 5/2020 | Chang et al. |
| 10,957,826 | B2 | 3/2021 | Itoga et al. |
| 2002/0005509 | A1 | 1/2002 | Teng et al. |
| 2002/0018890 | A1 | 2/2002 | Sugimachi |
| 2002/0158574 | A1 | 10/2002 | Wolk et al. |
| 2003/0214695 | A1 | 11/2003 | Abramson et al. |

(56) References Cited

U.S. PATENT DOCUMENTS

| | | |
|---|---|---|
| 2004/0070726 A1 | 4/2004 | Ishak |
| 2004/0114242 A1 | 6/2004 | Sharp |
| 2004/0166342 A1 | 8/2004 | Wursche et al. |
| 2004/0181006 A1 | 9/2004 | Warren et al. |
| 2004/0232813 A1 | 11/2004 | Nakano et al. |
| 2004/0246413 A1 | 12/2004 | Stephenson et al. |
| 2005/0042531 A1 | 2/2005 | Lee et al. |
| 2005/0259082 A1 | 11/2005 | Potsch |
| 2005/0275769 A1 | 12/2005 | Roh et al. |
| 2006/0012754 A1 | 1/2006 | Larson et al. |
| 2006/0040416 A1 | 2/2006 | Sano |
| 2006/0045989 A1 | 3/2006 | Minami |
| 2007/0013649 A1 | 1/2007 | Kim et al. |
| 2007/0030415 A1 | 2/2007 | Epstein |
| 2007/0058107 A1 | 3/2007 | Im et al. |
| 2007/0077410 A1 | 4/2007 | Shi |
| 2007/0078216 A1 | 4/2007 | Cao et al. |
| 2007/0146584 A1 | 6/2007 | Wang et al. |
| 2007/0195404 A1* | 8/2007 | Iijima ............... C09B 67/0033 359/359 |
| 2007/0216861 A1 | 9/2007 | Ishak et al. |
| 2007/0275184 A1 | 11/2007 | Lee et al. |
| 2008/0094566 A1 | 4/2008 | Ishak et al. |
| 2008/0137030 A1 | 6/2008 | Hoffman |
| 2008/0290787 A1 | 11/2008 | Cok |
| 2008/0297931 A1 | 12/2008 | Ramos |
| 2009/0058250 A1 | 3/2009 | Sin et al. |
| 2009/0105437 A1 | 4/2009 | Determan et al. |
| 2009/0128895 A1 | 5/2009 | Seo et al. |
| 2009/0173958 A1 | 7/2009 | Chakraborty et al. |
| 2009/0236622 A1 | 9/2009 | Nishihara |
| 2010/0022040 A1 | 1/2010 | Konishi et al. |
| 2010/0039704 A1 | 2/2010 | Hayashi et al. |
| 2010/0118511 A1 | 5/2010 | Wegat |
| 2010/0134879 A1 | 6/2010 | Yoshihara et al. |
| 2010/0231830 A1 | 9/2010 | Hirakata et al. |
| 2011/0019269 A1 | 1/2011 | Dirk |
| 2011/0043486 A1 | 2/2011 | Hagiwara et al. |
| 2011/0157546 A1 | 6/2011 | Ishak et al. |
| 2011/0176325 A1 | 7/2011 | Sherman et al. |
| 2011/0234079 A1 | 9/2011 | Eom et al. |
| 2011/0267801 A1 | 11/2011 | Tong et al. |
| 2011/0289654 A1 | 12/2011 | Williams et al. |
| 2011/0291132 A1 | 12/2011 | Liu et al. |
| 2011/0299168 A1 | 12/2011 | Combs |
| 2011/0299284 A1 | 12/2011 | Ven et al. |
| 2011/0315939 A1 | 12/2011 | Okayasu et al. |
| 2012/0021152 A1 | 1/2012 | Glaser et al. |
| 2012/0038861 A1 | 2/2012 | Lieshout et al. |
| 2012/0075577 A1 | 3/2012 | Ishak et al. |
| 2012/0113672 A1 | 5/2012 | Dubrow et al. |
| 2012/0120515 A1 | 5/2012 | Ishak et al. |
| 2012/0162106 A1 | 6/2012 | Choi et al. |
| 2012/0162752 A1 | 6/2012 | Kitano et al. |
| 2012/0217865 A1 | 8/2012 | Cabalu et al. |
| 2012/0300447 A1 | 11/2012 | Maxik et al. |
| 2012/0307194 A1 | 12/2012 | Croft et al. |
| 2013/0009059 A1 | 1/2013 | Caruso |
| 2013/0063493 A1 | 3/2013 | House |
| 2013/0156999 A1 | 6/2013 | Braesch et al. |
| 2013/0239874 A1 | 9/2013 | Smith et al. |
| 2013/0278134 A1 | 10/2013 | Ko et al. |
| 2013/0282115 A1 | 10/2013 | Ishak |
| 2014/0009061 A1 | 1/2014 | Itoga et al. |
| 2014/0009912 A1 | 1/2014 | Wheatley et al. |
| 2014/0022779 A1 | 1/2014 | Su et al. |
| 2014/0049700 A1 | 2/2014 | Chen et al. |
| 2014/0078420 A1 | 3/2014 | Liu et al. |
| 2014/0093661 A1 | 4/2014 | Trajkovska et al. |
| 2014/0175505 A1 | 6/2014 | Yamazaki et al. |
| 2014/0233105 A1 | 8/2014 | Schmeder et al. |
| 2014/0350146 A1 | 11/2014 | Tsubouchi |
| 2014/0355106 A1 | 12/2014 | Laluet et al. |
| 2014/0363767 A1 | 12/2014 | Murakami et al. |
| 2015/0036379 A1 | 2/2015 | Lee |
| 2015/0098058 A1 | 4/2015 | Ayguavives et al. |
| 2015/0124188 A1 | 5/2015 | Kadowaki et al. |
| 2015/0160478 A1 | 6/2015 | Ishak et al. |
| 2015/0187987 A1 | 7/2015 | Sim et al. |
| 2015/0212238 A1 | 7/2015 | Chang |
| 2015/0212352 A1 | 7/2015 | Guo et al. |
| 2015/0238308 A1 | 8/2015 | Ishak et al. |
| 2015/0248033 A1 | 9/2015 | Zhu et al. |
| 2015/0253653 A1 | 9/2015 | Fujita et al. |
| 2015/0277003 A1 | 10/2015 | Ramos |
| 2015/0311402 A1 | 10/2015 | Ven |
| 2015/0329684 A1 | 11/2015 | Kamimoto et al. |
| 2015/0338561 A1 | 11/2015 | Moe et al. |
| 2015/0378217 A1 | 12/2015 | Kim et al. |
| 2016/0126428 A1 | 5/2016 | Hosokawa et al. |
| 2017/0037308 A1 | 2/2017 | Römer et al. |
| 2017/0062529 A1 | 3/2017 | Paek et al. |
| 2017/0309235 A1 | 10/2017 | Manchado |
| 2017/0315405 A1 | 11/2017 | Masuda et al. |
| 2017/0363884 A1 | 12/2017 | Hallock et al. |
| 2018/0052362 A1 | 2/2018 | Kang et al. |
| 2018/0064616 A1 | 3/2018 | Ishak et al. |
| 2018/0107050 A1 | 4/2018 | Barrett et al. |
| 2018/0113327 A1 | 4/2018 | Ishak et al. |
| 2018/0284609 A1 | 10/2018 | Kandanarachch et al. |
| 2019/0004223 A1 | 1/2019 | Ramos et al. |
| 2019/0103523 A1 | 4/2019 | Choi et al. |
| 2019/0121176 A1 | 4/2019 | Lee et al. |
| 2019/0196071 A1 | 6/2019 | Barrett et al. |
| 2019/0219751 A1 | 7/2019 | Barrett et al. |
| 2019/0285941 A1 | 9/2019 | Liu et al. |
| 2019/0312185 A1 | 10/2019 | Zhang et al. |
| 2020/0124781 A1 | 4/2020 | Tseng et al. |
| 2020/0166798 A1 | 5/2020 | Garbar et al. |
| 2020/0174168 A1 | 6/2020 | Barrett |
| 2020/0249520 A1 | 8/2020 | Barrett et al. |
| 2020/0286962 A1 | 9/2020 | Lee et al. |
| 2020/0303598 A1 | 9/2020 | Kim et al. |
| 2021/0043807 A1 | 2/2021 | Harris et al. |
| 2021/0098661 A1 | 4/2021 | Harris et al. |
| 2021/0116612 A1 | 4/2021 | Barrett et al. |
| 2021/0165276 A1 | 6/2021 | Garbar et al. |
| 2021/0273141 A1 | 9/2021 | Harris et al. |
| 2021/0311354 A1 | 10/2021 | Garbar et al. |

FOREIGN PATENT DOCUMENTS

| | | |
|---|---|---|
| CN | 101216611 A | 7/2008 |
| CN | 101899222 A | 12/2010 |
| CN | 201666985 U | 12/2010 |
| CN | 102879920 A | 1/2013 |
| CN | 102898800 A | 1/2013 |
| CN | 202847016 U | 4/2013 |
| CN | 203410122 U | 1/2014 |
| CN | 103941320 A | 7/2014 |
| CN | 204213761 U | 3/2015 |
| CN | 104614786 A | 5/2015 |
| CN | 104950515 A | 9/2015 |
| CN | 105788474 B | 7/2016 |
| CN | 103448312 B | 10/2016 |
| CN | 106324908 B | 1/2017 |
| CN | 107808919 A | 3/2018 |
| CN | 209782327 U | 12/2019 |
| DE | 202014000982 U1 | 3/2014 |
| EP | 0509727 A2 | 10/1992 |
| EP | 0855602 A2 | 7/1998 |
| EP | 0965034 B1 | 5/2007 |
| EP | 2085798 A1 | 8/2009 |
| EP | 2095177 A1 | 9/2009 |
| EP | 2096471 A1 | 9/2009 |
| EP | 2128889 A1 | 12/2009 |
| EP | 2260348 A2 | 12/2010 |
| EP | 1794240 B1 | 1/2013 |
| EP | 2874001 A1 | 5/2015 |
| EP | 3026485 A2 | 6/2016 |
| ES | 1094781 U | 12/2013 |
| FR | 2909779 A1 | 6/2008 |
| JP | 2001315240 A | 11/2001 |
| JP | 2003149605 A | 5/2003 |

(56) References Cited

FOREIGN PATENT DOCUMENTS

| | | |
|---|---|---|
| JP | 2003279988 A | 10/2003 |
| JP | 2006031030 A | 2/2006 |
| JP | 2006278980 A | 10/2006 |
| JP | 2007150228 A | 6/2007 |
| JP | 2007317896 A | 12/2007 |
| JP | 2010261986 A | 11/2010 |
| JP | 2011039093 A | 2/2011 |
| JP | 2013067811 A | 4/2013 |
| JP | 2013222212 A | 10/2013 |
| JP | 2013238634 A | 11/2013 |
| JP | 2014000819 A | 1/2014 |
| JP | 2014225030 A | 12/2014 |
| JP | 2016126064 A | 7/2016 |
| JP | 2016128931 A | 7/2016 |
| JP | 2017017317 A | 1/2017 |
| KR | 1020060048986 A | 5/2006 |
| KR | 20160066707 A | 6/2016 |
| KR | 101815619 B1 | 1/2018 |
| WO | 1988002871 A1 | 4/1988 |
| WO | 2002101695 A1 | 12/2002 |
| WO | 03010569 A2 | 2/2003 |
| WO | 2004090589 A1 | 10/2004 |
| WO | 2005034066 A1 | 4/2005 |
| WO | 2005106542 A1 | 11/2005 |
| WO | 2016179906 A1 | 11/2016 |

OTHER PUBLICATIONS

"1002 nm NIR Dye", Technical Data Sheet, Product Code: NIR1002A, QCR Solutions Corp, Version 2011.NIR Dyes, www.qcrsolutions.com, 1 page.

"ADS640PP Product Specification", American Dye Source, Inc., Retrieved at <>, Retrieved on May 18, 2015, 1 page.

"Filters for Color Photomicrography," Olympus America Inc., Olympus Microscopy Resource Center, http://www.plympusmicro.com/primer/photomicrography/colorfilters.html, Mar. 2012, 7 pp.

"Kentek Laser Safe Window Protection", Retrieved at <<http://www.kenteklaserstore.com/category.aspx?categoryID=311>>, 1 pp. Retrieved on Apr. 28, 2014.

"Laser and fluorescent dyes, UV and NIR dyes, security inks and other optically functional materials", Retrieved at http://www.fabricolorholding.com/product, 2 pp. Retrieved May 18, 2015.

"LUM690 Near Infrared Dye", Moleculum, moleculum.com, Jan. 2015, 2 pages.

"LUM995 Near Infrared Dye", Moleculum, moleculum.com, Jan. 2015, 2 pages.

"Near Infrared Dye: LUM1000A", Moleculum, moleculum.com, Jan. 2015, 1 page.

"Reticare, the first ocular protector for electronic device screens to launch at CES 2014"; https://www.reticare.com/tienda/en/blog/post/3-reticare-the-first-ocular-protector-for-electronic-device-screens-to-launch-at-ces-2014; Jan. 10, 2014; 7 pp. Retrieved Nov. 30, 2017.

"Tinuvin P Benzotriazole UV Absorber", Ciba Specialty Chemicals, Inc.,Printing Date: Aug. 1998, 2 pages.

"XGear Krystal Sapphire Screen Protector Film Shield for Apple IPhone 4 4S", Retrieved at <>, 3 pp. Retrieved Apr. 28, 2014.

"1031 nm NIR Dye", Technical Data Sheet, Product Code: NIR1031M, QCR Solutions Corp, Version: 2011 NIR Dyes, www.qcrsolutions.com, 1 page.

"1072 nm NIR Dye", Technical Data Sheet, Product Code: NIR1072A, QCR Solutions Corp, Version: 2011.NIR Dyes, www.qcrsolutions.com, 1 page.

"1073nm NIR Dye", Technical Data Sheet, Product Code: IR Dye 1151, Adam Gates & Company, LLC, www.adamgatescompany.com, 1 page.

"290 nm UV Dye", Technical Data Sheet, Product Code: UV290A, QCR Solutions Corp, Version: 2011.UV Dyes, www.qcrsolutions.com, 1 page.

"530 nm Visible Dye", Technical Data Sheet, Product Code: VIS530A, QCR Solutions Corp, Version: 2011.VIS Dyes, www.qcrsolutions.com, 1 page.

"675 nm Visible Dye", Technical Data Sheet, Product Code: VIS675F, QCR Solutions Corp, Version: 2011 VIS Dyes, www.qcrsolutions.com, 1 page.

"ABS 668: Visible Narrow Band Absorber", Exciton, Inc., www.exciton.com, 1 page.

"ABS 691: Visible Narrow Band Absorber", Exciton, Inc., www.exciton.com, 1 page.

"Capturing All the Light: Panchromatic Visible Absorption for Solar Photoconversion." U.S. Department of Energy, Basic Energy Sciences, Jun. 1, 2014, science.energy.gov/bes/highlights/2014/bes-2014-06-g/. Retrieved Apr. 12, 2019.

"Dye Vis 347", Adam Gates & Company, LLC, www.adamgatescompany.com, 1 page.

"Dye Vis 670", Adam Gates & Company, LLC, www.adamgatescompany.com, 1 page.

"Dye Vis 671", Adam Gates & Company, LLC, www.adamgatescompany.com, 1 page.

"Infrared Dye 1422", Adam Gates & Company, LLC, www.adamgatescompany.com, 1 page.

"New ANSI/ISEA Z87. Jan. 2010 Standard", Uvex by Sperian, 2 pages.

"Spectral-Transmittance Bar Charts for Selected Kodak Wratten Filters." google search (www.google.com), search terms: kodak wratten filters bar chart, second image (wratten filter specs, iclane.net). Retrieved May 16, 2019.

A-594-5 Invisible Blue Pigment, dayglo.com, 1 page. Retrieved Jun. 2, 2019.

Abramowitz, Mortimer and Davidson, Michael W. "Kodak Color Compensating Filters Yellow." Olympus Microscopy Resource Center. olympus-lifescience.com. Retrieved May 16, 2019.

Andres Cantarero; Raman scattering applies to materials science; ScienceDirect; 2015; pp. 113-122; vol. 9; Elsevier.

ANSI Z80.Mar. 2015, Nonprescription Sunglass and Fashion Eyewear Requirements, 41 pp.

ASTM International E 313-05; Standard Practice for Calculating Yellowness and Whiteness Indices from Instrumentally Measured Color Coordinates; Article; 6 pp.

Doeffinger, Derek, editor. Using Filters. Eastman Kodak Company, 1988. The Kodak Workshop Series, pp. 11, 13, 17, 46, 68-69.

ebay.com, screenshot of ebay purchase of Apr. 23, 2019. Retrieved May 16, 2019.

Final Office Action for U.S. Appl. No. 14/719,604; dated Mar. 28, 2017; date of filing: May 22, 2015; 66 pp.

Final Office Action for U.S. Appl. No. 15/844,109; dated Jan. 16, 2020; date of filing: Dec. 15, 2017; 12 pp.

Final Office Action for U.S. Appl. No. 16/855,497; dated Sep. 22, 2020; date of filing: Apr. 22, 2020; 12 pp.

First Office Action for C.N. Application No. 201580040377.2 (national phase of PCT/US2015/032175); dated Feb. 24, 2018; date of filing: May 22, 2015; 5 pp.

First Office Action for C.N. Application No. 201680048240.6 (national phase of PCT/US2016/037457); dated Jan. 16, 2020; date of filing: Jun. 14, 2016; 10 pp.

First Office Action for Chinese Application No. 201880073490.4 (English Translation); dated Feb. 1, 2021; date of filing: May 13, 2020; 9 pp.

First Office Action for J.P. Application No. 2017-032775 (national phase of PCT/US2015/032175); dated May 15, 2019; date of filing: May 22, 2015; 6 pp.

First Office Action for Japanese Application No. 2020-526348 (English Translation); dated Mar. 11, 2021; date of filing: May 13, 2020; 6 pp.

Fonseca, "Apple patents a virtual reality headset for iPhone," http://vr-zone.com/articles/apple-patents-virtual-reality-headset-iphone/87267.html, Jun. 22, 2015, 4 pp.

Fritz, Norman L. "Filters: An Aid in Color-Infrared Photography." Photogrammetric Engineering and Remote Sensing, vol. 43, No. 1, Jan. 1977, pp. 61-72, www.asprs.org/wp-content/uploads/pers/1977journal/.../1977_jan_61-72. Retrieved Apr. 4, 2019.

Gallas, Jim and Eisner, Mel; Chapter 23—Eye protection from sunlight damage; Journal; 2001; 437, 439-455; vol. 3. Comprehensive Series in Photosciences, Elvesier, abstract only.

(56) References Cited

OTHER PUBLICATIONS

Giovannetti, Rita. "The Use of Spectrophotometry UV-Vis for the Study of Porphyrins." Macro to Nano Spectroscopy, Uddin, Jamal (Ed.), IntechOpen Limited, 2012, pp. 87-108, www.intechopen.com/books/macro-to-nano-spectroscopy/the-use-of-spectrophotometry-uv-vis-for-thestudy-of-porphyrins. Retrieved Apr. 12, 2019.

Illuminant D65, 4 pp.

International Search Report and Written Opinion for International Application No. PCT/US2015/032175, dated Aug. 28, 2015; date of filing: May 22, 2015; 10 pp.

International Search Report and Written Opinion for International Application No. PCT/US2016/037457, dated Sep. 16, 2016; date of filing: Jun. 14, 2016; 7 pp.

International Search Report and Written Opinion for International Application No. PCT/US2018/061103, dated Jan. 24, 2019; date of filing: Nov. 14, 2018; 6 pp.

International Search Report and Written Opinion for International Application No. PCT/US2020/059208, dated Feb. 5, 2020; date of filing: Nov. 5, 2020; 9 pp.

Extended European Search Report pertaining to European Patent Application No. 20891730.2, dated Dec. 14, 2021.

Office Action pertaining to corresponding Korean Patent Application No. 10-2021-7021453, dated Dec. 22, 2021.

Examination Report pertaining to corresponding Australian Patent App. No. 2020392315, dated Mar. 31, 2022.

Examination Report pertaining to corresponding Australian Patent App. No. 2020393812, dated Mar. 30, 2022.

Office Action pertaining to corresponding Canadian Patent App. No. 3152206, dated Apr. 22, 2022.

Office Action pertaining to corresponding Canadian Patent App. No. 3154694, dated Apr. 27, 2022.

Office Action pertaining to corresponding U.S. Appl. No. 17/348,570, dated Apr. 14, 2022.

Office Action pertaining to corresponding Japanese Patent App. No. 2021-541465, dated Jun. 28, 2022.

Office Action pertaining to corresponding Japanese Patent App. No. 2021-542506, dated Jun. 21, 2022.

Office Action pertaining to corresponding U.S. Appl. No. 17/348,570, dated Aug. 8, 2022.

International Search Report and Written Opinion for International Application No. PCT/US2022/031930, dated Sep. 23, 2022.

Extended European Search Report pertaining to European Patent Application No. 20893018.0, dated Dec. 20, 2022.

Office Action pertaining to Japanese Patent Application No. 2021-542506, dated Dec. 20, 2022.

Office Action pertaining to Korean Patent Application No. 10-2021-7021455, dated Feb. 16, 2023.

Office Action pertaining to corresponding U.S. Appl. No. 17/876,399, dated Mar. 30, 2023.

Office Action pertaining to corresponding U.S. Appl. No. 17/091,152, dated Mar. 2, 2023.

International Search Report and Written Opinion for International Application No. PCT/US2022/050950, dated Mar. 9, 2023.

* cited by examiner

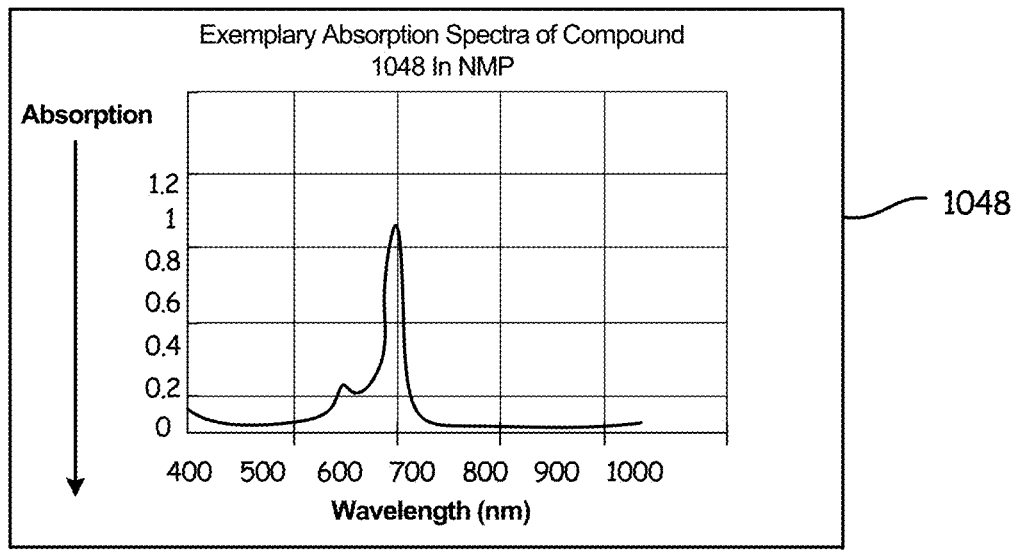
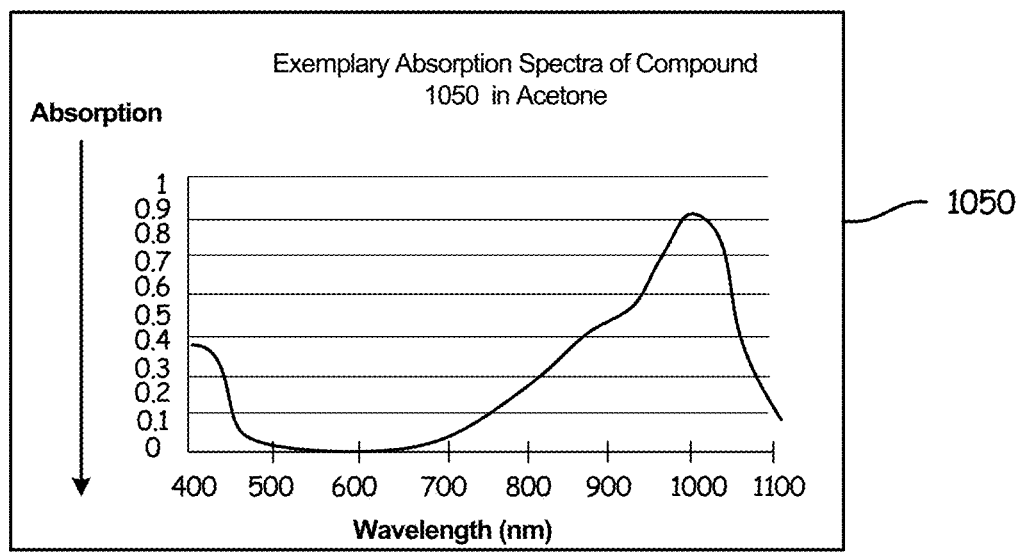
Fig. 2C-7

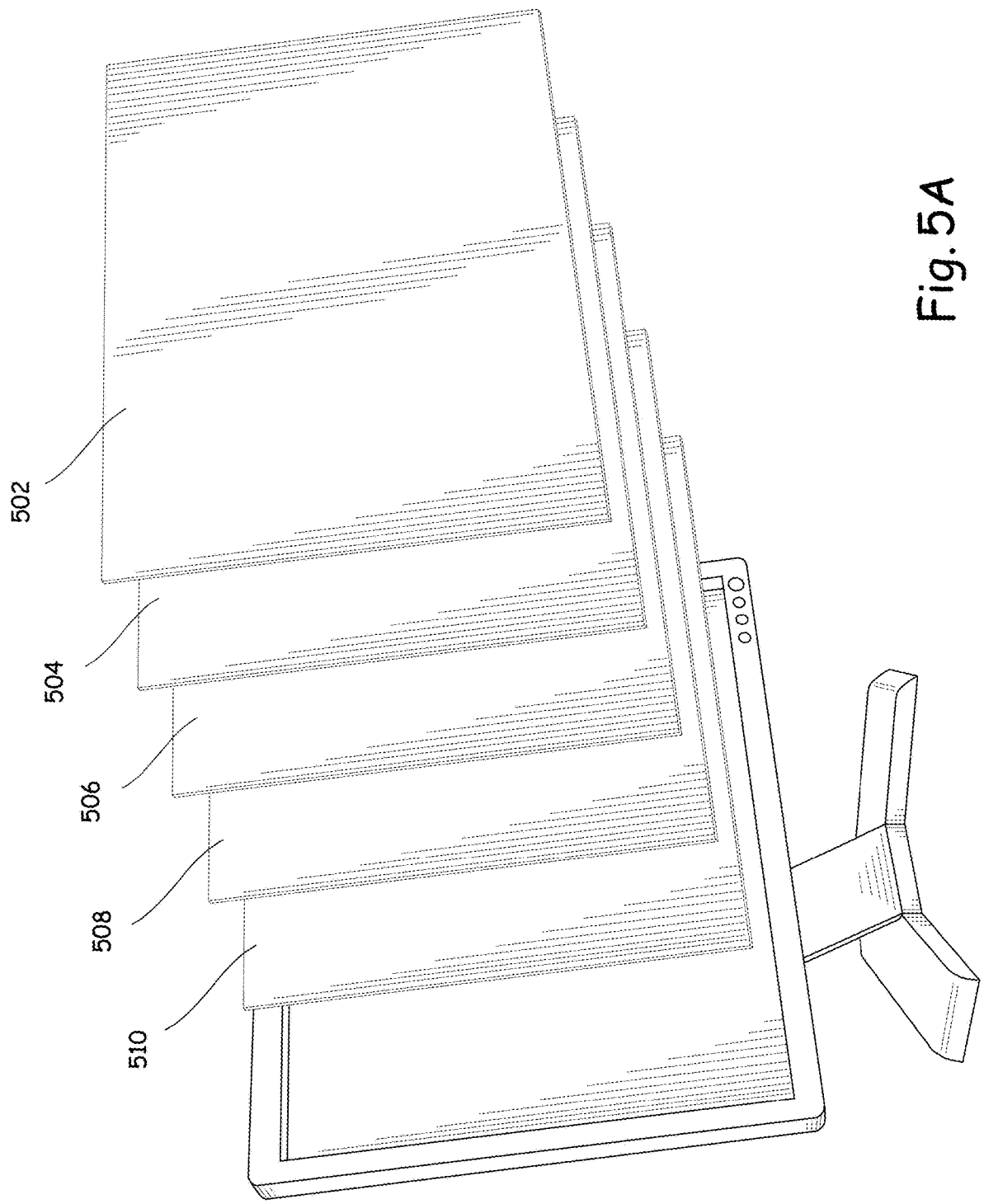

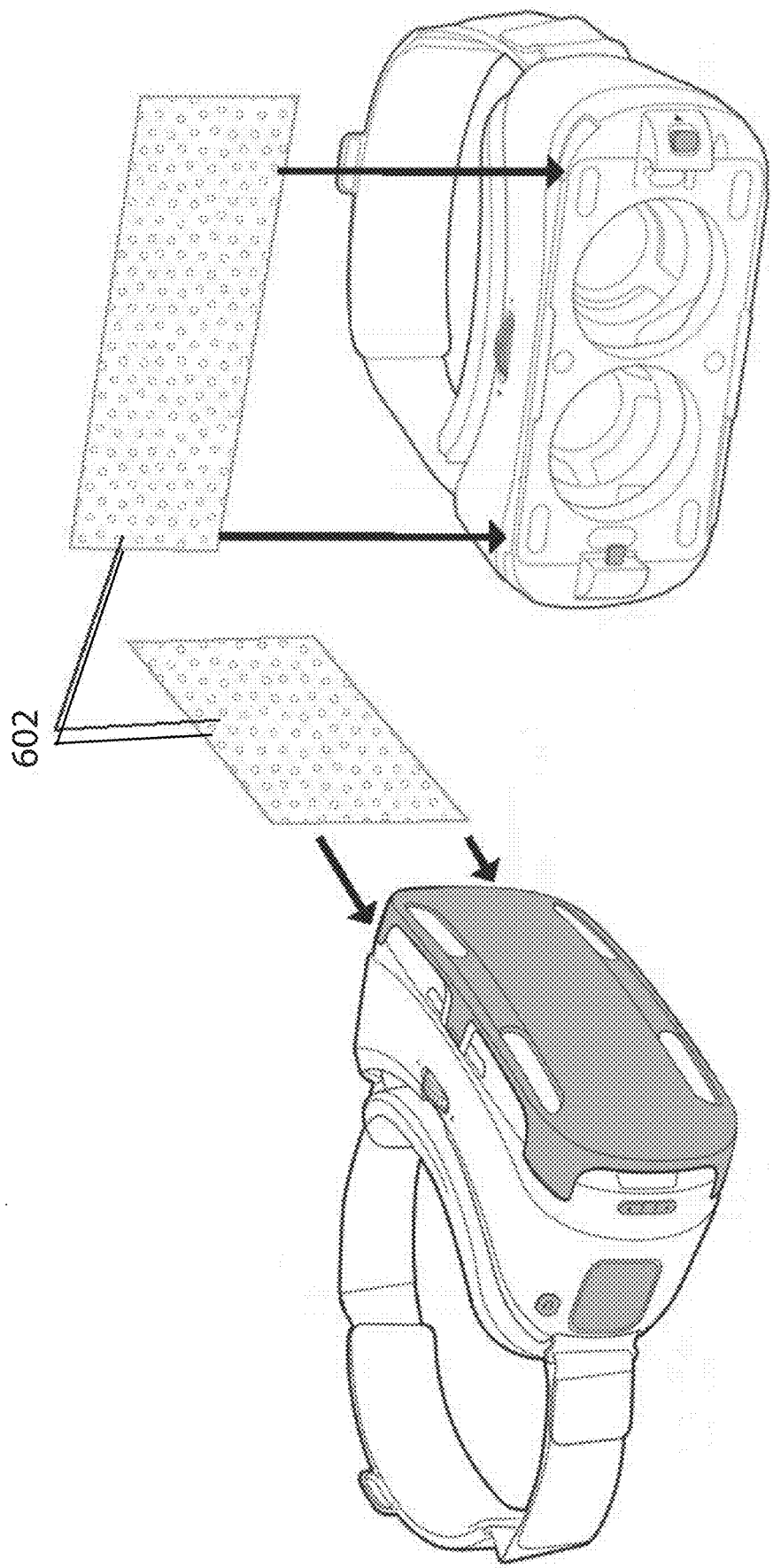

LIGHT EMISSION REDUCING COMPOUNDS FOR ELECTRONIC DEVICES

CROSS-REFERENCE TO RELATED APPLICATIONS

This application is a continuation of U.S. patent application Ser. No. 16/855,497, filed Apr. 22, 2020, currently allowed and titled, LIGHT EMISSION REDUCING COMPOUNDS FOR ELECTRONIC DEVICES, which in turn is a continuation of application of U.S. patent application Ser. No. 15/844,109, filed Dec. 15, 2017, patented as U.S. Pat. No. 10,642,087 and titled, LIGHT EMISSION REDUCING COMPOUNDS FOR ELECTRONIC DEVICES. U.S. patent application Ser. No. 15/844,109 is a continuation of International Application PCT/US16/37457, with an international filing date of Jun. 14, 2016 and titled LIGHT EMISSION REDUCING COMPOUNDS FOR ELECTRONIC DEVICES, which claims the benefit of U.S. Provisional Application No. 62/175,926, filed Jun. 15, 2015 and titled LIGHT EMISSION REDUCING FILM FOR ELECTRONIC DEVICES, U.S. Provisional Application No. 62/254,871, filed Nov. 13, 2015 and titled LIGHT EMISSION REDUCING COMPOUNDS FOR ELECTRONIC DEVICES, U.S. Provisional Application No. 62/255,287, filed Nov. 13, 2015 and titled LIGHT EMISSION REDUCING FILM FOR VIRTUAL REALITY HEADSET, and U.S. Provisional Application No. 62/322,624, filed Apr. 13, 2016 and titled LIGHT EMISSION REDUCING FILM FOR ELECTRONIC DEVICES. This application also is a continuation-in-part of U.S. Nonprovisional application Ser. No. 14/719,604, now abandoned and filed May 22, 2015 and titled LIGHT EMISSION REDUCING FILM FOR ELECTRONIC DEVICES, which claims the benefit of U.S. Provisional Application No. 62/002,412, filed May 23, 2014 and titled LIGHT EMISSION REDUCING FILM FOR ELECTRONIC DEVICES.

FIELD

The disclosed invention relates to an absorbing compound or compounds that can be combined with one or more polymer substrates to be placed on or incorporated into an electronic device, including on the display screen of an electronic device.

BACKGROUND

Electronic digital devices typically emit a spectrum of light, consisting of rays of varying wavelengths, of which the human eye is able to detect a visible spectrum between about 350 to about 700 nanometers (nm). It has been appreciated that certain characteristics of this light, both in the visible and nonvisible ranges, may be harmful to the user, and lead to health symptoms and adverse health reactions, such as, but not limited to, eyestrain, dry and irritated eyes, fatigue, blurry vision and headaches. There may be a link between exposure to the blue light found in electronic devices and human health hazards, particularly with potentially harmful risks for the eye. Some believe that exposure to the blue light and/or high energy visible light, such as that emitted by screens of digital devices could lead to age-related macular degeneration, decreased melatonin levels, acute retinal injury, accelerated aging of the retina, and disruption of cardiac rhythms, among other issues. Additional research may reveal additional musculoskeletal issues that result from prolonged exposure to the blue light spectrum.

More specifically, high energy visible (HEV) light emitted by digital devices is known to increase eye strain more than other wavelengths in the visible light spectrum. Blue light can reach deeper into the eye than, for example, ultraviolet light and may cause damage to the retina. Additionally, there may also be a causal link between blue light exposure and the development of Age-related Macular Degeneration (AMD) and cataracts. Additionally, the use of digital electronic devices is known to cause eye strain symptoms. The damage is thought to be caused by HEV light that penetrates the macular pigment, causing more rapid retinal changes.

Additionally, blue light exposure suppresses melatonin for about twice as long as green light and shifts circadian rhythms by twice as much. Blue wavelengths of light seem to be the most disruptive at night. Studies have also shown that blue light frequencies, similar to those generated by LEDs from electronic devices, such as smart phones, are 50 to 80 times more efficient in causing photoreceptor death than green light. Exposure to the blue light spectrum seem to accelerate AMD more than other areas of the visible light spectrum. However, it is also suspected that exposure to the red and green light spectrums may also present health risks, which can be mitigated by absorption of light produced by devices in that wavelength range.

Further, ultraviolet A (UVA) light (in the 320 nm-380 nm range) is of particular concern to eye care professionals. UVA light is considered to be damaging because it directly affects the crystalline lens of the human eye. In one embodiment, the film 200 reduces the High Energy Visible light in accordance with the standards set by the International Safety Equipment Association, specifically the ANSI/ISEA Z87.1—2010 standard, which weighs the spectral sensitivity of the eye against the spectral emittance from the 380 nm-1400 nm range.

Although the light generated by LEDs from digital devices appears normal to human vision, a strong peak of blue light ranging from 380 nm-500 nanometers is also emitted within the white light spectrum produced by the screens of such digital devices. As this blue light corresponds to a known spectrum for retinal hazards, a means for protecting users from exposure to such light is needed.

Optical filters are used in a wide range of applications including light filters for LCD (Liquid Crystal Display) retardation films. LCD retardation films use alternate layers of materials comprised of an electroplated pigment, pigment impregnated or a printing method material. These methods are compromised when they experience friction, heat or moisture and may cause a ghosting effect. Optical density transmissivity and sustainability requirements may also fail due to moisture and mechanical integrity.

While some measures have been taken to reduce exposure to these harmful rays, these measures have been inadequate. Some measures have implemented software solutions to decrease the wavelengths emitted, but they are easily altered to be less effective and can change the viewing experience by blocking too much light from a chosen wavelength and, therefore, changing the colors viewable to a user. Other measures have implemented physical devices that are placed over screens. However, these devices severely alter the colors viewable to a user and, in most cases, completely block at least one entire color from the color spectrum.

More specifically, current film substrate technologies often lack desired optical properties such as stability to UV light, selective transmissivity in the visible range, and absorption in the UV and high intensity blue light range, or other absorption characteristics. Current film substrates also lack the desired mechanical properties such as heat resistance and mechanical robustness at the desired thinness. Glass, polycarbonate, acrylic, and nylon lenses and films exist, but may be unable to sustain dye or pigment dispersion and achieve an optical density sufficient to maintain the high transmission values at this thickness. In one embodiment, an F700 film, such as that produced by Kentek Corporation, is resistant to moisture and humidity. Such a film is preferable to glass, which may require re-polishing. Increased color resolution, repeatability and the lack of a binder agent requirement are other benefits.

Therefore, a physical film, protective layer within an electronic device screen, or coating on an existing substrate of an electronic device screen is needed that provides at least some protection to a device from wear and tear, as well as protection to a user from the potentially harmful light emitted by the device. Additionally, the film or protective coating layer should provide the necessary protection while maintaining transparency and substantially true color rendition.

SUMMARY

A shield, protective film, and protective coating layer for a device are provided. In one embodiment, the shield for a device comprises a polymer substrate. The shield may also comprise an absorbing agent dispersed within the polymer substrate. The shield may also reduce a transmissivity of an ultraviolet range of light by at least 90%, wherein the ultraviolet range of light comprises a range between 380 nanometers and 400 nanometers, and wherein the shield also reduces a transmissivity of a high energy visible light range by at least 10%, wherein the high energy visible light range comprises a range between 415 nanometers and 555 nanometers, and wherein the shield also reduces a transmissivity of a red light range by at least 10%, wherein the red light range comprises a range between 625 nanometers and 740 nanometers. Additionally, the shield may also be configured to transmit sufficient light generated by the device such that an image generated by the device is substantially unaltered by the shield. These and various other features and advantages that characterize the claimed embodiments will become apparent upon reading the following detailed description and upon reviewing the associated drawings.

BRIEF DESCRIPTION OF THE DRAWINGS

FIG. 2C-2 illustrates a plurality of absorbing compounds that may be utilized to achieve the desired characteristics of one embodiment of a light absorbent film.

FIG. 2C-3 illustrates a plurality of absorbing compounds that may be utilized to achieve the desired characteristics of one embodiment of a light absorbent film.

FIG. 2C-4 illustrates a plurality of absorbing compounds that may be utilized to achieve the desired characteristics of one embodiment of a light absorbent film.

FIG. 2C-5 illustrates a plurality of absorbing compounds that may be utilized to achieve the desired characteristics of one embodiment of a light absorbent film.

FIG. 2C-6 illustrates a plurality of absorbing compounds that may be utilized to achieve the desired characteristics of one embodiment of a light absorbent film.

FIG. 2C-7 illustrates a plurality of absorbing compounds that may be utilized to achieve the desired characteristics of one embodiment of a light absorbent film.

FIG. 5A depicts an exploded view of the screen of an electronic device comprised of several layers of glass and/or plastic.

FIG. 6B depicts a virtual reality headset with one embodiment of a light-absorbing layer inserted within the virtual reality headset.

FIG. 6C depicts a virtual reality headset with one embodiment of a light-absorbing layer inserted within the virtual reality headset.

DETAILED DESCRIPTION

Generally, the present invention relates to an absorbing compound or compounds that can be combined with one or more polymer substrates to be placed on or incorporated into an electronic device. The absorbing compound is, ideally, blue-based and provides protection to an individual from the potentially harmful light emitted by the electronic device, and the polymer substrates are used for application to or in the electronic device. The absorbing compound and polymer substrate combinations described herein can include material for making optical filters with defined transmission and optical density characteristics for visible wavelength transmissivity. The material to make such filters, in some embodiments, can include an organic dye impregnated polycarbonate composition. In application, the protective film can be applied to a device's screen surface after purchase of the electronic device or the protective film can be incorporated into the screen during production. In a further embodiment, the absorbing compound can be applied as a protective coating layer to an existing film layer or other substrate in a device screen.

Film and Film Properties

Figure 1A:
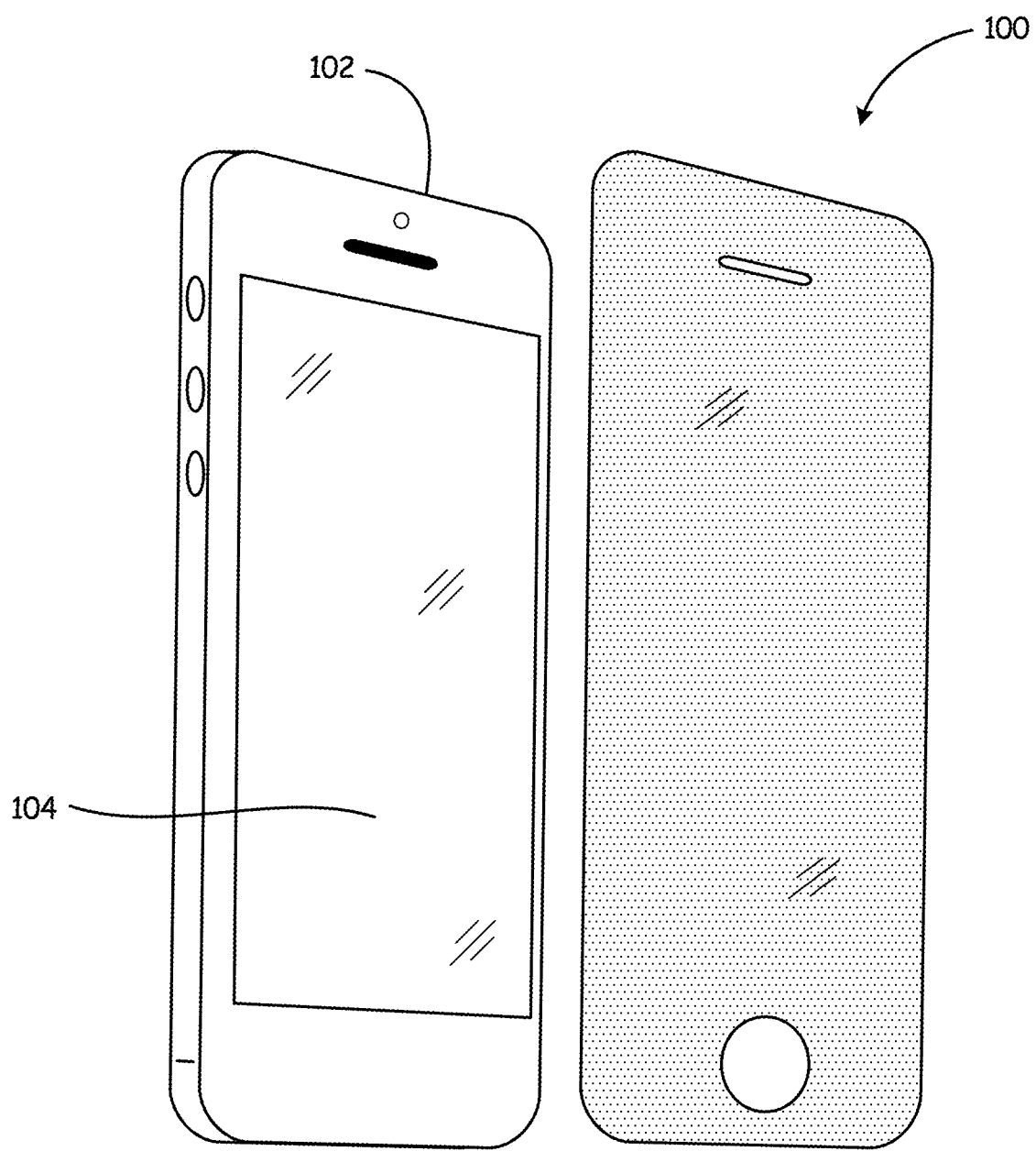
FIG. 1A illustrates a light absorbent film according to one embodiment of the present invention.
Figure 1B:
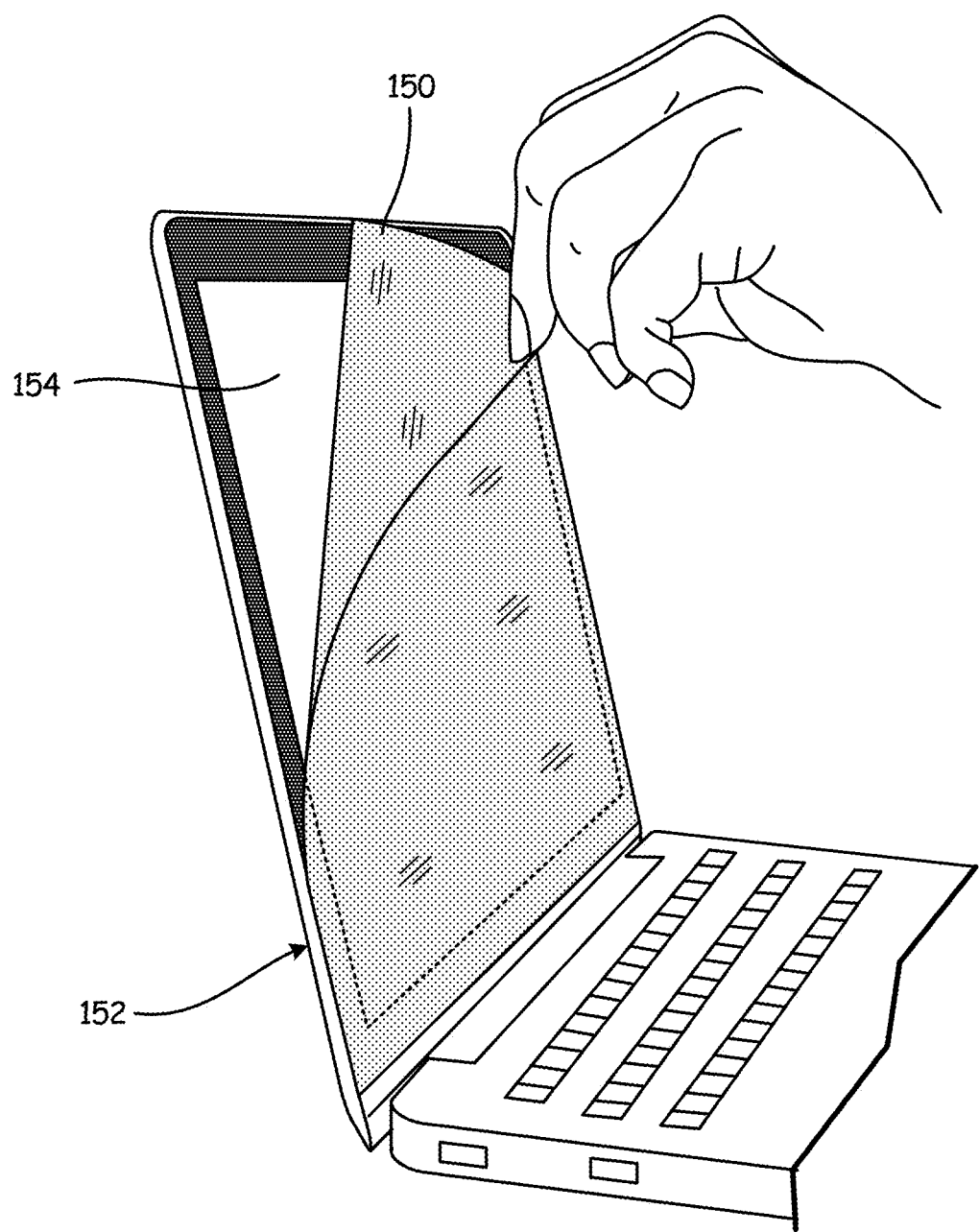
FIG. 1B illustrates a light absorbent film according to one embodiment of the present invention.
Figure 1C:
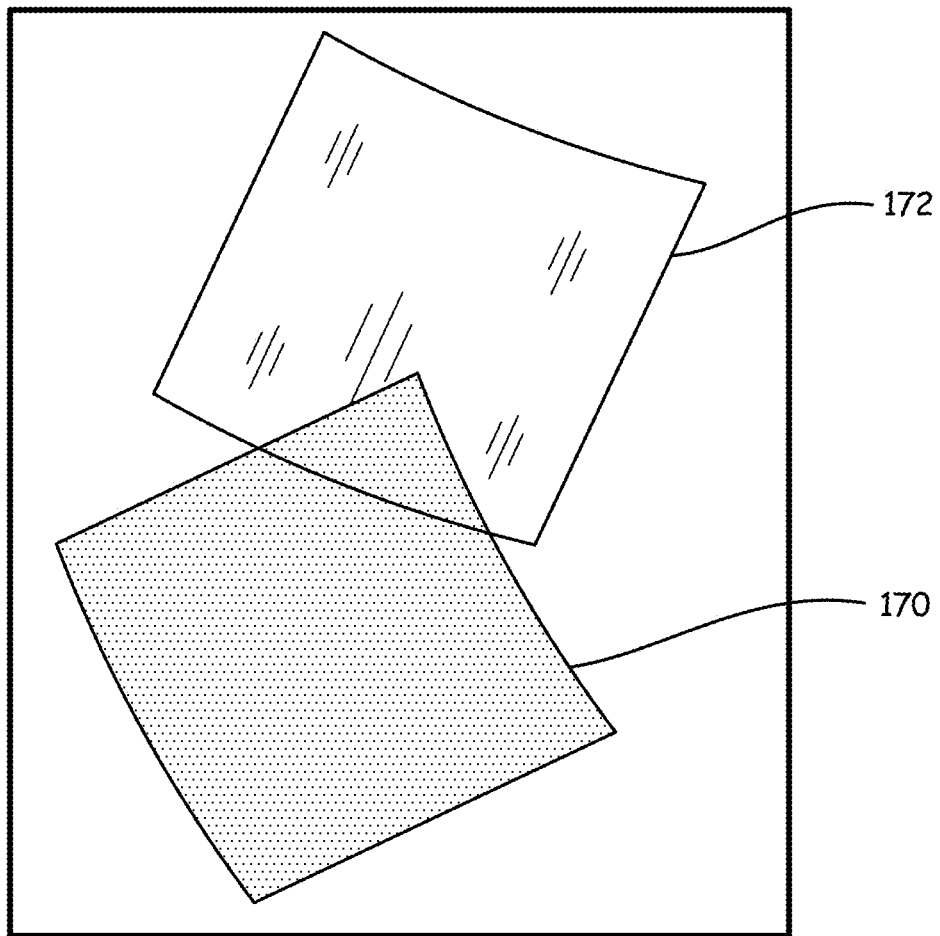
FIG. 1C illustrates a light absorbent film according to one embodiment of the present invention.

FIGS. 1A-1C illustrate an exemplary film that is useful in one embodiment of the present invention to absorb specific wavelengths of light. A plurality of film materials may be appropriate, as described in any of the embodiments included below. A film material may be chosen for a specific application based on a variety of properties. For example, a film material may be chosen for a specific hardness, scratch resistance, transparency, conductivity, etc. In one embodiment, the film is comprised of at least one absorbing compound and from a polymer material, such as any one or more of the polymer bases listed below in Table 1. As mentioned above, the polymer bases are chosen based on the type of technology the absorbing compounds are being applied to.

TABLE 1

POLYMER BASES FOR ABSORBANCE FILM

| Polymer base | Characteristics |
| --- | --- |
| Acrylic | impact modified, chemical resistance, superb weatherability, UV resistance and transparency |
| Epoxy | Resistivity to energy and heat |
| Polyamide | Thermoformability, abrasion resistance, good mechanical properties; High tensile strength and elastic modulus, impact and crack resistance |
| Polycarbonate | Impact strength even at low temperatures. dimensional stability, weather resistance, UV resistance, flame retardant, super-weather resistance and heat stability, optical properties |
| Polyester | Optics, mechanical Strength, Solvent Resistant, Tear and puncture resistant |
| Co-polyester (PETG, PCTG) | printable, scratch hardness |
| Polyethylene | Geomembrane windows, global recylability, good moisture barrier, clarity, strength, toughness |
| Polyolefin | Good chemical resistance |
| Polypropylene | High impact and puncture resistance, excellent extensibility |
| Polystyrene | good printability, high impact resistance, good dimensional stability, easy to thermoform |
| Polysolfone | high strength, amorphous thermoplastic, clarity and toughness, high-heat deflection temperature, excellent thermal stability, excellent hydrolytic stability |
| Polyurethane | Excellent laminated transparency, microbial resistance, UV stability, contains adhesion promoter, medium Durometer, Medium Modulus, Excellent Cold impact |
| Polyvinyl Chloride | Weathering resistance, abrasion resistance, chemical resistance, flow characteristics, stable electrical properties |
| Styrene Acrylonitrile | superior mechanical strength, chemical resistance, heat resistance, durability, simplicity of production, recyclability, impact strength, heat resistance, good impact resistance, excellent hygiene, sanitation and safety benefits. |

In one embodiment, any one or more of the polymers listed in Table 1 is combined with one or more absorbing compounds, for example those listed below in Table 2, to generate a film 100 that can be utilized with one or more devices, for example smartphones, laptops, tablets, glasses, or any other transparent surface utilized with an electronic display device. In one embodiment, the polymer base for the film 100 is chosen, at least in part, based on transparency, such that a user can still view a screen of an electronic display device through the film 100. In another embodiment, the polymer base is chosen, at least in part, based on its compatibility with a desired absorbing compound. In further embodiments, the polymer base is chosen based on the substrate to which the absorbing compound is incorporate in or attached to.

In accordance with one embodiment, as shown in FIG. 1A, a film 100 is applied to a device 102 with a screen 104. While FIG. 1A shows the device 102 as a smartphone, the film 100 can illustratively be designed to be applied to any other device, such as, for example the laptop 152 with film 150 over screen 154 shown in FIG. 1B. Additionally, in another embodiment, the film 100 could be incorporated into a layer of a device, such as a contact lens or lenses of a pair of glasses.

Film 100 is formed of a suitable material, such as a polymer, and one or more light absorption dyes that selectively reduce the peaks and slopes of electromagnetic emission from occupational and personal electronic devices. Other examples of electronic devices with which such a film may be used may include for example, LEDs, LCDs, computer monitors, equipment screens, televisions, tablets, cellular phones, etc. However, it could also be used on the user-end of a viewing experience, for example incorporated into contact lenses or glasses.

FIG. 1C illustrates two layers of a film 100. In one embodiment, the film includes no antiglare coating as shown by film 170. In another embodiment, the film 100 includes a coating 172, wherein the coating 172 comprises an antiglare coating 172, a hard coating 172, and/or a tack coating 172. In one embodiment, the absorbing compound may be incorporated into the coating material directly, instead of the base film layer. This may be done, for example, due to compatibility between the absorbing compound and the desired polymer substrate.

The film 100, in one embodiment, is blue-based and has a slight color tint, as a result at least in part of the absorbing compound selected and works as a filter to reduce light emission from the screen 104. In one embodiment, under a CIE light source D65, a film 100 having a 7.75 mil thickness is a light blue-green color with (L,a,b) values of (90.24, −12,64, 3.54) with X-Y-Z values of (67.14, 76.83, 78.90) respectively. In another embodiment, the film 100 appears lighter due to reduced loading.

In one embodiment, film 100 is configured to reduce light emission across a broad spectrum of light, for example, the 200 nm to the 3000 nm range. In another example, film 100 can be configured to reduce light emission in only a portion of this broad spectrum, for example, only within the visible spectrum 390 nm to 700 nm, or only within a portion of the visible spectrum, such as within the spectrum 200 nm to 1400 nm.

In one embodiment, film 100 is configured to normalize the light emission from screen 104 such that peaks of light intensity across the spectrum are reduced. In one example, the light emission intensity is normalized to a maximum absorbance level between 0.0035 and 0.0038.

In the illustrated embodiment of FIG. 1A, film 100 is configured for use with devices having touch screens (e.g. a capacitive touch screen). When used with a capacitive touch screen, such as screen 104, film 100 may be configured to have suitable electrical properties such that the user touch inputs are accurately registered by the device. For example, film 100 may have a dielectric constant that is less than 4. In another example, the dielectric constant is less than 3. In one particular embodiment, the dielectric constant of film 100 is between 2.2 and 2.5.

In one embodiment, film 100 has a thickness between 10-30 mil and a hardness above 30 Rockwell R. In one embodiment, the hardness of film 100 is between 45-125 Rockwell R.

While embodiments shown in FIGS. 1A-1C are described in the context of a film applied to an electronic device after manufacture, it is noted that the described features can be used in other applications, such as, but not limited to, application to eye wear (e.g. glasses, contacts, etc.) as well as applications on windows, for example, to protect against lasers. It may also be used on any other surface through which light is transmitted and may be received by a human eye. In one embodiment, film 100 is applied to eyewear lenses, such as corrective lens glasses, sunglasses, safety glasses, etc. While the film 100 is shown in FIGS. 1A and 1B as being applied as an aftermarket feature to a device 102, and provided to a user as shown in FIG. 1C, in another embodiment, the film 100 is included within a device 102 during a manufacture of the device 102 such that the film 100 is located behind a screen 104 or comprises the screen 104 of the device 102.

Figure 1D:
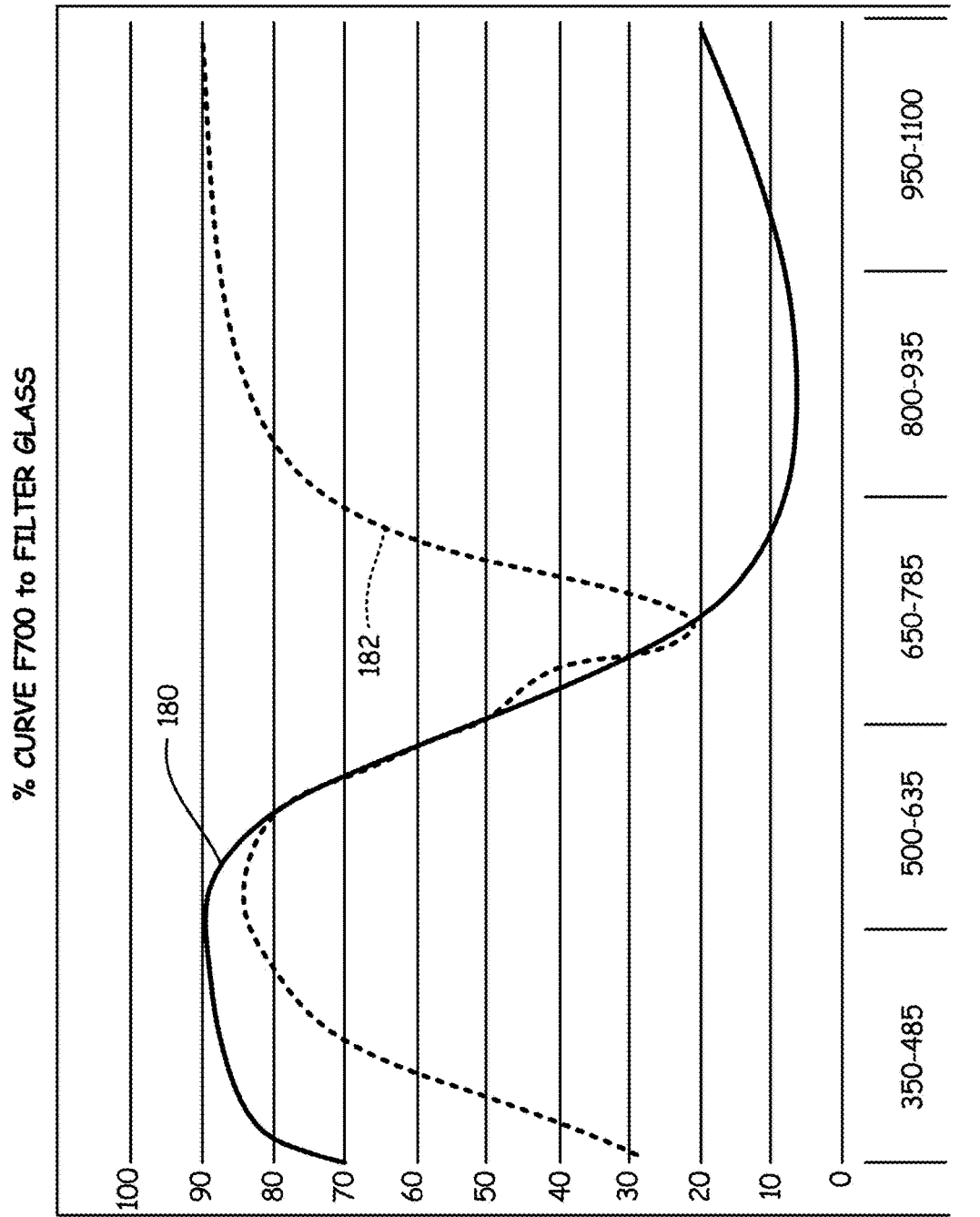
FIG. 1D illustrates a transmission curve for a light absorbent film according to one embodiment of the present invention.
Figure 1E:
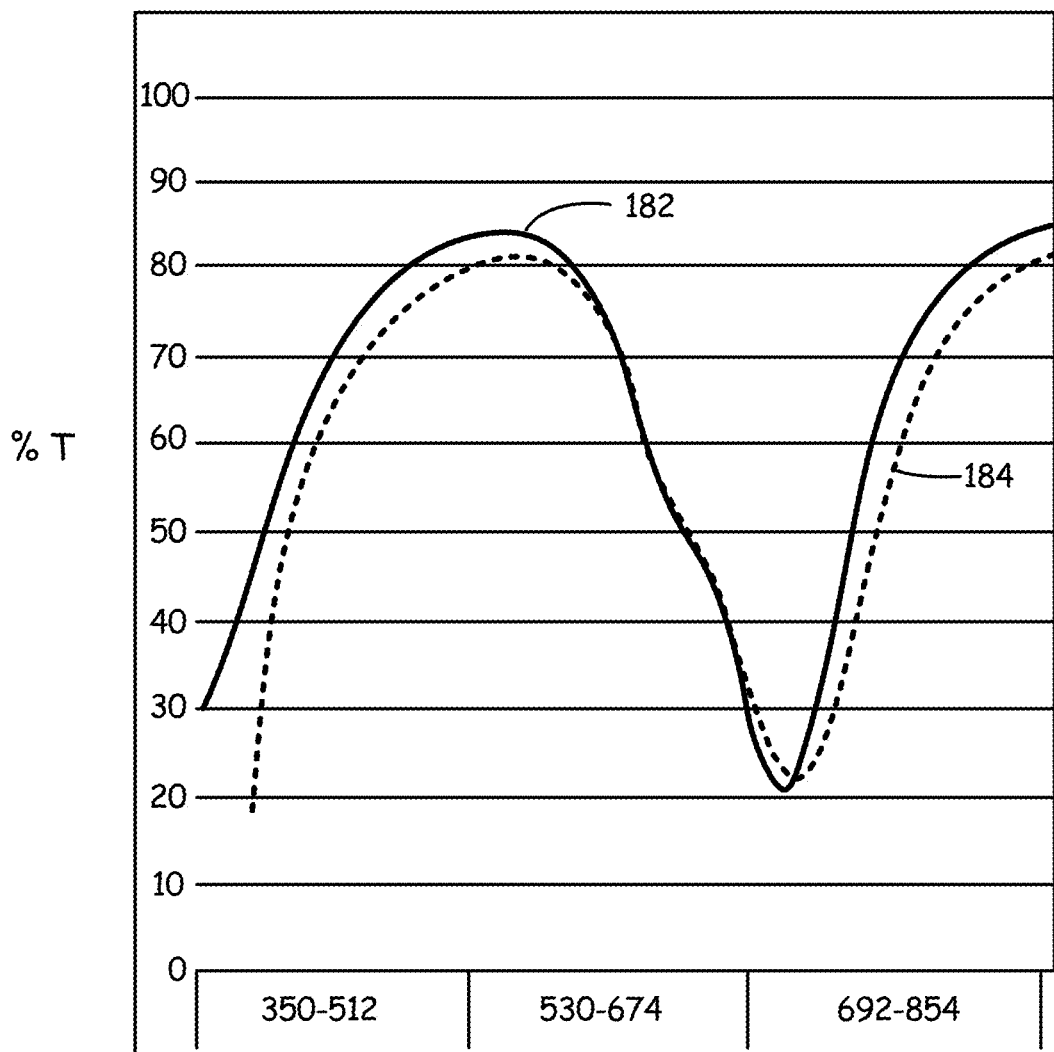
FIG. 1E illustrates a transmission curve for a light absorbent film according to one embodiment of the present invention.

FIGS. 1D-1E illustrate a plurality of transmission curves for different films that may be useful in embodiments of the present invention. The transmission characteristics of a film, for example film 100, may be defined by a transmission curve, such as those shown in FIG. 1D or 1E. Specifically, curve 180 illustrates an exemplary transmission curve of filter glass. Curve 182 illustrates an exemplary transmission curve of a film 100 with a thickness of 4 mil. Curve 184 illustrates an exemplary transmission curve for a film 100 with a thickness of 7.75 mil. The transmission curve includes a transmission local maximum in a visible light wavelength range and a first and second transmission local minimums proximate each end of the visible light wavelength range.

In one embodiment, the transmission local maximum is at a location between 575 nm and 425 nm, the first transmission local minimum being at or around a location of about 700 nm or greater, and the second transmission local minimum being at or around a location of about 300 nm or less.

The transmission local maximum may have a transmission of 85% or greater. The transmission local maximum may further have a transmission of 90% or greater. The first and second transmission local minimums may have a transmission of less than 30%, in one embodiment. In another embodiment, the first and second transmission local minimums may have a transmission of less than 5%. The transmission curve, in one embodiment, may also include a first and second 50% transmission cutoff between the respective transmission local minimums and the transmission local maximum.

The transmission curve may also include, in one embodiment, a curve shoulder formed by a reduced slope for at least of the transmission curve between 750 nm and 575 nm, which increases transmission for wavelengths at this end of the visible spectrum (e.g. red light). In one embodiment, the curve shoulder passes through a location at 644 nm±10 nm. In other embodiments, the curve shoulder may pass through a location at 580 nm±10 nm. One of the 50% transmission cutoffs may coincide with the curve shoulder, for example, at 644 nm±10 nm.

As used herein, the terms "optical density" and "absorbance" may be used interchangeably to refer to a logarithmic ratio of the amount of electromagnetic radiation incident on a material to the amount of electromagnetic radiation transmitted through the material. As used herein, "transmission" or "transmissivity" or "transmittance" may be used interchangeably to refer to the fraction or percentage of incident electromagnetic radiation at a specified wavelength that passes through a material. As used herein, "transmission curve" refers to the percent transmission of light through an optical filter as a function of wavelength. "Transmission local maximum" refers to a location on the curve (i.e. at least one point) at which the transmission of light through the optical filter is at a maximum value relative to adjacent locations on the curve. "Transmission local minimum" refers to a location on the curve at which transmission is at a minimum value relative to adjacent locations on the curve. As used herein, "50% transmission cutoff" refers to a location on the transmission curve where the transmission of electromagnetic radiation (e.g. light) through the optical filter is about 50%.

In one embodiment, the transmission characteristics of the optical filters, for example those shown in FIG. 3 below, may be achieved, in one embodiment, by using a polycarbonate film as a polymer substrate, with a blue or blue-green organic dye dispersed therein. The organic dye impregnated polycarbonate film may have a thickness less than 0.3 mm. In another embodiment, the polycarbonate film may have a thickness less than 0.1 mm. The thinness of the polycarbonate film may facilitate the maximum transmission of greater than 90% of light produced by a device. In at least one embodiment, the organic dye impregnated film may have a thickness between 2.5 mils-14 mils. The combination of the polycarbonate substrate and the blue or blue-green organic dye is used in one or more embodiments of the present disclosure to provide improved heat resistant and mechanical robustness even with the reduced thickness.

The polycarbonate film may include any type of optical grade polycarbonate such as, for example, LEXAN 123 R. Although polycarbonate provides desirable mechanical and optical properties for a thin film, other polymers may also be used such as a cyclic olefin copolymer (COC).

In one embodiment, similar transmission characteristics may also be achieved, for example, by using an acrylic film with a blue-green organic dye dispersed therein. The organic dye impregnated acrylic film may have a thickness less than 0.3 mm. In another embodiment, the acrylic film may have a thickness less than 0.1 mm. The thinness of the acrylic film may facilitate the maximum transmission of greater than 90% of light produced by a device. In at least one embodiment, the organic dye impregnated film may have a thickness between 2.5 mils-14 mils. The combination of the acrylic substrate and the blue green organic dye may be used, in one or more embodiments, to provide improved heat resistant and mechanical robustness even with the reduced thickness.

In another embodiment, similar transmission characteristics may also be achieved, for example, by using an epoxy film with a blue-green organic dye dispersed therein. The organic dye impregnated epoxy film may have a thickness less than 0.1 mm. In another embodiment, the epoxy film may have a thickness less than 1 mil. The thinness of the epoxy film may facilitate the maximum transmission of greater than 90% of light produced by a device. The combination of the epoxy substrate and the blue green organic dye may be used, in one or more embodiments, to provide improved heat resistant and mechanical robustness even with the reduced thickness.

In a further embodiment, similar transmission characteristics may also be achieved, for example, by using a PVC film with a blue-green organic dye dispersed therein. The organic dye impregnated PVC film may have a thickness less than 0.1 mm. In another embodiment, the PVC film may have a thickness less than 1 mil. The thinness of the PVC film may facilitate the maximum transmission of greater than 90% of light produced by a device. The combination of the PVC substrate and the blue green organic dye may be used, in one or more embodiments, to provide improved heat resistant and mechanical robustness even with the reduced thickness.

The organic dye impregnated polycarbonate film may, in one embodiment, also have the desired optical characteristics at this reduced thickness with a parallelism of up to 25 arcseconds and a 0-30° chief ray of incident angle. In a preferred embodiment, the angle of incidence is within the range of 0-26°. The organic dye impregnated polycarbonate film may further provide improved UV absorbance with an optical density of greater than 5 in the UV range. The exemplary combination of a polycarbonate substrate with a blue-green dye is provided for example purposes only. It is to be understood that any of the absorbing compounds described in detail below could be combined with any of the polymer substrates described above to generate a film with the desired mechanical properties and transmissivity.

Embodiments of the optical filter 100, as described herein, may be used for different applications including, without limitation, as a light filter to improve color rendering and digital imaging, an LCD retardation film with superior mechanical properties, an excellent UV absorbance, a light emission reducing film for an electronic device to reduce potentially harmful wavelengths of light, and an optically correct thin laser window with high laser protection values. In these embodiments, the optical filter may be produced as a thin film with the desired optical characteristics for each of the applications.

In some embodiments, the color rendering index (CRI) change due to the disclosed invention is minimal. For example, the difference in the CRI value before and after application of the disclosed invention to an electronic device may be between one and three. Therefore, when the disclosed invention is applied to the display of an electronic device, a user viewing the display will see minimal, if any, change in color and all colors will remain visible.

Absorbance and Absorbing Materials

Absorbance of wavelengths of light occurs as light encounters a compound. Rays of light from a light source are associated with varying wavelengths, where each wavelength is associated with a different energy. When the light strikes the compound, energy from the light may promote an electron within that compound to an anti-bonding orbital. This excitation occurs, primarily, when the energy associated with a particular wavelength of light is sufficient to excite the electron and, thus, absorb the energy. Therefore, different compounds, with electrons in different configurations, absorb different wavelengths of light. In general, the larger the amount of energy required to excite an electron, the lower the wavelength of light required. Further, a single compound may absorb multiple wavelength ranges of light from a light source as a single compound may have electrons present in a variety of configurations.

Figure 2A:
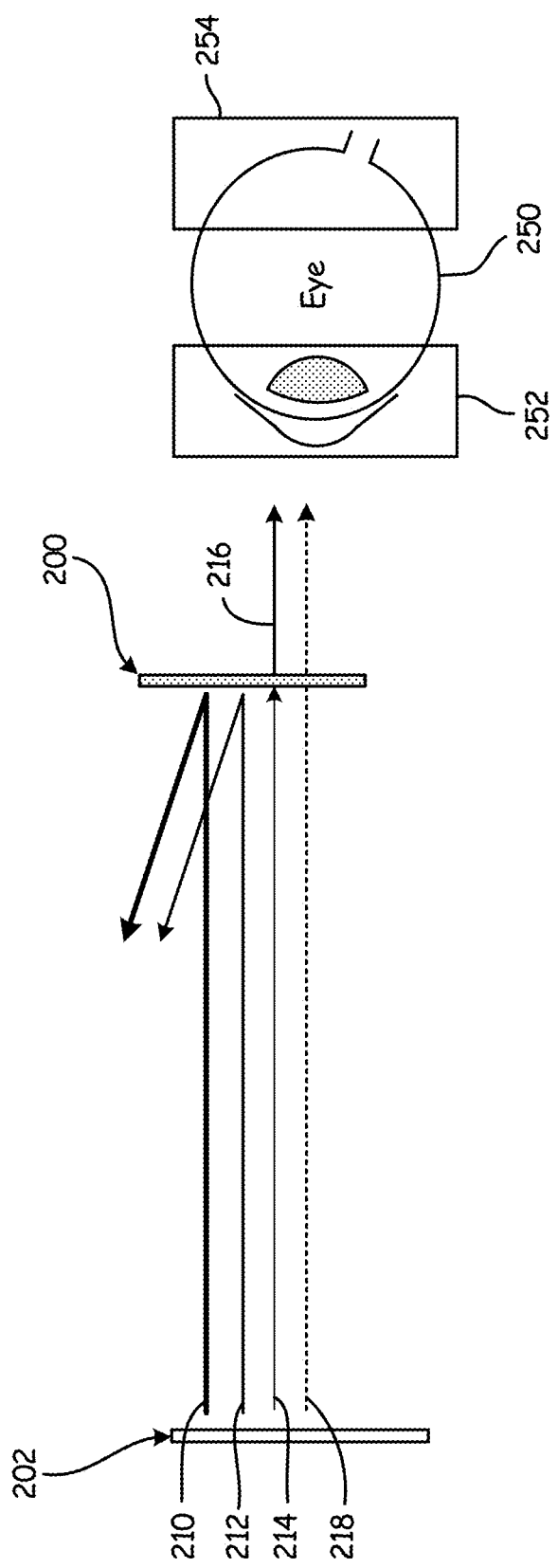
FIG. 2A illustrates an exemplary interaction between an eye and a device with a light absorbent film according to one embodiment of the present invention.

FIG. 2A illustrates an exemplary interaction between a device and an eye with an exemplary film that may be useful in one embodiment of the present invention. In one embodiment, the film 200 comprises a film placed on the device 202, for example as an after-market addition. In another embodiment, the film 200 comprises a portion of the device 202, for example the screen of device 202. In a further embodiment, the film is a physical barrier worn on or near the eye 250, for example as a contact lens, or as part of the lenses of a pair of glasses; either as an after-market application or part of the lenses themselves.

As shown in FIG. 2A, device 202 produces a plurality of wavelengths of light including, high intensity UV light 210, blue violet light 212, blue turquoise light 214 and visible light 218. High intensity UV light may comprise, in one embodiment, wavelengths of light in the 315-380 nm range. Light in this wavelength range is known to possibly cause damage to the lens of an eye. In one embodiment, blue-violet light 212 may comprise wavelengths of light in the 380-430 nm range and is known to potentially cause age-related macular degeneration. Blue-turquoise light 214 may comprise light in the 430-500 nm range and is known to affect the sleep cycle and memory. Visible light 218 may also comprise other wavelengths of light in the visible light spectrum.

As used herein, "visible light" or "visible wavelengths" refers to a wavelength range between 380 nm to 750 nm. "Red light" or "red wavelengths" refers to a wavelength range between about 620 nm to 675 nm. "Orange light" or "orange wavelengths" refers to a wavelength range between about 590 nm to 620 nm. "Yellow light" or "yellow wavelengths" refers to a wavelength range between about 570 nm to 590 nm. "Green light" or "green wavelengths" refers to a wavelength range between about 495 nm to 570 nm. "Blue light" or "blue wavelengths" refers to a wavelength range between about 450 nm to 495 nm. "Violet light" or "violet wavelengths" refers to a wavelength range between about 380 nm to 450 nm. As used herein, "ultraviolet" or "UV" refers to a wavelength range that includes wavelengths below 350 nm, and as low as 10 nm. "Infrared" or "IR" refers to a wavelength range that includes wavelengths above 750 nm, and as high as 3,000 nm.

When a particular wavelength of light is absorbed by a compound, the color corresponding to that particular wavelength does not reach the human eye and, thus, is not seen. Therefore, for example, in order to filter out UV light from a light source, a compound may be introduced into a film that absorbs light with a wavelength below 350 nm. A list of some exemplary light-absorbing compounds for various ranges of wavelengths are presented in Table 2 below and correspond to exemplary absorption spectra illustrated in FIG. 2D. The absorbing materials used in the disclosed invention achieve protection for the individual while simultaneously leaving the color imagery of the device intact. Therefore, the absorbing compounds ideally block only a portion of the wavelength ranges for each color, so that each hue is still visible to the individual viewing the screen of the electronic device. Further, the wavelength ranges that are blocked may be wavelength ranges for a color that are not visible to a person. Therefore, in some embodiments, the disclosed invention is a neutral density filter allowing for full color recognition.

TABLE 2

ABSORBING MATERIALS AND WAVELENGTH RANGES

| Exemplary Polymer Substrate | 260-400 nm Target Range | 400-700 nm Target Range | Infrared Target Range |
|---|---|---|---|
| Polycarbonate | 1002 | 1004 | 1006 |
| PVC | 1008 | 1010 | 1020 |
| Epoxy | 1022 | 1018 | 1026 |
| Polyester | 1028 | 1024 | 1032 |
| Polyethylene | 1040 | 1030 | 1038 |
| Polyamide | 1046 | 1036 | 1044 |
|  |  | 1042 | 1050 |
|  |  | 1048 |  |

In one embodiment, a film 200 is manufactured by choosing one of the substrates from the first column of Table 2 and selecting one absorbing column from one or more of columns 2-4, depending on the wavelength range to be targeted for absorption. In an embodiment, a UV-targeting absorbing compound is not needed when the polymer substrate contains a UV inhibitor, a UV stabilizer, or otherwise inherently possesses UV absorbing properties. Absorbing compounds then can be selected from any of the columns 2-4 for addition in order to increase absorption of light produced in the target wavelength ranges. Absorbing compounds can be selected in combination, provided that high transmission of light is maintained, and the color tint is maintained, such that color integrity produced by a device remains true. In one embodiment, the absorbing compounds are provided in a polymer or pellet form and coextruded with the polymer substrate to produce the film 200. In another embodiment, the absorbing compound is provided in a separate layer from the polymer substrate, for example as a component in a coating layer applied to the polymer substrate, or an additional scratch resistance layer.

Additionally, many of the exemplary compounds described in each of columns 2, 3 and 4 can be substituted to produce the desired characteristics in other polymer substrates. For example, while compound 1002 is listed as an ideal compound for combination with a polycarbonate substrate, compound 1002 is also known as a compatible compound for impregnation with PVC, acetals and cellulose esters. Some potential exemplary combinations of the compounds and polymer substrates presented in Table 2 are described in further detail in the examples below. However, it is to be understood that other possible combinations, including with polymer substrates listed in Table 1 and not presented again in Table 2, are possible.

In one embodiment, the organic dye dispersed in the polymer substrate provides selective transmission characteristics including, for example, reducing transmissivity for blue light wavelengths and/or red-light wavelengths. The reduction of these unnaturally high emissivity levels of a particular band or wavelength to a level more representative of daylight helps to decrease some of the undesirable effects of the use of digital electronic devices. In addition, the optical film may reduce the HEV light in the range that is emitted by a device 202. However, the optical film 200 is, in one embodiment, also configured in order to allow other blue wavelengths of light, for example the color cyan, through in order to preserve color rendition by the device 202.

Polycarbonate Example

In one embodiment, the film 200 comprises a polycarbonate substrate impregnated with an absorbing compound 1002 selected to target light produced in the 260-400 nm range. In one embodiment, absorbing compound 1002, is selected for a peak absorption in the 300-400 nm range. One exemplary absorbing compound is, for example, TINUVIN®, provided by Ciba Specialty Chemicals, also known as 2-(2H-benzotriazol-2-yl)-p-cresol. However, any other exemplary absorbing compound with strong absorption characteristics in the 300 nm-400 nm range would also be suitable for absorbing UV light. In an embodiment where TINUVIN® is utilized to provide UV protection, other polymer substrates, such as those listed in Table 1, would also be suitable for the generation of film 200.

In one embodiment, the film 200 comprises a polycarbonate substrate impregnated with an absorbing compound 1004 selected to target light produced in the 400 nm-700 nm range. In one embodiment, absorbing compound 1004 is selected for a peak absorption in the 400 nm-700 nm range. Specifically, in one embodiment, absorbing compound 1004 is selected for peak absorption in the 600 nm-700 nm range. Even more specifically, in one embodiment, absorbing compound is selected for peak absorption in the 635 nm-700 nm range. One exemplary absorbing compound is a proprietary compound produced by EXCITON®, with commercial name ABS 668. However, any other exemplary absorbing compound with strong absorption in the 600 nm-700 nm range of the visible spectrum may also be suitable for the generation of film 200. In another embodiment, compound 1004 may also be combined with a different polymer substrate from Table 1.

In one embodiment, the film 200 comprises a polycarbonate substrate impregnated with an absorbing compound 1006 selected to target light produced in the infrared range. In one embodiment, absorbing compound 1006 is selected to target light produced in the 800 nm-1100 nm range. Specifically, in one embodiment, absorbing compound 1006 is selected for a peak absorption in the 900 nm-1000 nm range. One exemplary compound may be the NIR1002A dye produced by QCR Solutions Corporation. However, any other exemplary absorbing compound with strong absorption in the infrared range may also be suitable for the generation of film 200. In another embodiment, compound 1006 may also be combined with a different polymer substrate from Table 1.

In one embodiment, a polymer substrate is impregnated with a combination of compounds 1002, 1004, and 1006 such that any two of compounds 1002, 1004, and 1006 are both included to form film 200. In another embodiment, all three of compounds 1002, 1004, and 1006 are combined within a polymer substrate to form film 200.

In another embodiment, the polycarbonate substrate is provided in a film 200 along with any one of compounds 1002, 1008, 1022, 1028, 1040 or 1046. This may be, in one embodiment, in combination with any one of compounds 1004, 1010, 1018, 1024, 1030, 1036, 1042 or 1048. This may be, in one embodiment, in combination with any one of compounds 1006, 1020, 1026, 1032, 1038, 1044 or 1050.

PVC Filter Example

In one embodiment, the film 200 comprises a poly-vinyl chloride (PVC) substrate impregnated with an absorbing compound 1008 selected to target light produced in the 260-400 nm range. In one embodiment, absorbing compound 1008, is selected for a peak absorption in the 320-380 nm range. One exemplary absorbing compound is DYE VIS 347, produced by Adam Gates & Company, LLC. However, any other exemplary absorbing compound with strong absorption characteristics in the 300 nm-400 nm range would also be suitable for absorbing UV light. In an embodiment where DYE VIS 347 is utilized to provide UV protection, other polymer substrates, such as those listed in Table 1, would also be suitable for the generation of film 200.

In one embodiment, the film 200 comprises a PVC substrate impregnated with an absorbing compound 1010 selected to target light produced in the 400 nm-700 nm range. Specifically, in one embodiment, absorbing compound 1010 is selected for peak absorption in the 550 nm-700 nm range. Even more specifically, in one embodiment, absorbing compound is selected for peak absorption in the 600 nm-675 nm range. One exemplary absorbing compound is ADS640PP, produced by American Dye Source, Inc., also known as 2-[5-(1,3-Dihydro-3,3-dimethyl-1-propyl-2H-indol-2-ylidene)-1,3-pentadienyl]-3,3-dimethyl-1-propyl-3H-indolium perchlorate. However, any other exemplary absorbing compound with strong absorption in the 600 nm-700 nm range of the visible spectrum may also be suitable for the generation of film 200. In another embodiment, compound 1010 may also be combined with a different polymer substrate from Table 1.

In one embodiment, a polymer substrate is impregnated with a combination of compounds 1008 and 1010. In another embodiment, the PVC substrate is provided in a film 200 along with any one of compounds 1002, 1008, 1022, 1028, 1040 or 1046. This may be, in one embodiment, in combination with any one of compounds 1004, 1010, 1018, 1024, 1030, 1036, 1042 or 1048. This may be, in one embodiment, in combination with any one of compounds 1006, 1020, 1026, 1032, 1038, 1044 or 1050.

Epoxy Example

In one embodiment, the film 200 comprises an epoxy substrate impregnated with an absorbing compound 1016 selected to target light produced in the 260 nm-400 nm range. In one embodiment, absorbing compound 1016, is selected for a peak absorption in the 300 nm-400 nm range. Specifically, in one embodiment, absorbing compound 1016 is selected for peak absorption in the 375 nm-410 nm range. One exemplary absorbing compound is, for example, ABS 400, produced by Exciton, with a peak absorbance at 399 nm. However, any other exemplary absorbing compound with strong absorption characteristics in the 300 nm-400 nm range would also be suitable for absorbing UV light. In an embodiment where ABS 400 is utilized to provide UV protection, other polymer substrates, such as those listed in Table 1, may also be suitable for the generation of film 200.

In one embodiment, the film 200 comprises an epoxy substrate impregnated with an absorbing compound 1018 selected to target light produced in the 400 nm-700 nm range. In one embodiment, absorbing compound 1018 is selected for a peak absorption in the 400 nm-700 nm range. Specifically, in one embodiment, absorbing compound 1018 is selected for peak absorption in the 600 nm-700 nm range. Even more specifically, in one embodiment, absorbing compound is selected for peak absorption in the 650 nm-690 nm range. One exemplary absorbing compound is a proprietary compound produced by QCR Solutions Corporation, with commercial name VIS675F and peak absorption, in chloroform, at 675 nm. However, any other exemplary absorbing compound with strong absorption in the 600 nm-700 nm range of the visible spectrum may also be suitable for the generation of film 200. In another embodiment, compound 1018 may also be combined with a different polymer substrate from Table 1.

In one embodiment, the film 200 comprises an epoxy substrate impregnated with an absorbing compound 1020 selected to target light produced in the infrared range. In one embodiment, absorbing compound 1020 is selected to target light produced in the 800 nm-1100 nm range. Specifically, in one embodiment, absorbing compound 1020 is selected for a peak absorption in the 900 nm-1080 nm range. In one embodiment, absorbing compound is a proprietary compound produced by QCR Solutions Corporation, with commercial name NIR1031M, and peak absorption, in acetone, at 1031 nm. However, any other exemplary absorbing compound with strong absorption in the infrared range may also be suitable for the generation of film 200. In another embodiment, compound 1020 may also be combined with a different polymer substrate from Table 1.

In one embodiment, a polymer substrate is impregnated with a combination of compounds 1016, 1018, and 1020 such that any two of compounds 1016, 1018, and 1020 are both included to form film 200. In another embodiment, all three of compounds 1016, 1018, and 1020 are combined within a polymer substrate to form film 200.

In another embodiment, the epoxy substrate is provided in a film 200 along with any one of compounds 1002, 1008, 1022, 1028, 1040 or 1046. This may be, in one embodiment, in combination with any one of compounds 1004, 1010, 1018, 1024, 1030, 1036, 1042 or 1048. This may be, in one embodiment, in combination with any one of compounds 1006, 1020, 1026, 1032, 1038, 1044 or 1050.

Polyamide Example

In one embodiment, the film 200 comprises a polyamide substrate impregnated with an absorbing compound 1022 selected to target light produced in the 260 nm-400 nm range. In one embodiment, absorbing compound 1022, is selected for a peak absorption in the 260 nm-350 nm range. One exemplary absorbing compound is, for example, produced by QCR Solutions Corporation with product name UV290A. However, any other exemplary absorbing compound 1022 with strong absorption characteristics in the 260 nm-400 nm range would also be suitable for absorbing UV light. In an embodiment where UV290A is utilized to provide UV protection, other polymer substrates, such as those listed in Table 1, would also be suitable for the generation of film 200.

In one embodiment, the film 200 comprises a polyamide substrate impregnated with an absorbing compound 1024 selected to target light produced in the 400 nm-700 nm range. In one embodiment, absorbing compound 1024 is selected for a peak absorption in the 600 nm-700 nm range. Specifically, in one embodiment, absorbing compound 1024 is selected for peak absorption in the 620 nm-700 nm range. One exemplary absorbing compound is a proprietary compound produced by Adam Gates & Company, LLC with product name DYE VIS 670, which also has an absorption peak between 310 nm and 400 nm. However, any other exemplary absorbing compound with strong absorption in the 600 nm-700 nm range of the visible spectrum may also be suitable for the generation of film 200. In another embodiment, compound 1024 may also be combined with a different polymer substrate from Table 1.

In one embodiment, the film 200 comprises a polyamide substrate impregnated with an absorbing compound 1026 selected to target light produced in the infrared range. In one embodiment, absorbing compound 1026 is selected to target light produced in the 800 nm-1200 nm range. Specifically, in one embodiment, absorbing compound 1026 is selected for a peak absorption in the 900 nm-1100 nm range. One exemplary absorbing compound is a proprietary compound produced by QCR Solutions Corporation, with product name NIR1072A, which has an absorbance peak at 1072 nm in acetone. However, any other exemplary absorbing compound with strong absorption in the infrared range may also be suitable for the generation of film 200. In another embodiment, compound 1026 may also be combined with a different polymer substrate from Table 1.

In one embodiment, a polymer substrate is impregnated with a combination of compounds 1022, 1024, and 1026 such that any two of compounds 1022, 1024, and 1026 are both included to form film 200. In another embodiment, all three of compounds 1022, 1024, and 1026 are combined within a polymer substrate to form film 200.

In another embodiment, the polyamide substrate is provided in a film 200 along with any one of compounds 1002, 1008, 1022, 1028, 1040 or 1046. This may be, in one embodiment, in combination with any one of compounds 1004, 1010, 1018, 1024, 1030, 1036, 1042 or 1048. This may be, in one embodiment, in combination with any one of compounds 1006, 1020, 1026, 1032, 1038, 1044 or 1050.

Polyester Example

In one embodiment, the film 200 comprises a polyester substrate impregnated with an absorbing compound 1036 selected to target light produced in the 400 nm-700 nm range. In one embodiment, absorbing compound 1036 is selected for a peak absorption in the 600 nm-750 nm range. Specifically, in one embodiment, absorbing compound 1036 is selected for peak absorption in the 670 nm-720 nm range. One exemplary absorbing compound is a proprietary compound produced by EXCITON®, with commercial name ABS 691, which has an absorption peak at 696 nm in polycarbonate. However, any other exemplary absorbing compound with strong absorption in the 600 nm-700 nm range of the visible spectrum may also be suitable for the generation of film 200. In another embodiment, compound 1036 may also be combined with a different polymer substrate from Table 1.

In one embodiment, the film 200 comprises a polyester substrate impregnated with an absorbing compound 1038 selected to target light produced in the infrared range. In one embodiment, absorbing compound 1038 is selected to target light produced in the 800 nm-1300 nm range. Specifically, in one embodiment, absorbing compound 1038 is selected for a peak absorption in the 900 nm-1150 nm range. One exemplary absorbing compound 1038 is a proprietary compound produced by Adam Gates & Company, LLC, with product name IR Dye 1151, which has an absorbance peak at 1073 nm in methyl-ethyl ketone (MEK). However, any other exemplary absorbing compound with strong absorption in the infrared range may also be suitable for the generation of film 200. In another embodiment, compound 1038 may also be combined with a different polymer substrate from Table 1.

In one embodiment, a polymer substrate is impregnated with a combination of compounds 1036, and 1038. In another embodiment, the polyester substrate is provided in a film 200 along with any one of compounds 1002, 1008, 1022, 1028, 1040 or 1046. This may be, in one embodiment, in combination with any one of compounds 1004, 1010, 1018, 1024, 1030, 1036, 1042 or 1048. This may be, in one embodiment, in combination with any one of compounds 1006, 1020, 1026, 1032, 1038, 1044 or 1050.

Polyethylene Example

In one embodiment, the film 200 comprises a polyethylene substrate impregnated with an absorbing compound 1042 selected to target light produced in the 400 nm-700 nm range. In one embodiment, absorbing compound 1042 is selected for a peak absorption in the 600 nm-750 nm range. Specifically, in one embodiment, absorbing compound 1042 is selected for peak absorption in the 670 nm-730 nm range. One exemplary absorbing compound is a proprietary compound produced by Moleculum, with commercial name LUM690, which has an absorption peak at 701 nm in chloroform. However, any other exemplary absorbing compound with strong absorption in the 600 nm-700 nm range of the visible spectrum may also be suitable for the generation of film 200. In another embodiment, compound 1042 may also be combined with a different polymer substrate from Table 1.

In one embodiment, the film 200 comprises a polyethylene substrate impregnated with an absorbing compound 1044 selected to target light produced in the infrared range. In one embodiment, absorbing compound 1044 is selected to target light produced in the 800 nm-1100 nm range. Specifically, in one embodiment, absorbing compound 1044 is selected for a peak absorption in the 900 nm-1100 nm range. One exemplary absorbing compound is a proprietary compound produced by Moleculum, with commercial name LUM1000A, which has an absorption peak at 1001 nm in chloroform. However, any other exemplary absorbing compound with strong absorption in the infrared range may also be suitable for the generation of film 200. In another embodiment, compound 1044 may also be combined with a different polymer substrate from Table 1.

In one embodiment, a polymer substrate is impregnated with a combination of compounds 1040, 1042, and 1044 such that any two of compounds 1040, 1042, and 1044 are both included to form film 200. In another embodiment, all three of compounds 1040, 1042, and 1044 are combined within a polymer substrate to form film 200.

In another embodiment, the polycarbonate substrate is provided in a film 200 along with any one of compounds 1002, 1008, 1022, 1028, 1040 or 1046. This may be, in one embodiment, in combination with any one of compounds 1004, 1010, 1018, 1024, 1030, 1036, 1042 or 1048. This may be, in one embodiment, in combination with any one of compounds 1006, 1020, 1026, 1032, 1038, 1044 or 1050.

Other Exemplary Embodiments

The blue green organic absorbing compound may be selected to provide the selective transmission and/or attenuation at the desired wavelengths (e.g. by attenuating blue light relative to red light). The blue green organic dye may include, for example, a blue green phthalocyanine dye that is suitable for plastic applications and provides good visible transmittance, light stability, and thermal stability with a melting point of greater than 170° C. The organic dye impregnated polycarbonate compound may include about 0.05% to 2% absorbing compound, by weight. The blue green phthalocyanine dye may be in the form of a powder that can be dispersed in a molten polycarbonate during an extruding process. The blue-green dye may also be dispersed within polycarbonate resin beads prior to an extruding process.

In another embodiment, one or more additional dyes may be dispersed within the film. To add infrared protection, for example, an additional IR filtering dye may be used to provide an optical density of 9 or greater in the IR range. One example of an IR filtering dye may include LUM1000A. The organic dye impregnated polycarbonate mixture may include about 0.05% to 2% absorbing compound, by weight.

In one embodiment, an optical filter for a digital electronic device is provided with defined electromagnetic radiation transmission characteristics with selective transmission at visible wavelengths. In one embodiment, the optical filter is engineered to block or reduce transmission of light in a plurality of wavelength ranges, for example in both the blue light wavelength range and the red-light wavelength range. The optical filter may be used for a variety of applications including, without limitation, a light filter, a light emission reducing film for electronic devices, and an LCD retardation film. The optical filter is made of a composition including, in one embodiment, an organic dye dispersed or impregnated in a polymer substrate such as polycarbonate film. In another embodiment, any one or more polymer substrates may be selected from Table 1, above.

As shown in FIG. 2A, light of wavelengths 210, 212, 214 and 218 is generated by the device 202. These wavelengths of light then encounter the film 200, in one embodiment. When the wavelengths of light encounter the film 200, the film 200 is configured to allow only some of the wavelengths of light to pass through. For example, in one embodiment as shown in FIG. 2A, UV light is substantially prevented from passing through the film 200. Blue-violet light is also substantially prevented from passing through the film 200. Blue-turquoise light 214 is at least partially prevented from passing through the film 200, while allowing through some other ranges of blue light wavelengths 216 through. These may, in one embodiment, comprise wavelengths of light in the cyan color range. However, visible light 218, which may be safe for a user to view, is allowed to pass through the film in one embodiment. Once the wavelengths of light have encountered and passed through film 200, in one embodiment, they are then perceived by a human eye of a user using the device 202. In one embodiment, as shown in FIG. 2A, a region of the eye 252 is known to be highly affected by UV light, and a region of the eye 254 is known to be highly affected by blue light. By interposing a film 200 between the device 202 and the eye 250, the light rays likely to cause damage to the eye in regions 252 and 254 are thus substantially prevented from reaching the eye of a user.

Figure 2B:
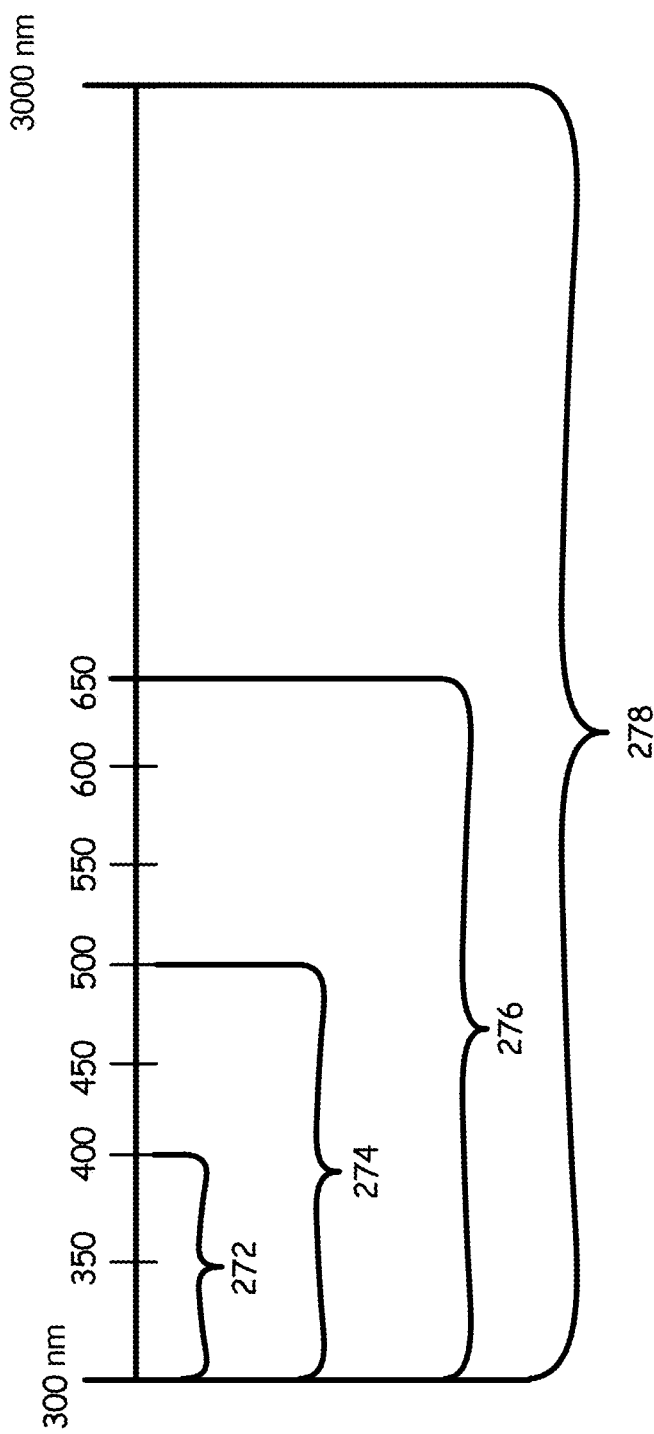
FIG. 2B illustrates exemplary effectiveness wavelength absorbance ranges for light absorbent films.

FIG. 2B illustrates exemplary effectiveness wavelength absorbance ranges of a plurality of films that may be useful in one embodiment of the present invention. Film 200 may comprise, in one embodiment, a one or more absorption compounds configured to absorb light in one or more wavelength ranges. A range of wavelengths may be blocked by a film 272, in one embodiment, where at least some rays of light in the ranges of 300 nm-400 nm are blocked from reaching the eye of a user by film 272, but the remainder of the wavelength spectrum is substantially unaffected. In another embodiment, a film 274 substantially reduces light in the 300 nm-500 nm range from reaching the eye of a user, but the remainder of the wavelength spectrum is substantially unaffected. In another embodiment, a film 276 substantially reduces light in the 300 nm-650 nm range from reaching the eye of a user, but the remainder of the wavelength spectrum is substantially unaffected. In a further embodiment, film 278 reduces the amount of light in the 300 nm-3,000 nm range from reaching the eye of a user, but the remainder of the wavelength spectrum is substantially unaffected. Depending on different conditions affecting a user of a device 202, different films 272, 274, 276, and 278 may be applied to the user's devices 202 in order to treat or prevent a medical condition.

Figures 1, 2C:
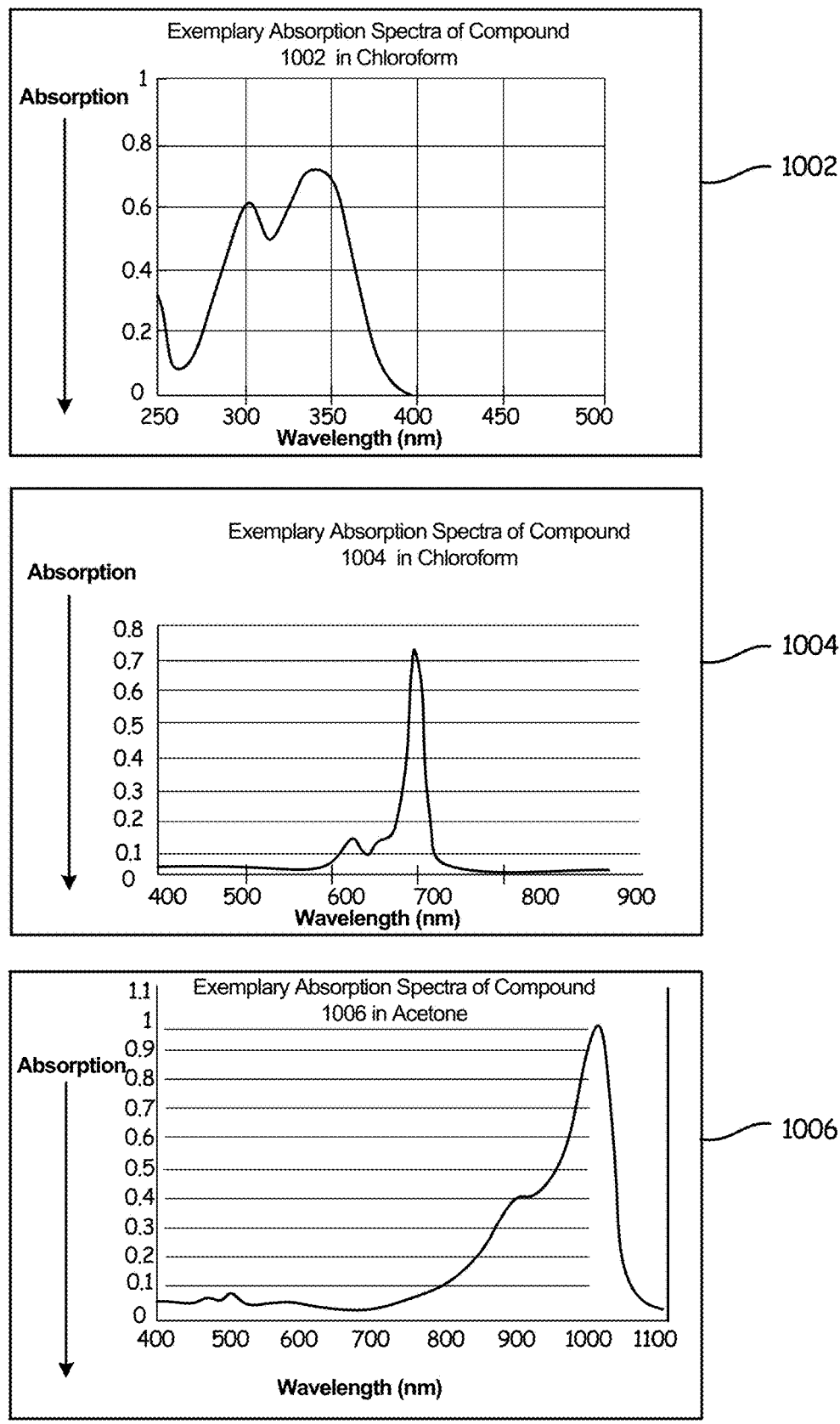
FIG. 2C-1 illustrates a plurality of absorbing compounds that may be utilized to achieve the desired characteristics of one embodiment of a light absorbent film.
Figures 2, 2C:
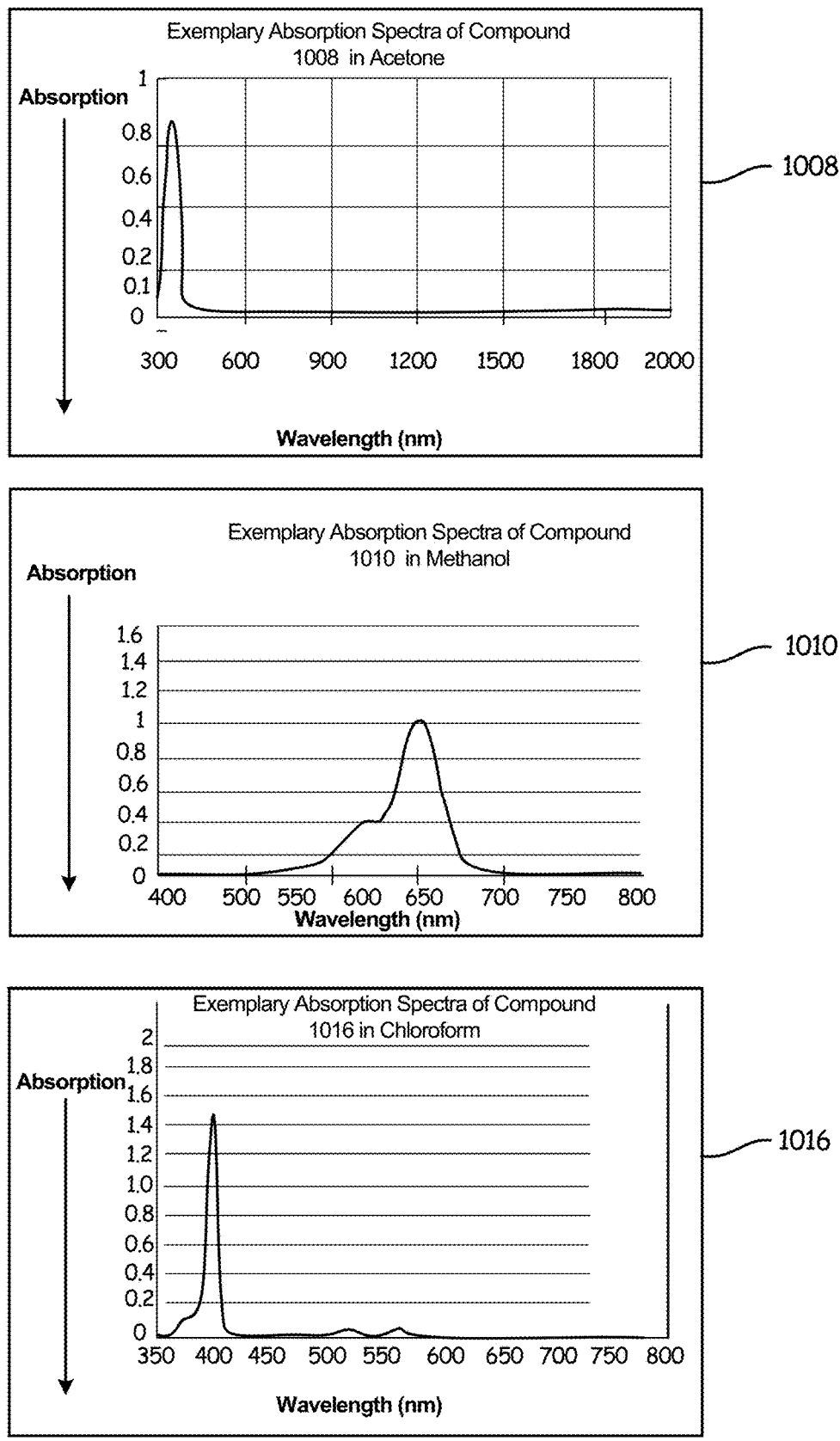
Figure 2C:
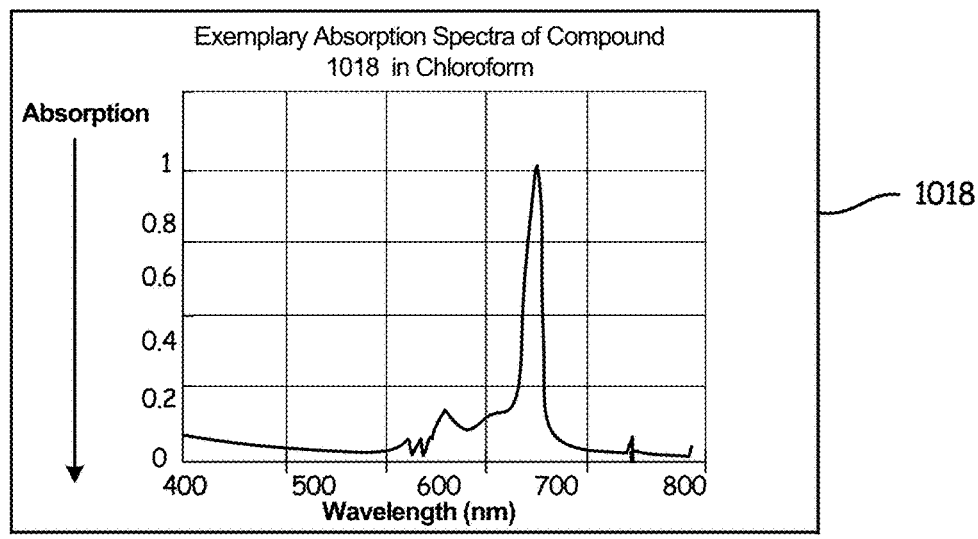
Figure 2:
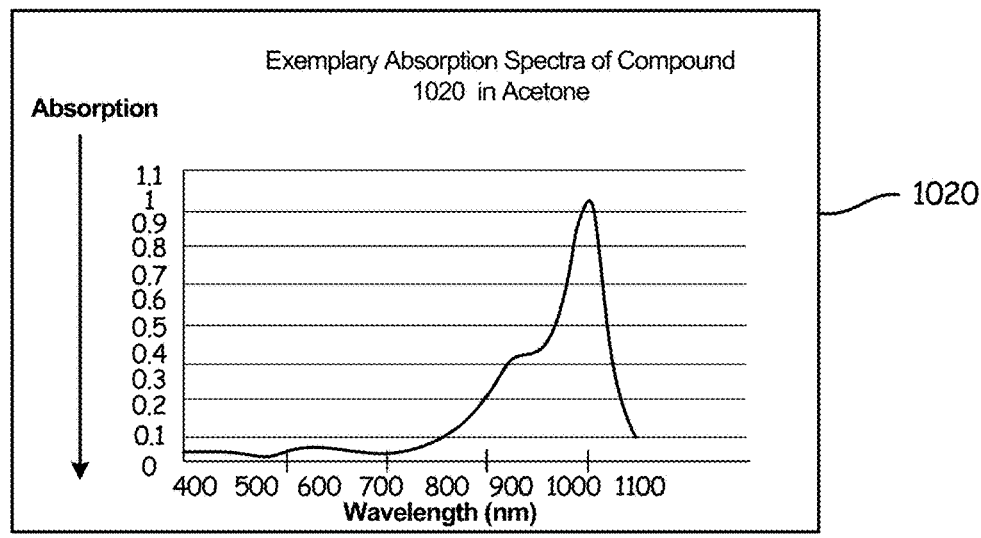

FIG. 2C, and the examples above, illustrate a plurality of absorbing compound spectra that may be utilized, either alone or in combination, to achieve the desired characteristics of a film, in one embodiment of the present invention. In one embodiment, one or more of the absorbing agents illustrated in FIG. 2C are impregnated within a polymer substrate to achieve the desired transmissivity.

In one embodiment, film 272 is configured to substantially block 99.9% of UV light, 15-20% of HEV light, and 15-20% of photosensitivity (PS) light. In one embodiment, film 272 comprises a UV-inhibiting polycarbonate substrate with a thickness of at least 5 mils. In one embodiment, the thickness is less than 10 mils. In one embodiment, film 272 also comprises a UV-inhibiting additive, comprising at least 1% of the film 272. In one embodiment, the UV-inhibiting additive comprises at least 2% of the film, but less than 3% of the film 272. In one embodiment, film 272 also comprises a hard coat. In one embodiment, film 272 can also be characterized as having an optical density that is at least 3 in the 280 nm-380 nm range, at least 0.7 in the 380 nm-390 nm range, at least 0.15 in the 390 nm-400 nm range, at least 0.09 in the 400 nm-600 nm range, and at least 0.04 in the 600 nm-700 nm range.

In one embodiment, film 274 substantially blocks 99.9% of UV light, 30-40% of HEV light, and 20-30% of PS light. In one embodiment, film 274 comprises a UV-inhibiting polycarbonate substrate with a thickness of at least 5 mils. In one embodiment, the thickness is less than 10 mils. In one embodiment, film 274 also comprises a UV-inhibiting additive, comprising at least 1% of the film 274. In one embodiment, the UV-inhibiting additive comprises at least 2% of the film, but less than 3% of the film 274. In one embodiment, the film 274 also comprises phthalocyanine dye, comprising at least 0.0036% of the film 274. In one embodiment, the phthalocyanine dye comprises at least 0.005%, or at least 0.008%, but less than 0.01% of the film 274. In one embodiment, the film 274 comprises a hard coating. In one embodiment, film 274 can also be characterized as having an optical density that is at least 4 in the 280 nm-380 nm range, at least 2 in the 380 nm-390 nm range, at least 0.8 in the 290-400 nm range, at least 0.13 in the 400 nm-600 nm range, and at least 0.15 in the 600 nm-700 nm range.

In one embodiment, film 276 blocks 99.9% of UV light, 60-70% of HEV light, and 30-40% of photosensitivity (PS) light. In one embodiment the film 276 comprises a UV-inhibiting polycarbonate substrate with a thickness of at least 5 mils. In one embodiment, the thickness is less than 10 mils. In one embodiment, film 276 also comprises a UV-inhibiting additive, comprising at least 1% of the film 276. In one embodiment, the UV-inhibiting additive comprises at least 2% of the film, but less than 3% of the film 276. In one embodiment, the film 274 also comprises phthalocyanine dye, comprising at least 0.005% of the film 274. In one embodiment, the phthalocyanine dye comprises at least 0.01%, or at least 0.015%, but less than 0.02% of the film 276. In one embodiment, the film 276 comprises a hard coating. In one embodiment, film 276 can also be characterized as having an optical density that is at least 4 in the 280 nm-380 nm range, at least 2 in the 380 nm-390 nm range, at least 0.8 in the 290 nm-400 nm range, at least 0.13 in the 400 nm-600 nm range, and at least 0.15 in the 600 nm-700 nm range.

In one embodiment, film 278 blocks 99% of UV light, 60-70% of HEV light, and 30-40% of PS light. In one embodiment, film 278 comprises a UV-inhibiting PVC film, with a thickness of at least 8 mils. In one embodiment, the thickness is at least 10 mils, or at least 15 mils, but less than 20 mils thick. In one embodiment, film 278 also comprises an elastomer.

In one embodiment, the film is configured to substantially block 99% of ultraviolet light in the 200 nm-315 nm range, 99% of ultraviolet light in the 315 nm-380 nm range, and approximately 10% of PS light (i.e., light around 555 nm). In one embodiment, the film is configured to allow up to 65% of visible light (i.e., light ranging from 380 nm to 780 nm) pass through. In some embodiments, the film may block various quantities of blue light. For example, the film may have a layer that blocks 15% blue light, a layer that blocks 30% blue light, a layer that blocks 60% blue light, or combinations thereof. In one embodiment, film comprises a UV-inhibiting film with a thickness of 7-9 mils.

Figure 3:
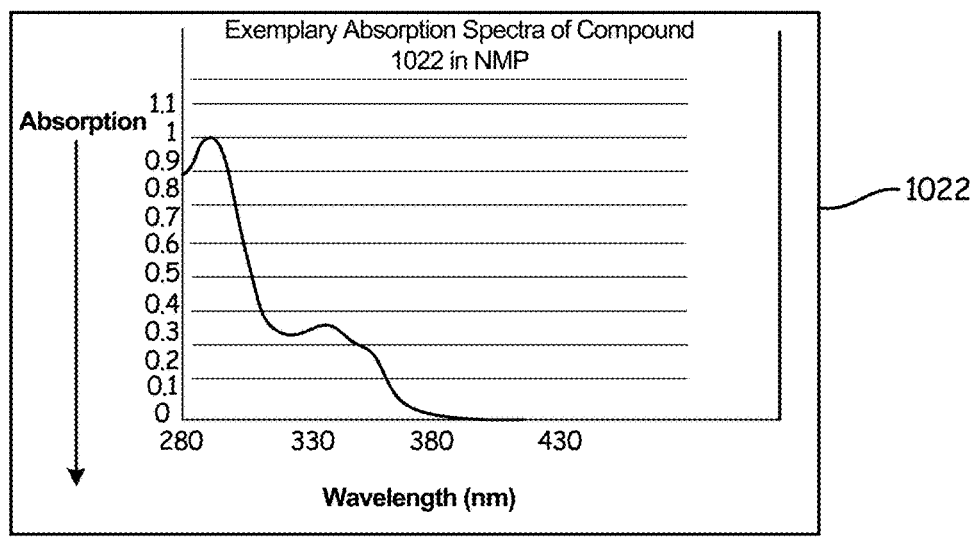

FIG. 3 depicts a graph illustrating transmission as a function of wavelength for a variety of films that may be useful in one embodiment of the present invention. In one embodiment, absorption spectra 300 is associated with a generic stock film manufactured by Nabi. Absorption spectra 302 may be associate with another stock film provided by Nabi. Absorption spectra 304 may be associate with an Armor brand film. Absorption spectra 306 may be associated with film 272, in one embodiment. Absorption spectra 308 may be associated with a film 276, in one embodiment. Absorption spectra 310 may be associated with a film 278, in another embodiment including an elastomer. Absorption spectra 312 may be associated with a film 274, in one embodiment. As shown in FIG. 3, using any of the films 272, 274, 276 or 278 produces a reduction in the absorption spectra produced by a device. For example, absorption spectra 306 shows that a maximum transmissivity in the blue light range is reduced from 1.00 to 0.37, approximately. Thus, applying any of the films 272, 274, 276 or 278 to a device, for example device 202, may result in a reduction of the harmful rays of light in the known wavelength ranges and, therefore, any of the plurality of eye related problems described above.

In one embodiment, application of any one of the films shown in FIG. 3 provides a measurable change in the transmission of light from a device to a user, as shown below in Table 3. Table 3 illustrates a percentage of energy remaining in each wavelength range after passing through the indicated applied film.

TABLE 3

ENERGY REMAINING AFTER FILM APPLICATION

| | Wave-length (nm) | Nabi | Nabi care kit | Armor | Film 272 | Film 274 | Film 276 | Film 278 |
|---|---|---|---|---|---|---|---|---|
| UV | 380-400 | 100% | 100% | 76% | 1% | 1% | 1% | 92% |
| HEV Blue | 415-455 | 100% | 93% | 88% | 90% | 79% | 64% | 33% |
| All Blue | 400-500 | 100% | 93% | 89% | 86% | 78% | 66% | 37% |
| Cyan | 500-520 | 100% | 94% | 90% | 86% | 82% | 69% | 36% |
| Green | 520-565 | 100% | 93% | 88% | 91% | 84% | 69% | 36% |
| Yellow | 565-580 | 100% | 93% | 88% | 92% | 82% | 68% | 33% |
| Orange | 580-625 | 100% | 93% | 88% | 93% | 74% | 64% | 28% |
| Red | 625-740 | 100% | 92% | 83% | 89% | 45% | 52% | 21% |

As shown in Table 3 above, any of the films described herein provide a significant reduction in the energy remaining in a plurality of wavelength ranges after filtering between the light produced by a device, for example device 202, and the eye 250. Films 272, 274, 276 and 278 almost completely absorb the UV light emitted by a device 202.

An organic dye impregnated film, such as film 272, 274, 276 or 278 may, in one embodiment be provided in the form of a rectangular shaped, or square shaped piece of film, as shown in FIG. 1C. One or more optical filters of a desired shape may then be cut from the film. As shown in FIG. 1A, for example, one embodiment of an optical film may include a substantially rectangular shape for a smartphone with a circle removed for a button of the smartphone. In another embodiment, an optical filter may include a circle filter design, for example, to cover a digital image sensor in a camera of a cell phone or other electronic device. In a further embodiment, the optical filter is provided either to a manufacturer or user in a sheet such that the manufacturer or user can cut the film to a desired size. In another embodiment, the film is provided with an adhesive backing such that it can be sized for, and then attached, to the desired device.

One or more additional layers of material or coating may also be provided on a film. An additional layer of material may include a hard coating to protect the film, for example, during shipping or use. Transmissivity can be improved by applying certain anti-reflection properties to the film, including at the time of application of any other coatings, including, in one embodiment, a hard coating layer. The film may also, or alternatively, have an antiglare coating applied or a tack coating applied.

According to one method of manufacturing, the organic dye is produced, dispersed in the film material (e.g. polycarbonate, in one embodiment), compounded into pellets, and then extruded into a thin film using techniques generally known to those skilled in the art. The organic dye impregnated film composition may thus be provided in the form of pellets, or in the form of an extruded film that may be provided on a roller and then cut to size depending on a specific application.

Methods for Creating a Light-Absorbing Film

Figure 4A:
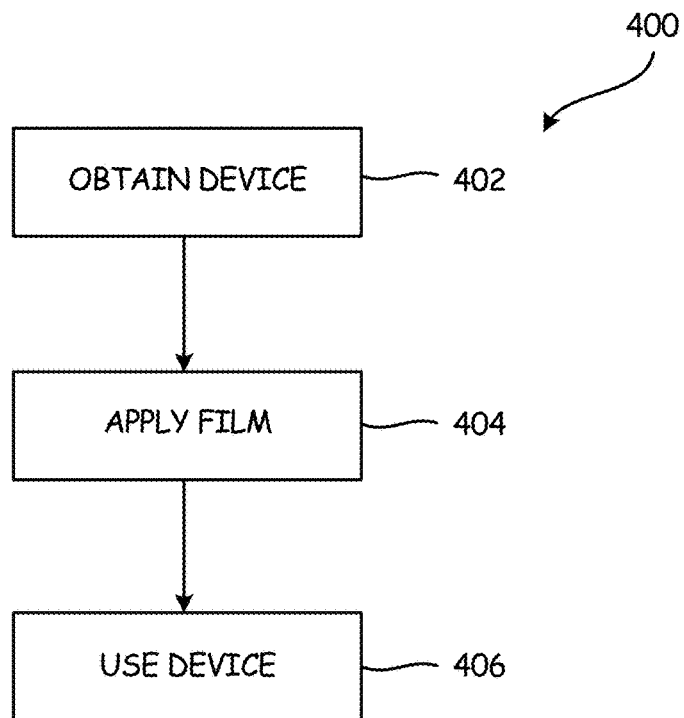
FIG. 4A depicts a method for generating a light-absorbing film for a device according to one embodiment of the present invention.
Figure 4B:
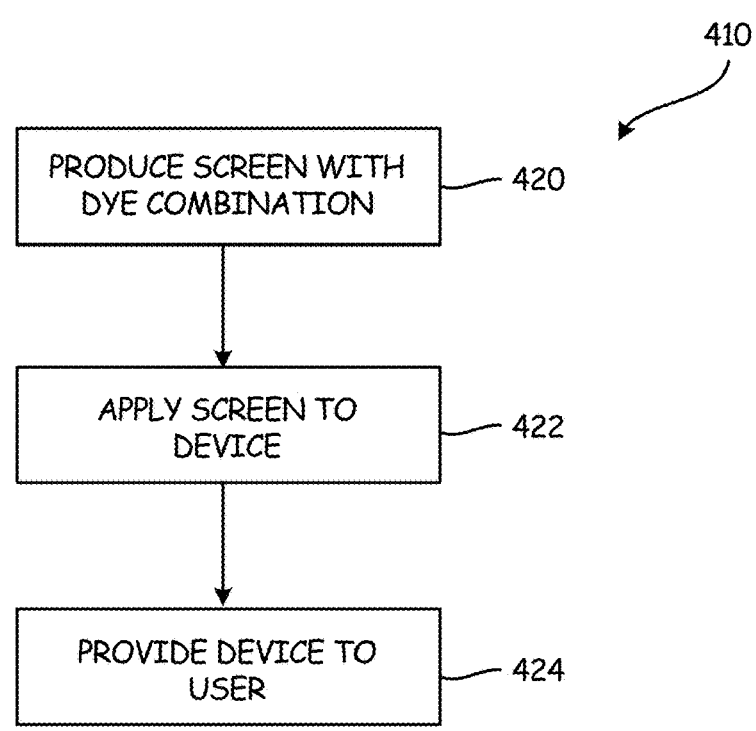
FIG. 4B depicts a method for generating a light-absorbing film for a device according to one embodiment of the present invention.
Figure 4C:
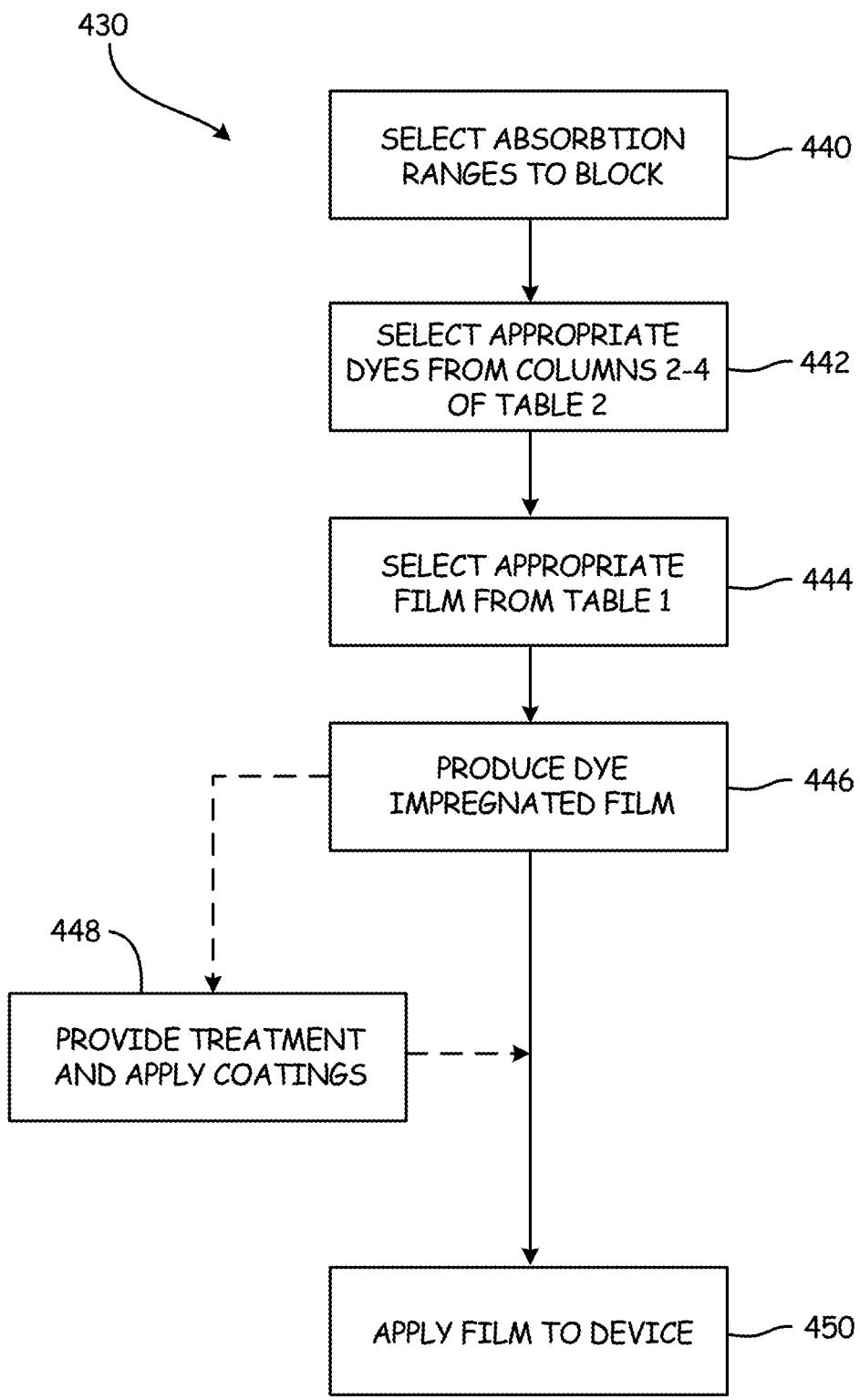
FIG. 4C depicts a method for generating a light-absorbing film for a device according to one embodiment of the present invention.

FIG. 4A-4C depict a plurality of methods for generating a light-absorbing film for a device in accordance with one embodiment of the present invention. As shown in FIG. 4A, method 400 begins at block 402 wherein a user obtains their device. The device may be a smartphone, laptop, tablet, or other light-emitting device, such as device 102. The user then obtains and applies a film, such as film 100, as shown in block 404. The user may select a film 100 based on a particular eye problem, or the desire to prevent one or more particular eye-related problems. After the user obtains a device, they may apply the film 100, for example, by utilizing an adhesive layer. The adhesive layer may be found on an aftermarket film, such as film 272, 274, 276 or 278.

As shown in FIG. 4B, method 410 illustrates a method for a manufacturer of a device to provide a safer screen to a user, where the safer screen comprises a film with properties such as those described above with respect to films 272, 274, 276 and/or 278. In one embodiment, the method 140 begins at block 420 wherein the manufacturer produces a screen with a combination of one or more absorbing compounds. In one embodiment, the dye may be selected from any of those described above, in order to reduce the transmission of a specific wavelength(s) of light from the device. The manufacturer may produce the screen such that the dyes are impregnated within the screen itself and are not applied as a separate film to the screen. The method then continues to block 422, where the manufacturer applies the screen to the device, for example using any appropriate mechanism, for example by use of an adhesive. In one embodiment, the method then continues to block 424 wherein the manufacturer provides the device to a user, this may comprise through a sale or other transaction.

FIG. 4C illustrates a method for producing a film with specific absorption characteristics in accordance with an embodiment of the present invention. In one embodiment, method 430 starts in block 440 with the selection of wavelengths for the film to absorb, or otherwise inhibit them from reaching the eye of a user. The method then continues to block 442 wherein one or more absorbing compounds are selected in order to absorb the chosen wavelength ranges, for example from Table 1 above. The method then continues to block 444 wherein an appropriate film base is selected. The appropriate film base may be the screen of a device. In another embodiment, the appropriate film base may be one of any series of polymers that is compatible with the chosen dye. In one embodiment, the user may first select an appropriate film, for example based on device characteristics, and then select appropriate dyes, thus reversing the order of blocks 442 and 444.

The method 430 continues in block 446 where the dye impregnated film is produced. In one embodiment, this may involve co-extrusion of the film with a plurality of absorbing compounds. The film may be provided as a series of resin beads and may be mixed with a series of resin beads comprising the absorbing compounds desired. In an alternative embodiment, the absorbing compounds may be provided in a liquid solution. However, any other appropriate mechanism for producing a dye-impregnated film may also be used in block 446. In one embodiment, it may also be desired for the film to have another treatment applied, for example a glare reducing or a privacy screen feature. In another embodiment, the film may be treated to have a hard coating or may be treated with a tack coating. In one embodiment, any or all of these treatments may be provided in block 448.

In one embodiment, the method continues in block 450 where the film, for example film 100, is provided to the device, for example device 102. As described previously, this may involve the manufacturer applying a screen, such as screen 102, with the desired characteristics to the device 100 using an appropriate manufacturing procedure. It may also comprise providing dye impregnated aftermarket film to a user who then applies the film to the device, for example through either method 400 or 410 described previously.

In one embodiment of a method for generating a light-absorbing film for a device, the film is produced by layering several coatings on top of one another. More specifically the film may be comprised of several layers such as, but not limited to, a matte topcoat, a blue dye layer, a polyethylene terephthalate (hereinafter "PET") layer, a UV protection layer, a pressure sensitive adhesive (hereinafter "PSA"), and a liner.

In some embodiments, the first layer applied, which is the top layer in the final embodiment, is a matte topcoat. The matte topcoat may provide an anti-glare feature, may be oil-resistant, and may contain anti-fingerprint properties. Additionally, the matte topcoat may block a small amount of high energy visible light, such as blue light. In one embodiment, the matte topcoat contains a haze factor, which describes the cloudiness of the film. Ideally, the haze factor is approximately 3% so as not to impede a user's view of the device's screen. However, the haze factor could range up to 26%. Some embodiments of the disclosed film do not include a matte topcoat and, instead, have no topcoat or have a clear hard coat.

The next layer that may be applied is a blue dye. The blue dye layer may block various quantities of high energy visible light, such as blue light. For example, the blue dye layer may block 30% of blue light and may be cool blue in color. In another example, the blue dye layer may block 60% of blue light and may be blue green in color. The blue dye layer, if added as the first layer, may also incorporate properties that enable it to act as a hard coat. Some embodiments, however, will not contain either of these blue dye layers.

Regardless of whether the blue dye layer is included, the next layer is a PET layer that blocks approximately 15% blue light. Therefore, the film may have a layer that blocks 30% blue light and an additional layer that blocks 15% blue light, or it may be limited to one layer that blocks 15% blue light. The PET layer is preferably clear and contains no color tint. If the film does not have a matte topcoat or a blue dye layer, the PET layer also acts as the topcoat and may incorporate properties that protect the remaining layers.

The next layer, which is added on to the PET layer, is a UV protection layer that can block at least 99% of UV light. The UV protection layer may have any of the features discussed above. On top of the UV layer, a PSA, such as a silicone PSA, may be applied. The adhesive may be configured so that it prevents bubbles from forming between the film and the device during application of the film to the device. In some embodiments, the film may not include an adhesive layer. For example, applying the film to electronic devices with large screens (ex: computer monitors) using an adhesive may not be feasible and, therefore, a different attachment method, such as clips that clip the film to the monitor, is used.

After the adhesive or UV layer is applied, a white paper liner and/or a clear, printable liner may be applied to the top to protect the computer-facing layer, whether the computer-facing layer is the UV layer or the PSA. This prevents the film from attaching to any objects or being exposed to dirt and debris prior to attachment to an electronic device.

In one embodiment, for example when used as a light filter, the organic dye impregnated film allows for targeted transmission cutoff at a particular wavelength, for example proximate the ends of the visible wavelength spectrum. In this application, the curve should further increase the overall transmission of visible wavelengths, for example, red wavelengths. The light filter may improve the true color rendering of digital image sensors, using silicon as a light absorber in one embodiment, by correcting the absorption imbalances at red and blue wavelengths, thereby yielding improved picture quality through improved color definition.

When used as an LCD retardation film, consistent with another embodiment, the organic dye impregnated film provides desired optical properties, such as 0° to 30° or 0° to 26° chief ray of incident angle and selective visible wavelengths at the 50% transmission cutoff, as well as superior mechanical robustness at less than 0.01 mm thickness. Fundamentally, pigments tend to stay on the surface, as do some dyes given either the process of applying the dyes or the substrates. The disclosed products embody dye particles throughout the carrying substrate—therefore light that hits the substrate will collide with dye particles somewhere enroute through the substrate. Therefore, the substrate is designed, in one embodiment, to be safe at a minimum incidence angle of 30°. The LCD retardation film may also provide better UV absorbance than other conventional LCD retardation films.

When used as a light emission reducing film, consistent with a further embodiment, the organic dye impregnated film reduces light emissions from an electronic device at certain wavelengths that may be harmful to a user. The light emission reducing film may reduce peaks and slopes of electromagnetic emission (for example, in the blue light range, the green light range and the orange light range) to normalize the emission spectra in the visible range. The emission spectra may be normalized, for example, between 0.0034-0.0038. These optical characteristics may provide the greatest suppression of harmful radiation in the thinnest substrate across the visible and near infrared range, while still meeting the industry standard visible light transmission requirements.

While an LCD display is illustrated in the figures, at least some embodiments of the present invention could apply to a device utilizing a different display generation technology, for example cathode ray tube (CRT) or light-emitting diode (LED) displays.

Incorporation into Electronic Device

As described above, in some embodiments, the protective film comprises a combination of polymer substrates and incorporates absorbing compounds in such quantities as to absorb the harmful light produced by the device. However, in other embodiments, the absorbing compounds and polymer substrates could be incorporated into the screen layers of a device during manufacture, as illustrated in FIGS. 5C-5F and 5H, such that an electronic device is produced with protection from these harmful rays built in.

The description below is designed to accompany the enclosed FIGS. 5A-5H. However, while the present embodiments are described with respect to a device with touch-screen capability, provided through the capacity grid layer 506, it is to be understood that at least some embodiments of the present invention could apply to a device without touch screen capability. Further, while an LCD display is shown in the figures, at least some embodiments of the present invention could apply to a device utilizing a different display generation technology. For example, cathode ray tube (CRT) or light-emitting diode (LED) displays are possible.

Figures 2, 2C, 3, 4:
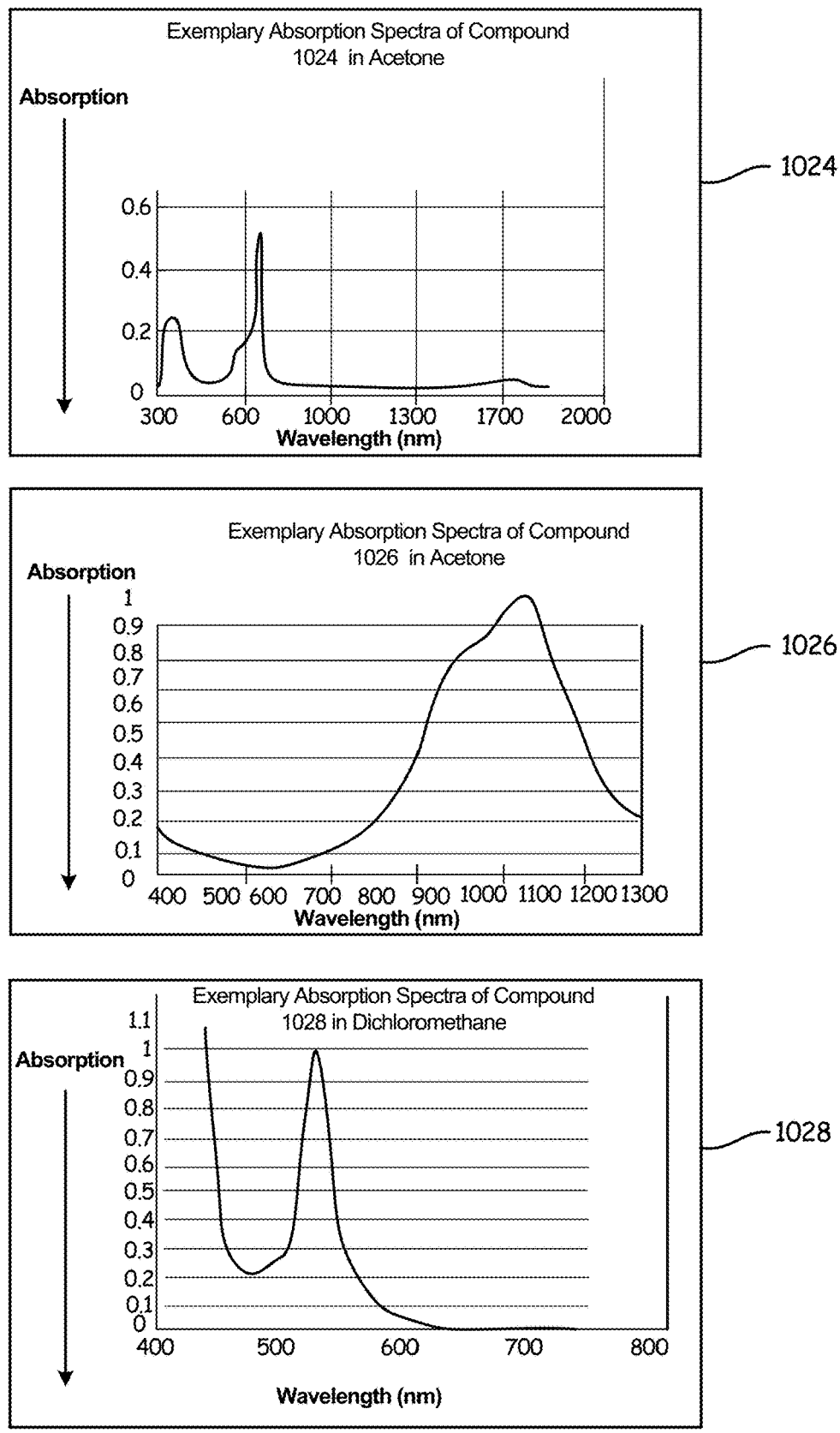
Figures 2, 2C, 3, 4, 5:
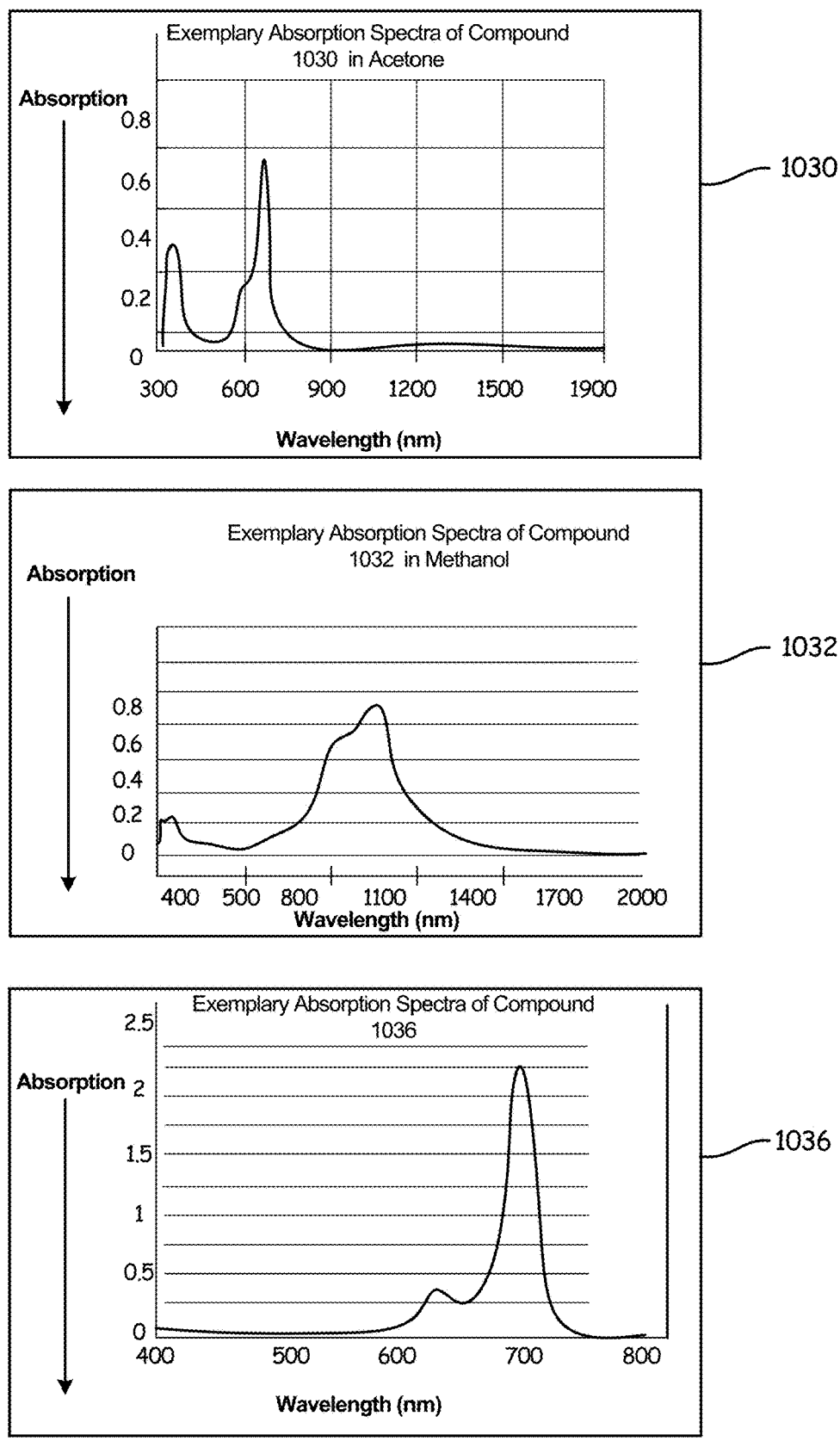
Figure 5B:
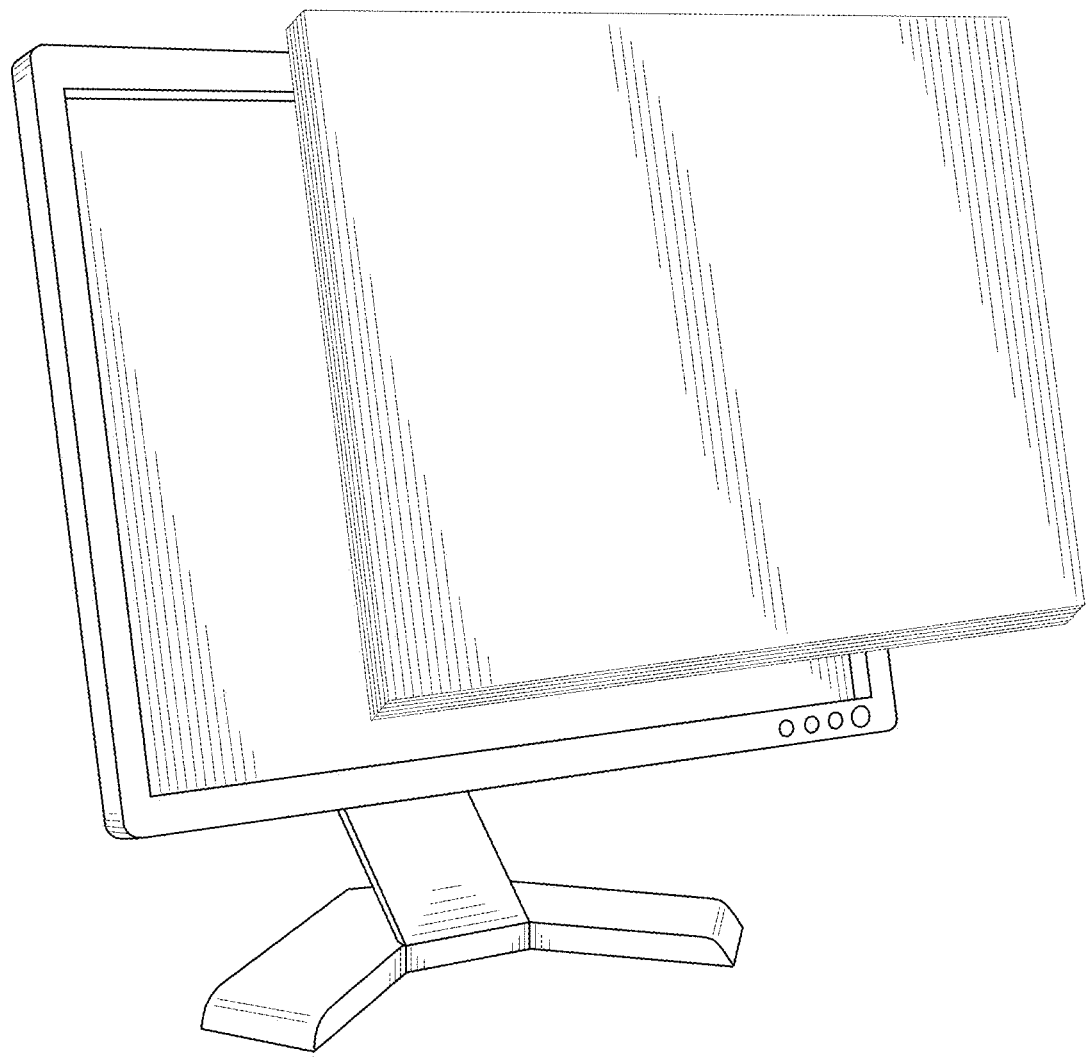
FIG. 5B depicts the screen of an electronic device comprised of several layers of glass and/or plastic.

In one embodiment, as shown in FIGS. 5A and 5B, the screen of an electronic device comprises several layers of glass and/or plastic. These layers may be configured to provide added functionality, for example, touch-screen capability, as well as protection of the device from damage by use. FIGS. 5A and 5B illustrates an exemplary screen of a digital device comprised of five layers: an LCD layer 510, a glass layer 508, a capacity grid layer 506, a flexible protective cover 504, and a surface coating layer 502. The device may be a capacitive device, such as a cellular phone or tablet with a touch-sensitive screen. The device may also be another form of a display device such as, but not limited to, a television with a non-capacitive screen. Additionally, the device may be a form of headgear, such as glasses or contact lenses, worn by a user who is exposed to light.

Figure 5C:
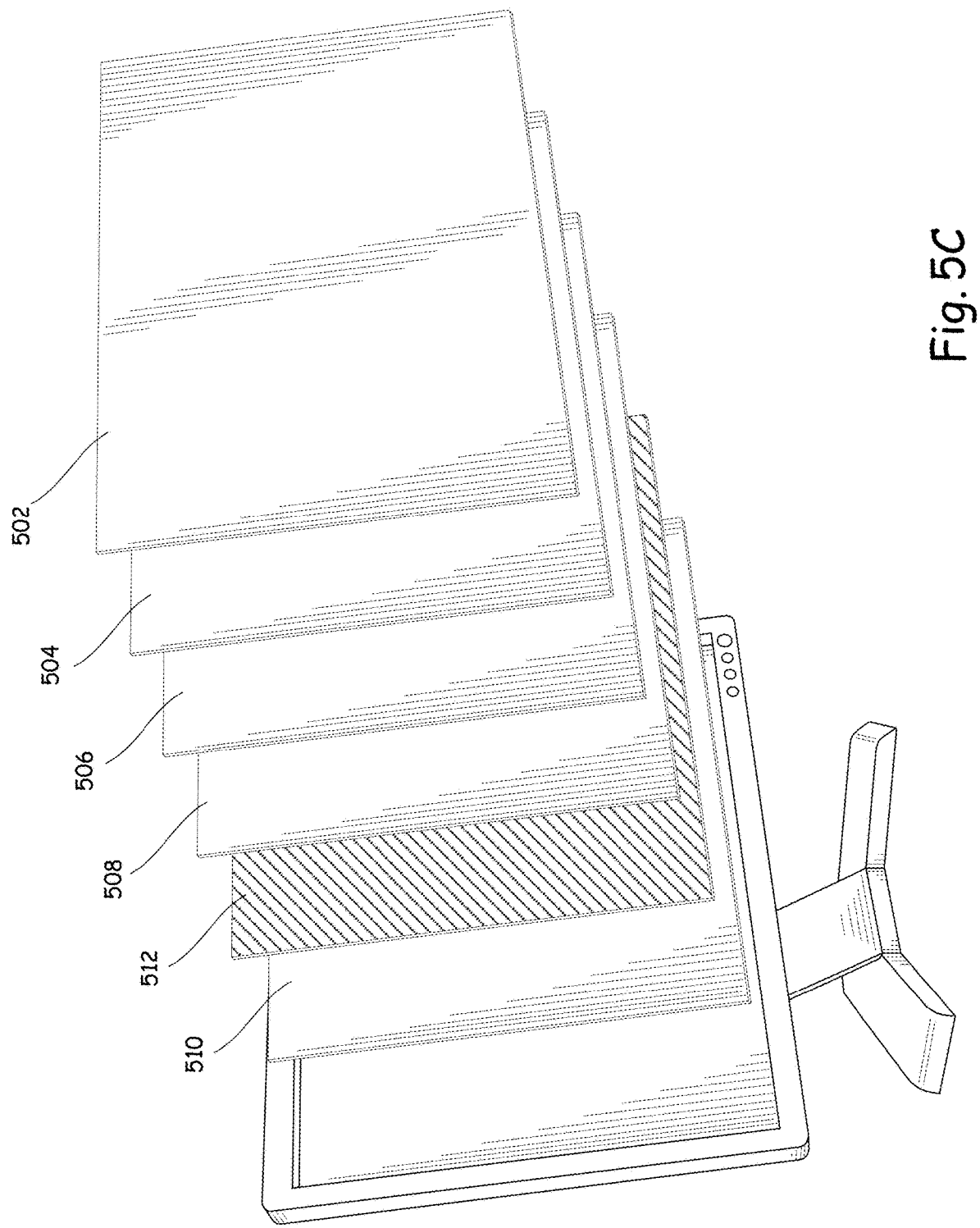
FIG. 5C depicts an exploded view of the screen of an electronic device comprised of several layers of glass and/or plastic with an absorbing film layer inserted between two of the several layers.
Figure 5D:
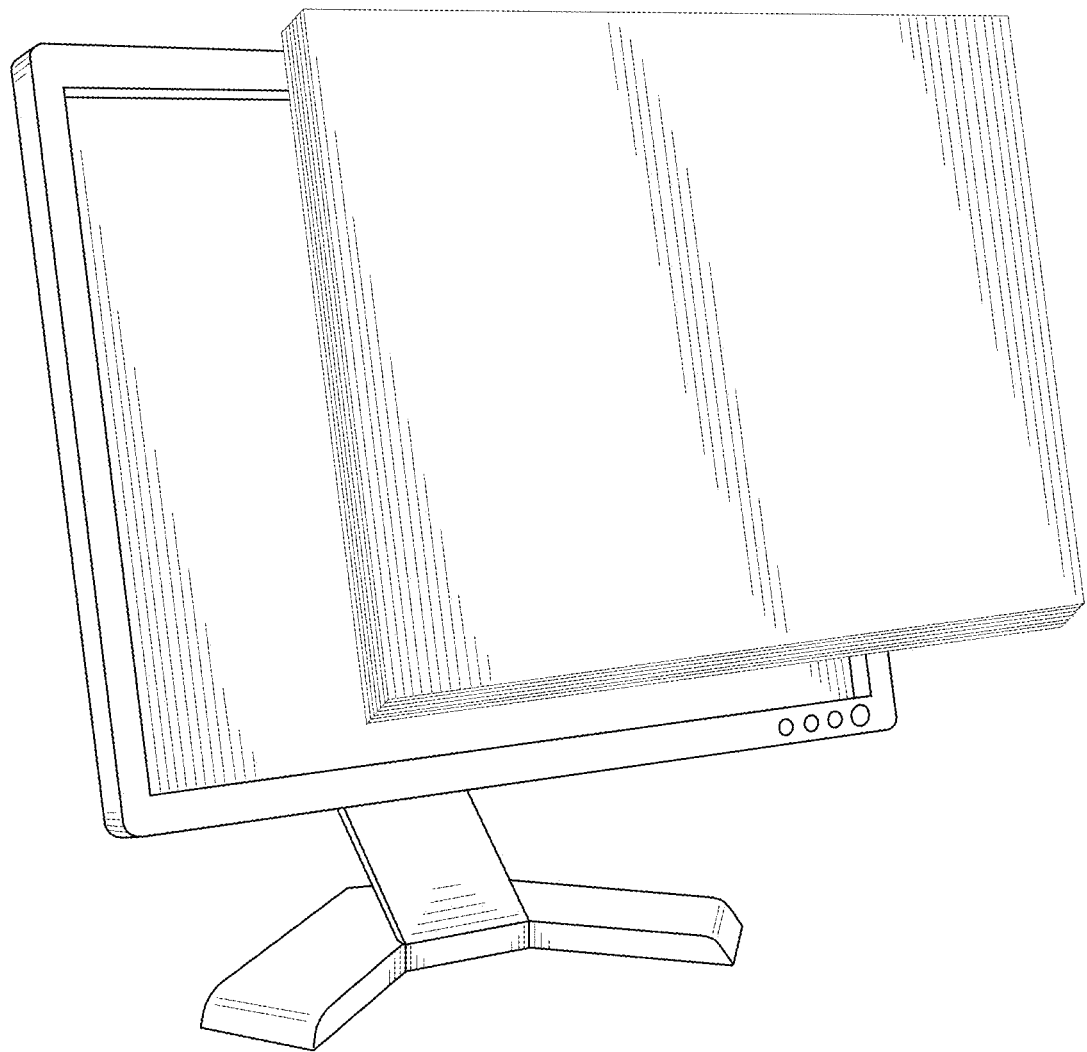
FIG. 5D depicts the screen of an electronic device comprised of several layers of glass and/or plastic with an absorbing film layer inserted between two of the several layers.

In one embodiment, as shown in FIGS. 5C and 5D, one or more absorbing compounds can be provided in a polymer layer to create an absorbing film layer 512 that is inserted between one of the layers comprising the screen of an electronic device, for example, the layers previously described with regard to FIGS. 5A and 5B. As shown in FIGS. 5C and 5D, the absorbing film layer 512 could be applied between the LCD layer 510 and the glass layer 508. However, in another embodiment, the absorbing film layer 512 could be applied between the glass layer 508 and the capacity grid layer 506. In another embodiment, the absorbing film layer 512 could be applied between the capacity grid layer 506 and the flexible protective cover 504. In another embodiment, the absorbing film layer 512 could be applied between the flexible protective cover 504 and the surface coating layer 502.

In one embodiment, the absorbing film layer 512 could be applied as a film layer inserted between any of the layers comprising the screen of an electronic device or as a hard coating to any one of the layers comprising the screen of an electronic device. In another embodiment, the absorbing film layer 512 could be applied as a hot coating or as a painted layer.

In a further embodiment, one or more absorbing film layers could be combined with the layers comprising the screen of an electronic device, for example, the layers previously described with regard to FIGS. 5A and 5B. For example, four absorbing film layers 512 could be provided such that they fit between each of the five layers of the screen. However, in another embodiment, two or three absorbing film layers 512 are provided between at least some of the five layers of the screen.

The absorbing film layer 512 can include at least a polymer substrate. In one embodiment, the selected polymer substrate absorbs the desired wavelengths of light. However, in another embodiment, an additional absorbing compound is used for absorption of all of the desired wavelengths of light. In a further embodiment, several absorbing compounds can be combined with a single polymer substrate to achieve the desired protection. FIG. 5G illustrates light waves being emitted from a computer screen. FIG. 5H illustrates the absorbing film layer 512 absorbing and, therefore, blocking those specific light waves from reaching the user. A list of several polymer bases that could be utilized in one embodiment is provided below in Table 4.

TABLE 4

POLYMER BASES FOR ABSORBANCE FILM

| Polymer base | Characteristics |
|---|---|
| Acrylic | impact modified, chemical resistance, superb weatherability, UV resistance and transparency |
| Epoxy | Resistivity to energy and heat |
| Polyamide | Thermoformabilty, abrasion resistance, good mechanical properties; High tensile strength and elastic modulus, impact and crack resistance |
| Polycarbonate | Impact strength even at low temperatures. dimensional stability, weather resistance, UV resistance, flame retardant, super-weather resistance and heat stability, optical properties |
| Polyester | Optics, mechanical Strength, Solvent Resistant, Tear and puncture resistant |
| Co-polyester (PETG, PCTG) | printable, scratch hardness |
| Polyethylene | Geomembrane windows, global recylability, good moisture barrier, clarity, strength, toughness |
| Polyolefin | Good chemical resistance |
| Polypropylene | High impact and puncture resistance, excellent extensibility |
| Polystyrene | good printablity, high impact resistance, good dimensional stability, easy to thermoform |
| Polysulfone | high strength, amorphous thermoplastic, clarity and toughness, high-heat deflection temperature, excellent thermal stability, excellent hydrolitic stability |
| Polyurethane | Excellent laminated transparency, microbial resistance, UV stability, contains adhesion promoter, medium Durometer, Medium Modulus, Excellent Cold impact |
| Polyvinyl Chloride | Weathering resistance, abrasion resistance, chemical resistance, flow characteristics, stable electrical properties |

TABLE 4-continued

POLYMER BASES FOR ABSORBANCE FILM

| Polymer base | Characteristics |
| --- | --- |
| Styrene Acrylonitrile | superior mechanical strength, chemical resistance, heat resistance, durability, simplicity of production, recyclability, impact strength, heat resistance, good impact resistance, excellent hygiene, sanitation and safety benefits. |

In one embodiment, one of the polymers selected from Table 4 is combined with one or more absorbing compounds in the desired target range, as illustrated in Table 5 below. The absorbing compounds listed in Table 5 are some examples of absorbing compounds selectable for desired protection in given wavelength ranges.

TABLE 5

ABSORBING MATERIALS AND WAVELENGTH RANGES

| Exemplary Polymer Substrate | 260-400 nm Target Range | 400-700 nm Target Range | Infrared Target Range |
| --- | --- | --- | --- |
| Polycarbonate | Tinuvin ® | ABS 668 | NIR1002A |
| PVC | DYE VIS 347 | ADS640PP | NIR1031M |
| Epoxy | UVA290A | VIS675F | NIR1072A |
| Polyester | VIS530A | DYE VIS 670 | Adam Gates IR 1422 |
| Polyethylene | ABS 400 | ABS 691 | Adam Gates IR 1151 |
| Polyamide | phthalocyanine | LUM690 | LUM1000A |
| | | FHI 6746 | LUM995 |
| | | Moleculum | |
| | | DYE 690 | |

The absorbing film layer 512, in one embodiment, has a slight color tint as a result of, at least in part, the absorbing compound selected, and works as a filter to reduce light emission from the screen. In one embodiment, under a CIE light source D65, the absorbing film layer 512, having a 7.75 mil thickness, is a light blue-green color with (L, a, B) values of (90.24, −12.64, 3.54) and (X-Y-Z) values of (67.14, 76.83, 78.90) respectively. In another embodiment, the absorbing film layer 512 appears light due to reduced loading.

In one embodiment, the polymer substrate and absorbing compound or compounds are mixed and extruded as pellets that can then be molded into the absorbing film layer 512. Alternatively, they can be headed for a hot coat. In another embodiment, the polymer substrate and one or more absorbing compounds are extruded or produced as part of any of the layers of the screen of the device.

In one embodiment, between one or more of each of the layers of a screen of an electronic device, an adhesive compound may be used to ensure that the layers fit together. The adhesive compound may further provide a seal between the layers. Therefore, instead of providing protection from harmful light wavelengths as an additional film layer within the screen, the protection may be provided through the adhesive used to bind the layers of the screen.

Figure 5E:
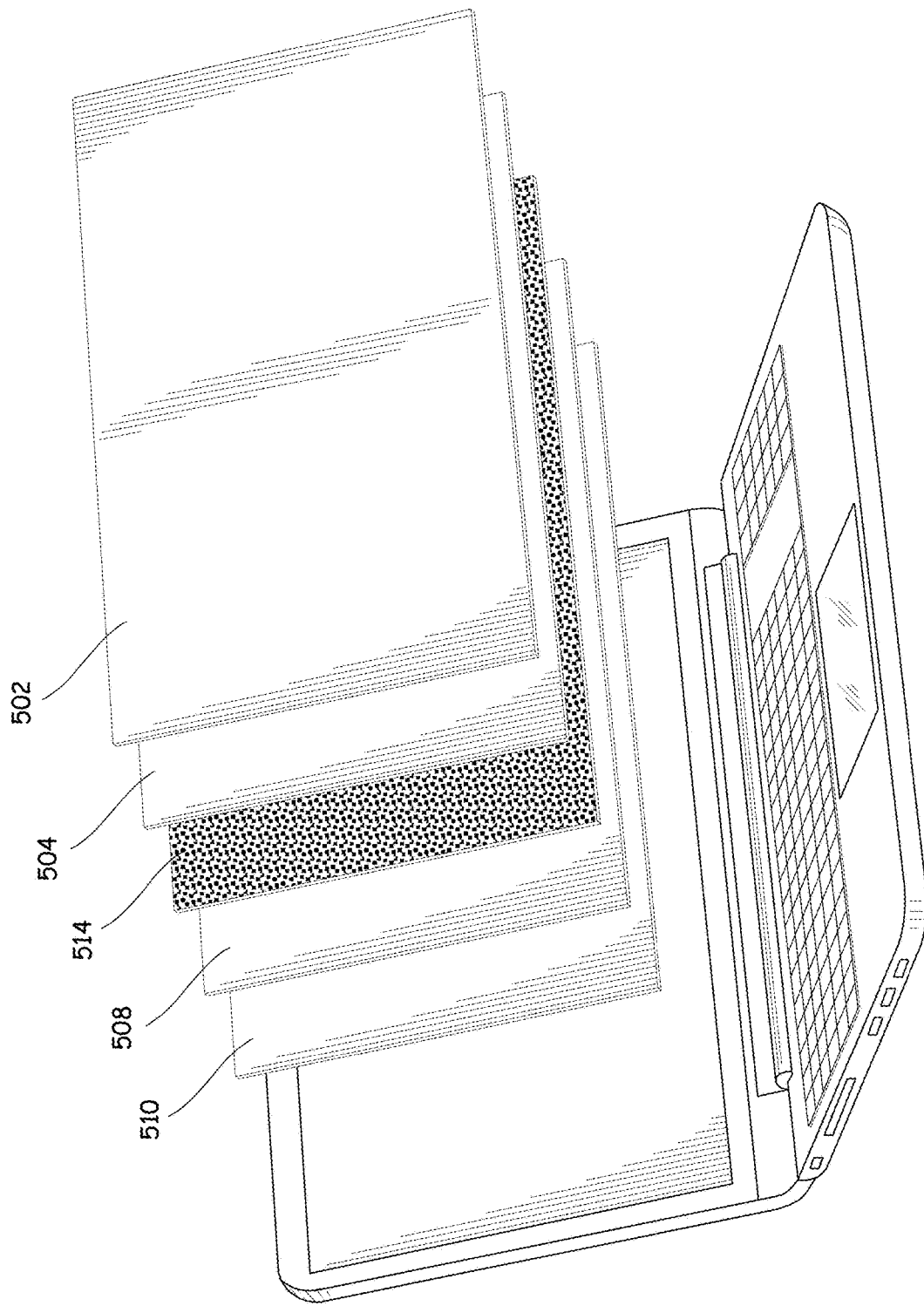
FIG. 5E depicts an exploded view of the screen of an electronic device comprised of several layers of glass and/or plastic wherein a light-absorbing adhesive is added to one of the several layers.
Figure 5F:
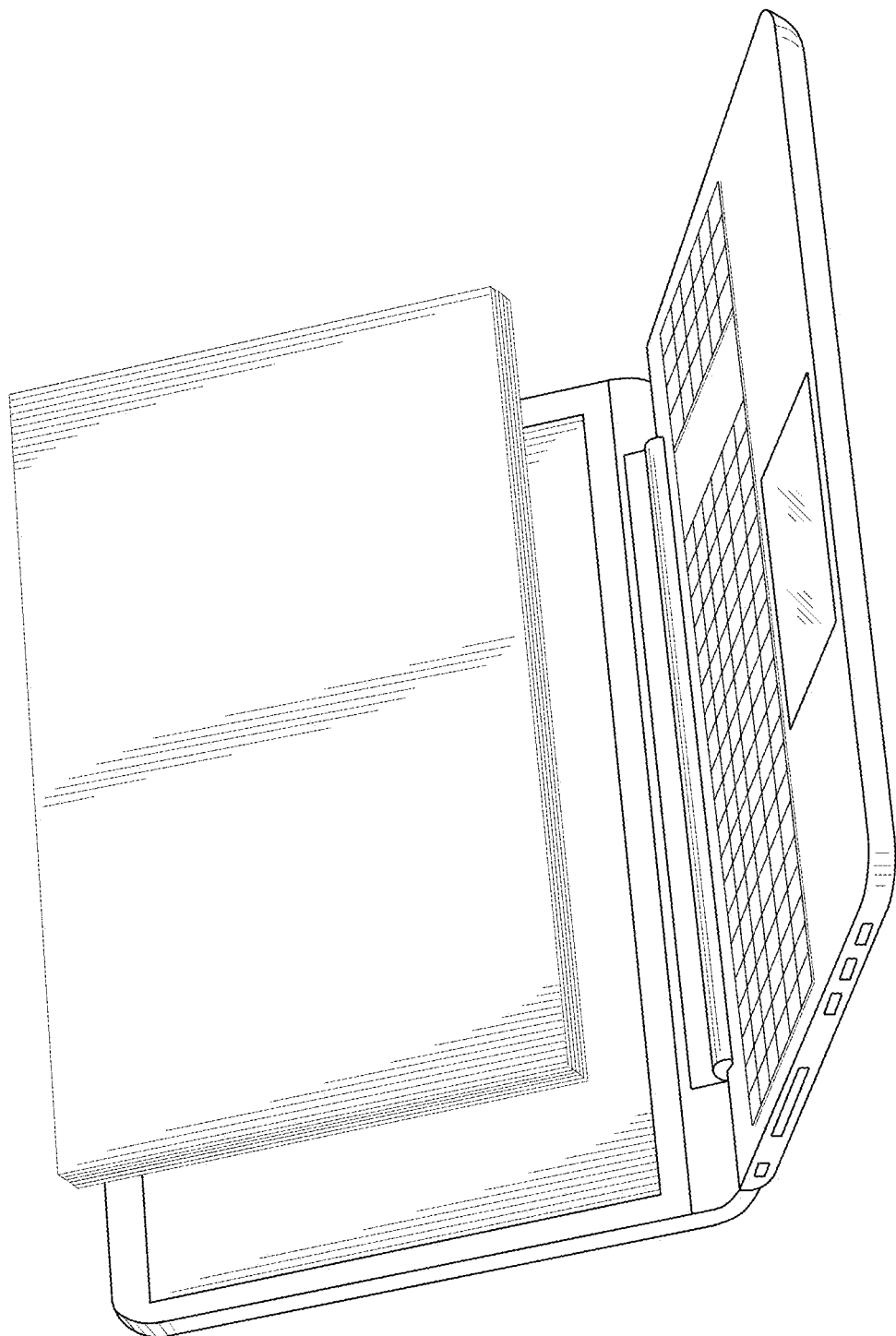
FIG. 5F depicts the screen of an electronic device comprised of several layers of glass and/or plastic wherein a light-absorbing coating is added to one of the several layers.
Figure 5G:
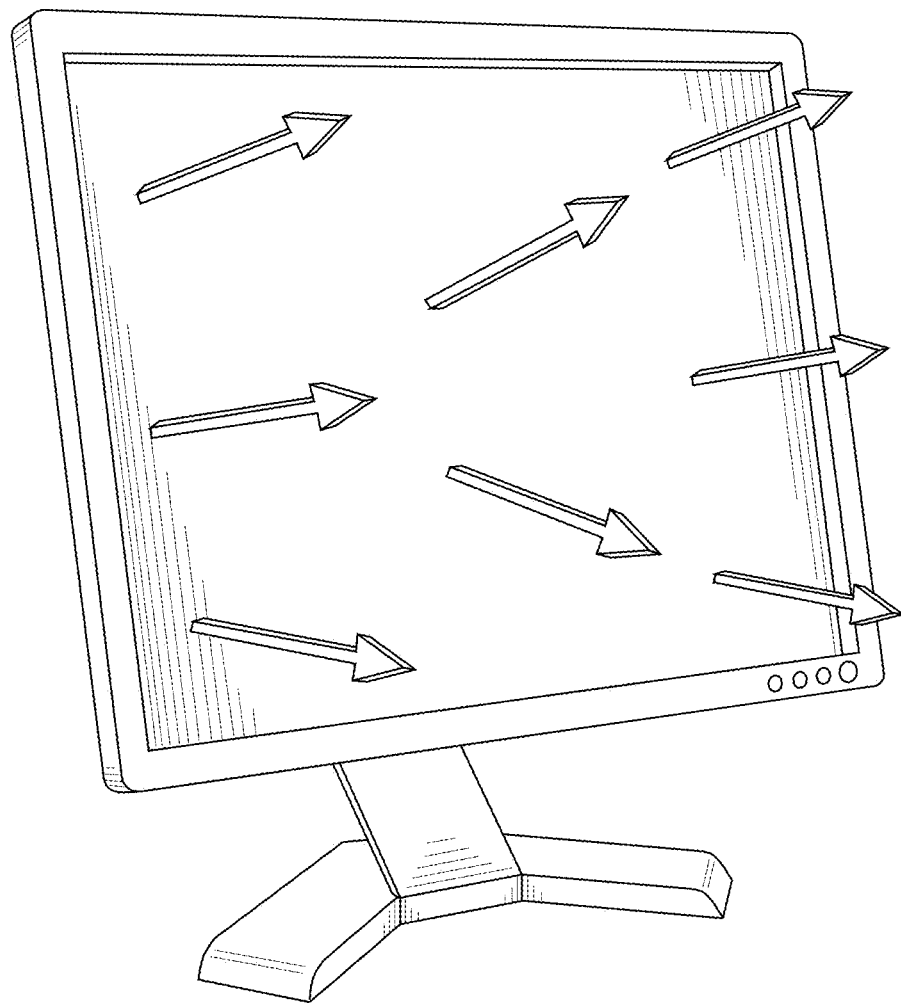
FIG. 5G depicts light waves emitted from the screen of an electronic device comprised of several layers of glass and/or plastic.
Figure 5H:
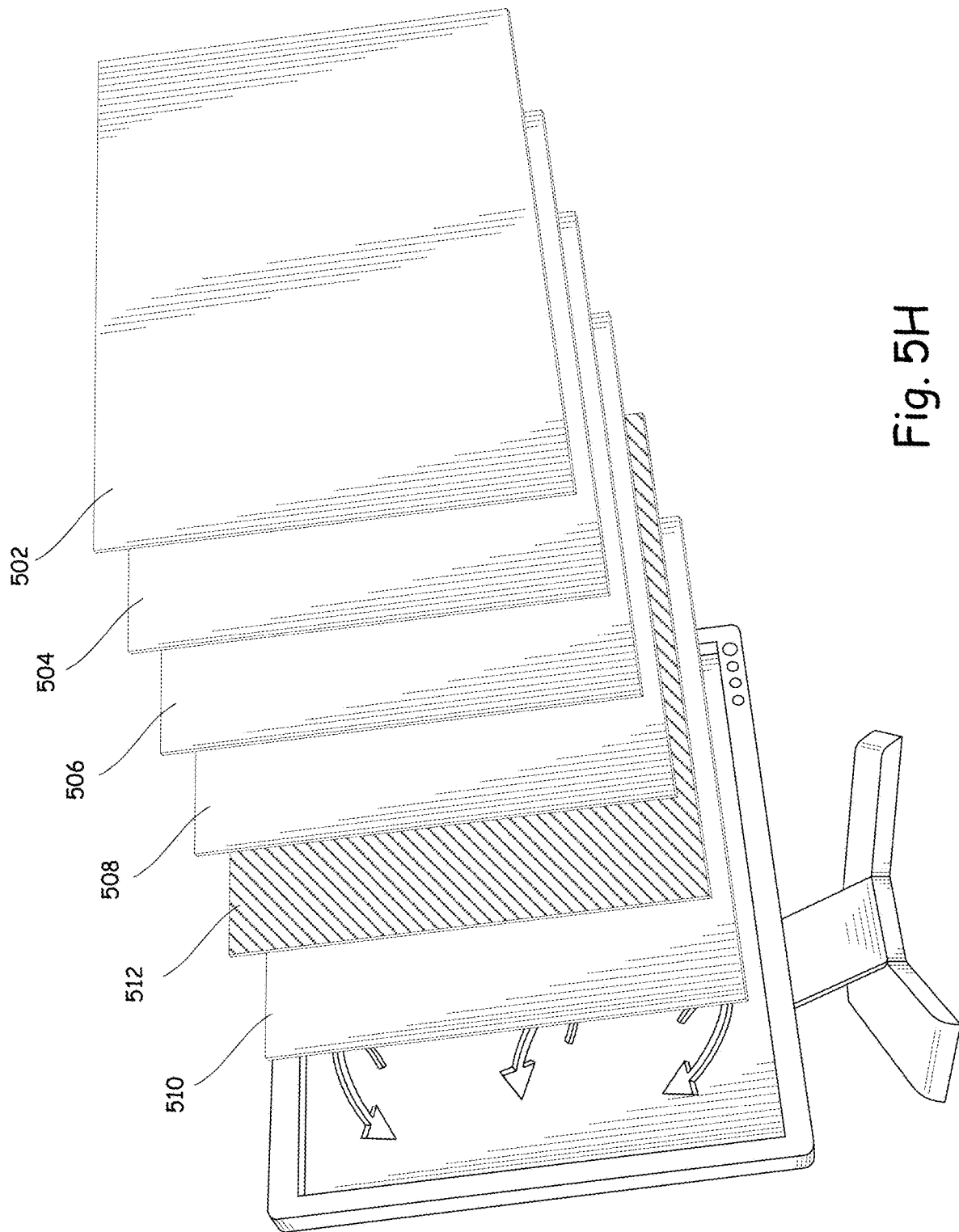
FIG. 5H depicts light waves emitted from, and blocked by, the screen of an electronic device comprised of several layers of glass and/or plastic with an absorbing film layer inserted between two of the several layers.

FIGS. 5E and 5F illustrate an exemplary screen of a digital device incorporating a light absorbing adhesive 514 that has wavelength-absorbing properties. In one embodiment, as shown in FIGS. 5E and 5F, one or more absorbing compounds are provided in a light absorbing adhesive 514 coating a top or bottom side of the layers previously described with regard to FIGS. 5A and 5B. For example, the light absorbing adhesive 514 could be applied, as shown in FIGS. 5E and 5F, as the adhesive bonding the capacity grid layer 506 to the flexible protective cover 504. However, in another embodiment, the light absorbing adhesive 514 could be applied as the adhesive bonding the LCD layer 510 to the glass layer 508. In another embodiment, the light absorbing adhesive 514 could be applied as the adhesive bonding the glass layer 508 to the capacity grid layer 506. In another embodiment, the light absorbing adhesive 514 could be applied such that it bonds the flexible protective cover 504 to the surface coating layer 502.

In a further embodiment, one or more absorbing compounds could be used as part of the adhesive bonding between each of the five layers. For example, the light absorbing adhesive 514 could be the sole adhesive used between the five layers. However, in another embodiment, the light absorbing adhesive 514 can be used between two or three of the layers of the screen. In one embodiment, the absorbing compound selected is based on a selected range of light wavelengths to block. For example, the absorbing compound selected may be from any of the columns 2-4 of Table 5.

The light absorbing adhesive 514 can include at least a polymer substrate. In one embodiment, the selected polymer substrate absorbs the desired wavelengths of light. However, in another embodiment, an additional absorbing compound is used for absorption of all of the desired wavelengths of light. In a further embodiment, several absorbing compounds can be combined with a single polymer substrate to achieve the desired protection.

In one embodiment, a silicone adhesive can be used with any of the absorbing compounds listed in columns 2-4 of Table 5. In one embodiment, a pressure-sensitive adhesive can be used with any of the absorbing compounds listed in columns 2-4 of Table 5. In another embodiment, a hot melt adhesive can be used with any of the absorbing compounds listed in columns 2-4 of Table 5. In a further embodiment, an acrylic adhesive can be used with any of the absorbing compound listed in columns 2-4 of Table 5.

In one embodiment, dissolving the desired absorbing compound in a ketone-based solvent, preferably a methyl-ethyl-ketone, can create the adhesive. The dissolved absorbing compound can then be missed with the desired adhesive compound. For example, in one embodiment, a pressure-sensitive adhesive can be combined with an absorbing compound dissolved in a ketone-based solvent. In at least one embodiment, the method includes at least one filtering step to remove un-dissolved absorbing compounds. In another embodiment, the method includes the addition of extra solvent to re-dissolve absorbing compounds causing caking along the process.

An adhesive layer, in one embodiment, has a slight color tint, as a result of, at least in part, the absorbing compound selected, and works as a filter to reduce light emission from the screen. In one embodiment, under a CIE light source D65, the adhesive layer, having a 7.75 mil thickness, is a light blue-green color with (L, a, B) values of (90.24, −12.64, 3.54) and (X-Y-Z) values of (67.14, 76.83, 78.90) respectively. In another embodiment, the adhesive layer appears lighter due to reduced loading.

In some embodiments, the absorbing compounds can be provided in one or more polymer substrates to be integrated with the electronic screen's polarizing filter. For example, in the case of an electronic screen with an LCD screen, the screen has two polarizing filters and the absorbing compounds can be coated over one of the screen's polarizing filters. In the case of a coating, the absorbing compounds can be provided in a polymer substrate that enables the polarizer filter to be laminated with the absorbing compounds. In another example, the absorbing compounds can be incorporated directly into one of the two polarizing filters.

As described above, the absorbing compounds ideally block only a portion of the wavelength ranges for each color, so that each hue is still visible to the individual viewing the screen of the electronic device. Therefore, in embodiments wherein the absorbing compounds are integrated into an electronic devices screen, colors that have portions of their wavelengths blocked by the disclosed technology can be amped up so that the small range allowed through the absorbing compounds is brighter.

Incorporation into Virtual Reality Headset

Figures 2, 2C, 3, 4, 5, 6:
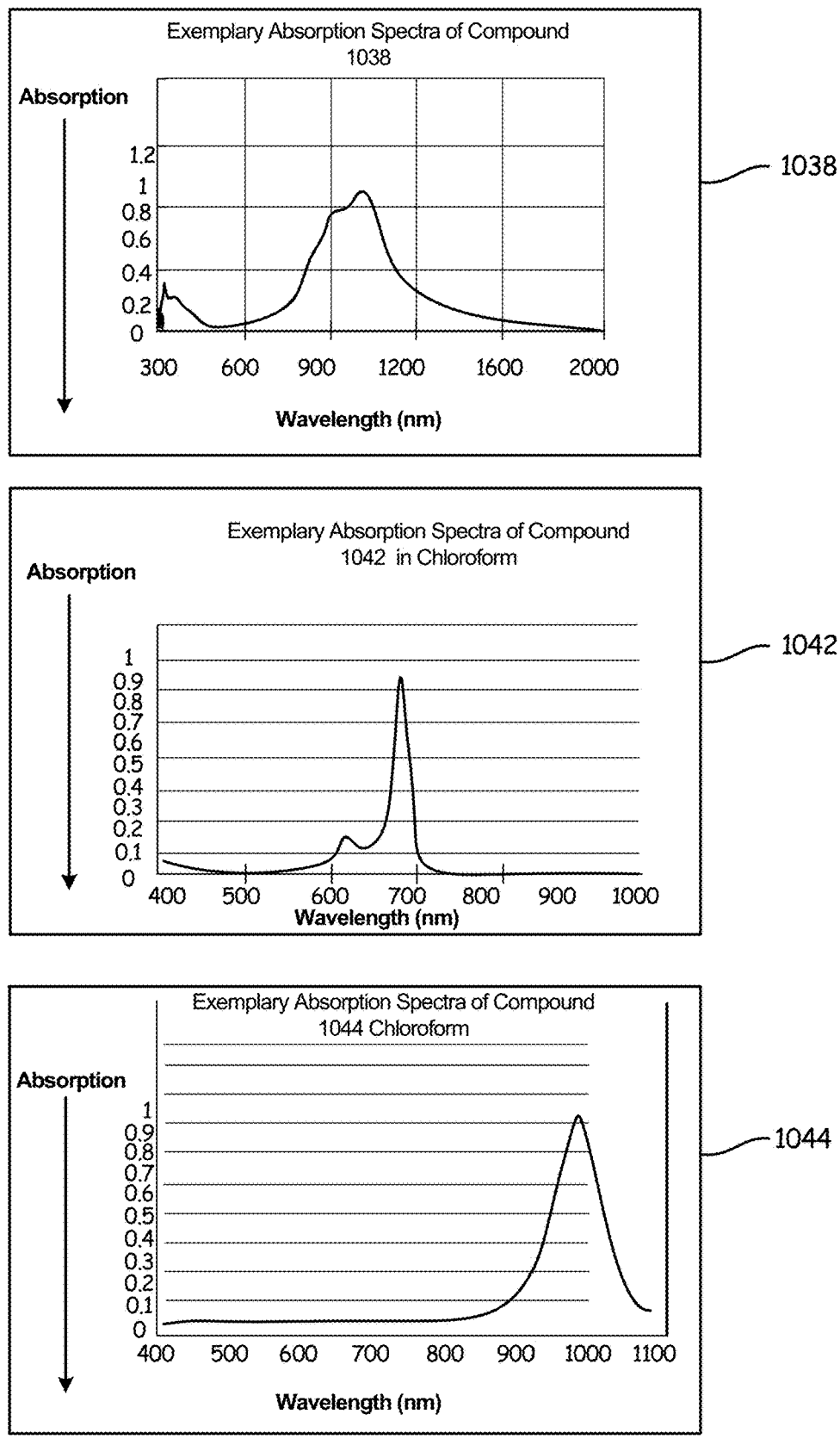
Figure 3A:
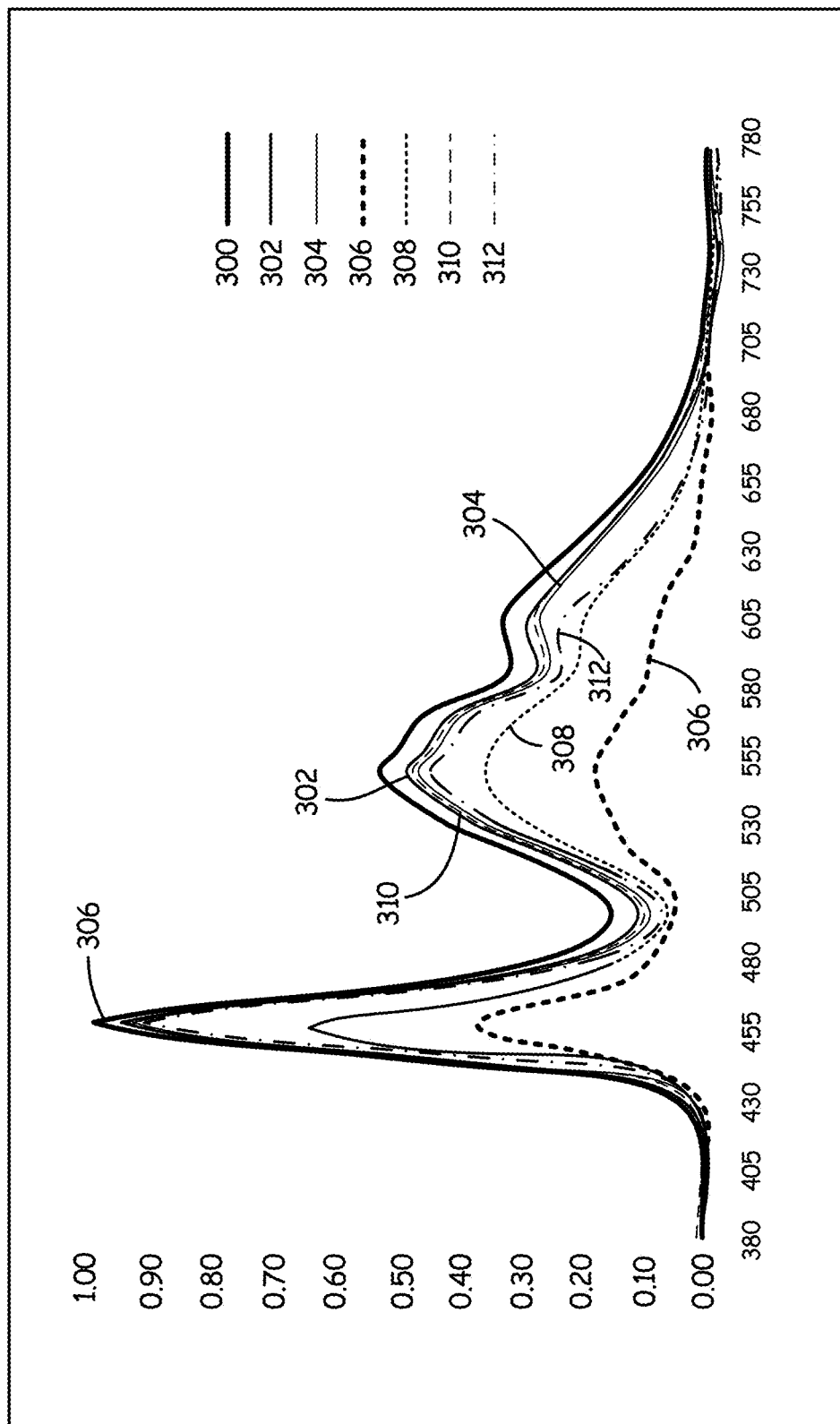
FIG. 3A depicts a graph illustrating transmission as a function of wavelength for a variety of absorbent films according to one embodiment of the present invention.
Figure 6A:
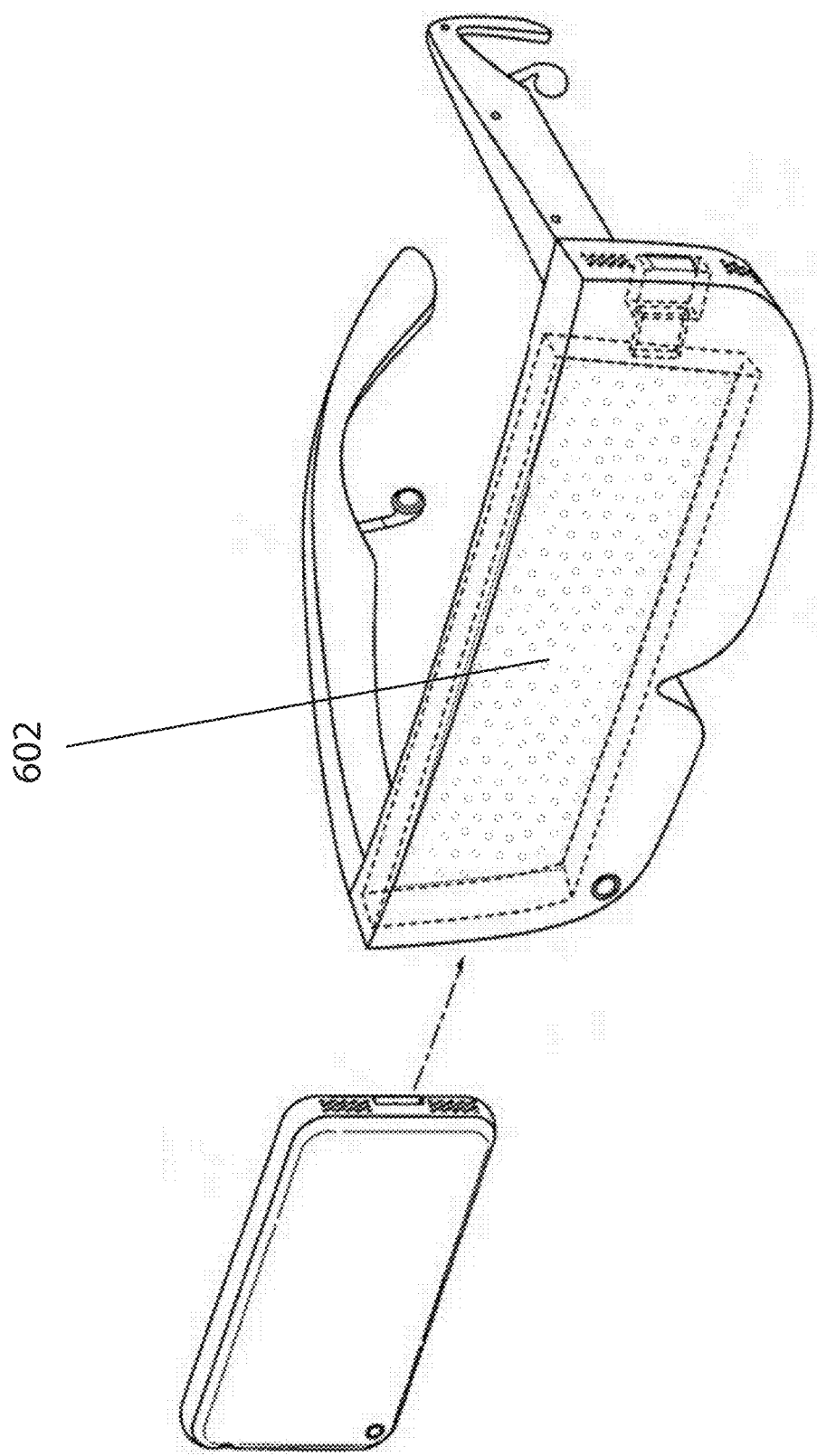
FIG. 6A depicts a virtual reality headset with one embodiment of a light-absorbing layer inserted within the virtual reality headset.

While other embodiments have been described with respect to a device with touchscreen capability provided through the capacity grid, it is to be understood that at least some embodiments of the present invention could apply to a device without touch screen capability. For example, in one embodiment, the present invention could be applied to, or integrated into, a virtual reality headset device, as illustrated in FIGS. 6A-6C, or another type of head-mounted glass device configured to absorb wavelengths of light generated by a light source.

Virtual reality (VR) headsets are pieces of headgear that users can wear over their eyes for an immersive audiovisual experience. More specifically, VR headsets provide a screen that is inches away from a user's face. Additionally, VR headsets shield ambient light and prevent it from intruding into the user's field of vision. Due to the proximity of screens, and therefore UV and blue light, to users' eyes, VR headsets present unique sets of risks to users. The disclosed technology is uniquely useful with VR headsets because it can block these harmful wavelengths. In some embodiments, because a VR headset blocks ambient light from interfering with the screen, the pigmentation or chemical structure used in the light absorbent material may interfere with the user's color experience and, therefore, the light absorbing materials used for a VR headset may vary from the above-described embodiments.

Some virtual reality headsets include glasses, frames, or units combined with headphones or another listening device and can receive a mobile phone that acts as the screen. The phone can snap into the headset and a user can utilize a mobile application on the phone, as described in U.S. Pat. No. 8,957,835 (the '835 patent). FIG. 4 of the '835 patent illustrates one type of phone-based virtual reality headset. The present invention could be used in conjunction with this virtual reality headset, as illustrated in FIG. 6A. In this embodiment, the light-absorbing layer 602 can be built into the frame of the virtual reality headset in front of the phone so that, when the light is transmitted from the phone, it must pass through the light-absorbing layer 602 before proceeding through the rest of the headset and on to the user's eyes. The light-absorbing layer 602 can embody any of the several properties described above.

Instead of using a phone as a screen, other virtual reality headsets have a built-in screen panel. For example, the OCULUS RIFT, developed by Oculus VR, uses an organic light-emitting diode (OLED) panel for each eye. In these virtual reality headsets, the light-absorbing layer 602 can be included in front of the light display panel, as illustrated in FIGS. 6B and 6C. The light-absorbing layer 602 may be one continuous layer that covers both eyes. In another embodiment, there may be two light-absorbing layers 602, one for each eye. In some embodiments, each light-absorbing layer 602 is a flat panel. In other embodiments, each light-absorbing layer 602 is curved around the interior of the headset.

One skilled in the art would understand that there are different embodiments possible with a light-filtering film for a screen of a device comprising a polymer substrate. One embodiment may include a first absorbing compound combined with the polymer substrate, the first absorbing compound absorbing blue light in a blue notch band having a full-width half-maximum of not greater than about 50 nm. In another embodiment, the disclosure may include a second absorbing compound combined with the polymer substrate, the second absorbing compound absorbing green light in a green notch, wherein the first absorbing compound comprises an absorption that has a maximum absorbance peak between about 420 nm and about 445 nm, and wherein the second absorbing compound has a maximum absorbance peak between about 540 nm and 610 nm.

Another embodiment may include that the polymer substrate comprises an acrylic polymer, an epoxy polymer, a polyamide, a polycarbonate, a polyester, a co-polyester of PETG and PCTG, a polyethylene, a polyolefin, a polypropylene, a polystyrene, a polysulfone, a polyurea, a polyvinylchloride, or a styrene acrylonitrile. A light-filtering film may include at least one of an antiglare coating, a hard coating and a tack coating.

In some embodiments, the invention comprising an electronic display device. The light-filtering film may be applied to the electronic display device. The electronic device comprises at least one of an LED (light-emitting diode), LCD (liquid-crystal display), computer monitor, equipment screen, television, tablet, or cellular phone. The electronic device may include a capacitive touch screen.

In some embodiments, the first absorbing compound may comprise a blue or blue-green organic dye dispersed therein. In other embodiments, the organic dye may comprise a blue-green phthalocyanine dye. In some instances, the organic dye may comprise between about 0.05 percent to about 2.00 percent of the polymer substrate by weight. The filter may output light that measures to within 1000 Kelvin of a D65 white light. The first absorbing compound, the second absorbing compound, or both may impregnate (or may be impregnated) into the polymer substrate. In some embodiments, a light-filtering film according to claim 1, wherein the first absorbing compound and the second absorbing compound are provided in combination so that, for light produced by the screen transmitted through the light-filtering film, correlated color temperature is within about 1000 Kelvin of correlated color temperature for light produced by the screen that is not transmitted through the light-filtering film.

In some embodiments, a light-filtering film may comprise an adhesive. The adhesive comprises a pressure-sensitive adhesive.

In some embodiments, the invention may include a method for light-filtering for a screen of a device comprising having a film on a light emitting display, wherein the film reduces transmissivity by having a polymer substrate and a first absorbing compound combined with the polymer substrate and absorbing, by the first absorbing compound, blue light in a blue notch band having a full-width half-maximum of not greater than about 50 nm. The invention may further absorb green light in a green notch by a second absorbing compound combined with the polymer substrate, wherein the first absorbing compound comprises an absorption that has a maximum absorbance peak between about 420 nm and about 445 nm, and wherein the second absorbing compound has a maximum absorbance peak between about 540 nm and 610 nm.

In some embodiments, the invention may include a light-filtering film for a screen of a device comprising a polymer substrate. A first absorbing compound combined with the polymer substrate, the first absorbing compound absorbing an ultraviolet range of light by at least 65%, wherein the ultraviolet range of light comprises a range between about 380 nanometers and about 400 nanometers. A second absorbing compound combined with the polymer substrate, the second absorbing compound absorbing green light, wherein the green range of light comprises a range between about 495 nm and about 570 nm. The second absorbing compound absorbs about 10% more light than between 460 and 495, wherein the second absorbing compound continues light absorption from the green light range into the yellow light range between about 565 nanometers and about 590 nanometers and absorbs±5% more light than the maximum green light absorption. In some embodiments, the light filtering film may be further configured to transmit sufficient light generated by the device such that an image generated by the device includes an increase in yellow light by at least 5%.

In some embodiments, the invention may include a light-filtering film for a screen of a device comprising a polymer substrate. A first absorbing compound may combine (or may be combined) with the polymer substrate, the first absorbing compound absorbing blue light in a blue notch band having a full-width half-maximum of not greater than about 50 nm, and a second absorbing compound may combine (or may be combined) with the polymer substrate, the second absorbing compound absorbing green light in a green notch, wherein the first absorbing compound comprises an absorption that has a maximum absorbance peak between about 420 nm and about 445 nm, and wherein the second absorbing compound comprises an absorption that has a decrease of light transmission absorption by about 10% to about 25% between the range of about 520 nm and 680 nm.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A light-filtering film for a screen of a device comprising:
   a polymer substrate;
   a first absorbing compound combined with the polymer substrate, the first absorbing compound absorbing blue light in a blue notch band having a full-width half-maximum of not greater than about 50 nm; and
   a second absorbing compound combined with the polymer substrate, the second absorbing compound absorbing green light in a green notch,
   wherein the first absorbing compound has a maximum absorbance peak at approximately 455 nm, and
   wherein the second absorbing compound has a maximum absorbance peak between about 540 nm and 610 nm and absorbs at least 20% of photosensitivity light.

2. A light-filtering film according to claim 1, wherein the polymer substrate comprises an acrylic polymer, an epoxy polymer, a polyamide, a polycarbonate, a polyester, a co-polyester of PETG and PCTG, a polyethylene, a polyolefin, a polypropylene, a polystyrene, a polysulfone, a polyurea, a polyvinylchloride, or a styrene acrylonitrile.

3. A light-filtering film according to claim 1, comprising at least one of an antiglare coating, a hard coating and a tack coating.

4. A light-filtering film according to claim 1, further comprising an electronic display device.

5. A light-filtering film according to claim 4, wherein the light-filtering film is applied to the electronic display device.

6. A light-filtering film according to claim 4, wherein the electronic device comprises at least one of an LED (light-emitting diode), LCD (liquid-crystal display), computer monitor, equipment screen, television, tablet, or cellular phone.

7. A light-filtering film according to claim 4, wherein the electronic device comprises a capacitive touch screen.

8. A light-filtering film according to claim 1, wherein the first absorbing compound comprises a blue or blue-green organic dye dispersed therein.

9. A light-filtering film according to claim 8, wherein the organic dye comprises a blue-green phthalocyanine dye.

10. A light-filtering film according to claim 8, wherein the organic dye comprises between about 0.05 percent to about 2.00 percent of the polymer substrate by weight.

11. A light-filtering film according to claim 1, wherein the filter can output light that measures to within 1000 Kelvin of a D65 white light.

12. A light-filtering film according to claim 1, wherein the first absorbing compound, the second absorbing compound, or both are impregnated into the polymer substrate.

13. A light-filtering film according to claim 1, comprising an adhesive.

14. A light-filtering film according to claim 13, wherein the adhesive comprises a pressure-sensitive adhesive.

15. A light-filtering film according to claim 1, wherein the first absorbing compound and the second absorbing compound are provided in combination so that, for light produced by the screen transmitted through the light-filtering film, correlated color temperature is within about 1000 Kelvin of correlated color temperature for light produced by the screen that is not transmitted through the light-filtering film.

16. A method for light-filtering for a screen of a device comprising:
   having a film on a light emitting display, wherein the film reduces transmissivity by:
      having a polymer substrate and a first absorbing compound combined with the polymer substrate;
      absorbing, by the first absorbing compound, blue light in a blue notch band having a full-width half-maximum of not greater than about 50 nm; and
      absorbing green light in a green notch by a second absorbing compound combined with the polymer substrate,
   wherein the first absorbing compound has a maximum absorbance peak at approximately 455 nm and absorbs approximately 30-40% of high energy violet light, and
   wherein the second absorbing compound has a maximum absorbance peak between about 540 nm and 610 nm and absorbs at least 20% of photosensitivity light.

17. A light-filtering film for a screen of a device comprising:
   a polymer substrate;
   a first absorbing compound combined with the polymer substrate, wherein the first absorbing compound has a maximum absorbance peak at approximately 455 nm and absorbs approximately 30-40% of high energy violet light, and a second absorbing compound combined with the polymer substrate, the second absorbing compound absorbing green light, wherein the green range of light comprises a range between about 495 nm and about 570 nm and the second absorbing compound absorbs about 10% more light than between 460 and 495 nm, wherein the second absorbing compound continues light absorption from the green light range into the yellow light range between about 565 nanometers and about 590 nanometers and absorbs about 5% more light than the maximum green light absorption.

18. A light-filtering film according to claim 17, wherein the film is further configured to transmit sufficient light generated by the device such that an image generated by the device includes an increase in yellow light by at least 5%.

19. A light-filtering film for a screen of a device comprising:
    a polymer substrate;
    a first absorbing compound combined with the polymer substrate, the first absorbing compound absorbing blue light in a blue notch band having a full-width half-maximum of not greater than about 50 nm; and
    a second absorbing compound combined with the polymer substrate, the second absorbing compound absorbing light in a yellow-green band,
wherein the first absorbing compound comprises an absorption peak at approximately 455 nm, and
wherein the second absorbing compound comprises an absorption that has a decrease of light transmission by at least 5% within the range of about 565 nm and 590 nm.

* * * * *